(12) United States Patent
Aotake

(10) Patent No.: US 6,389,223 B1
(45) Date of Patent: May 14, 2002

(54) RECORDING APPARATUS, RECORDING METHOD AND RECORDING MEDIUM

(75) Inventor: Hidenori Aotake, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/111,185

(22) Filed: Jul. 8, 1998

(30) Foreign Application Priority Data

Jul. 10, 1997 (JP) ............................................. 9-200749

(51) Int. Cl.⁷ .......................... H04N 5/76; H04N 5/765; H04N 5/85
(52) U.S. Cl. ................. 386/109; 386/125; 386/117
(58) Field of Search .................. 386/109, 46, 124, 386/125, 126, 83, 107, 117, 52, 3, 1, 38, 45, 95; 360/32; H04N 5/76, 5/765, 5/85

(56) References Cited

U.S. PATENT DOCUMENTS 5,381,275 A * 1/1995 Nitta et al.
5,517,321 A * 5/1996 Yoshida
5,822,493 A * 10/1998 Uchara et al.

\* cited by examiner

*Primary Examiner*—Robert Chevalier
(74) *Attorney, Agent, or Firm*—Oblon, Spivak, McClelland, Maier & Neustadt, P.C.

(57) ABSTRACT

A recording period of time for recording a program and a bit rate of an MPEG system stream produced by the encoder board as a result of encoding a program are set. The microprocessor computes a recording capacity from the recording period of time and the bit rate. A free area with the size equal to the computed recording capacity is allocated in the hard disc. The free area is used for storing an MPEG system stream of a program received typically by a TV tuner employed in the encoder board.

8 Claims, 25 Drawing Sheets

31

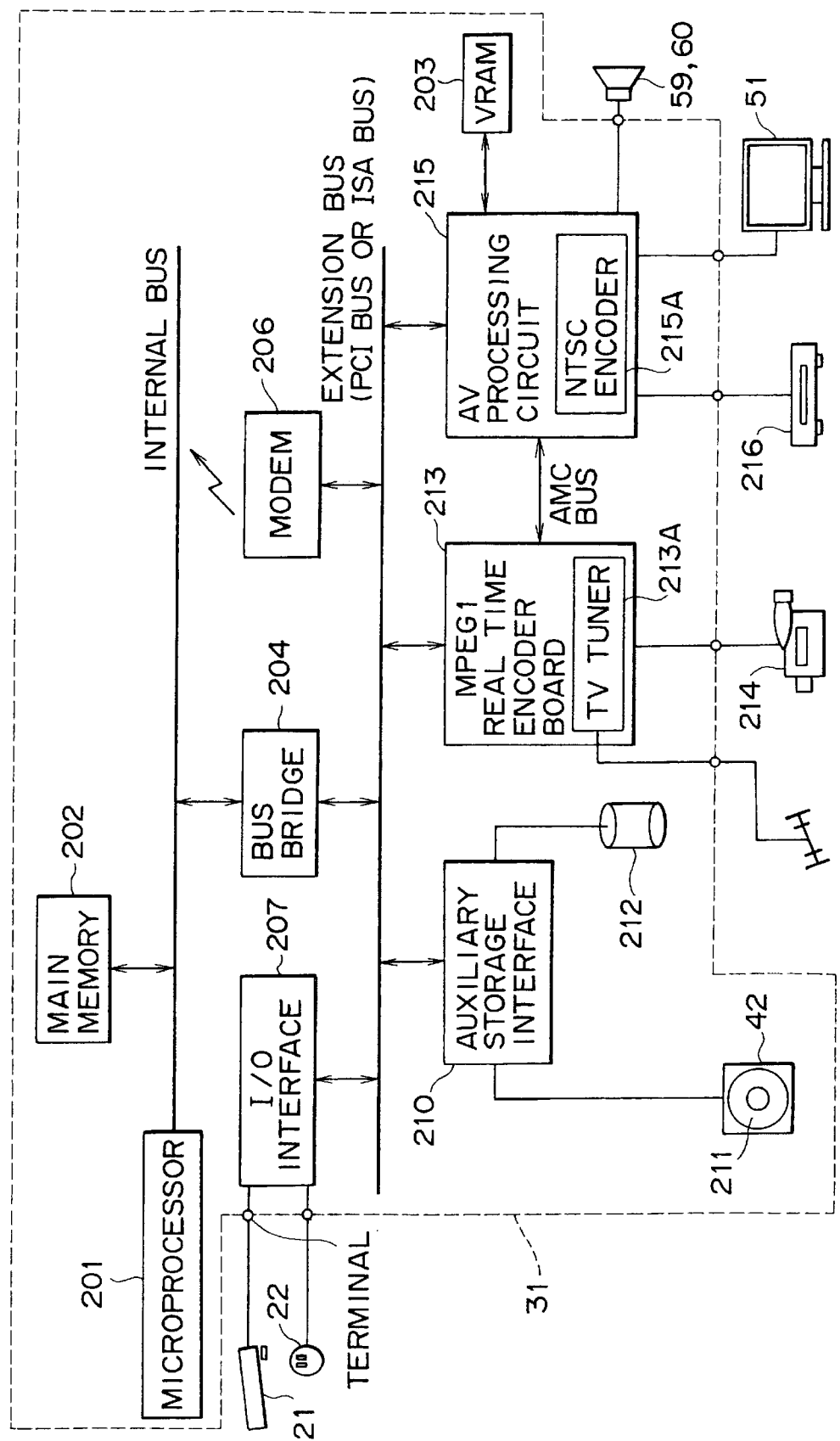

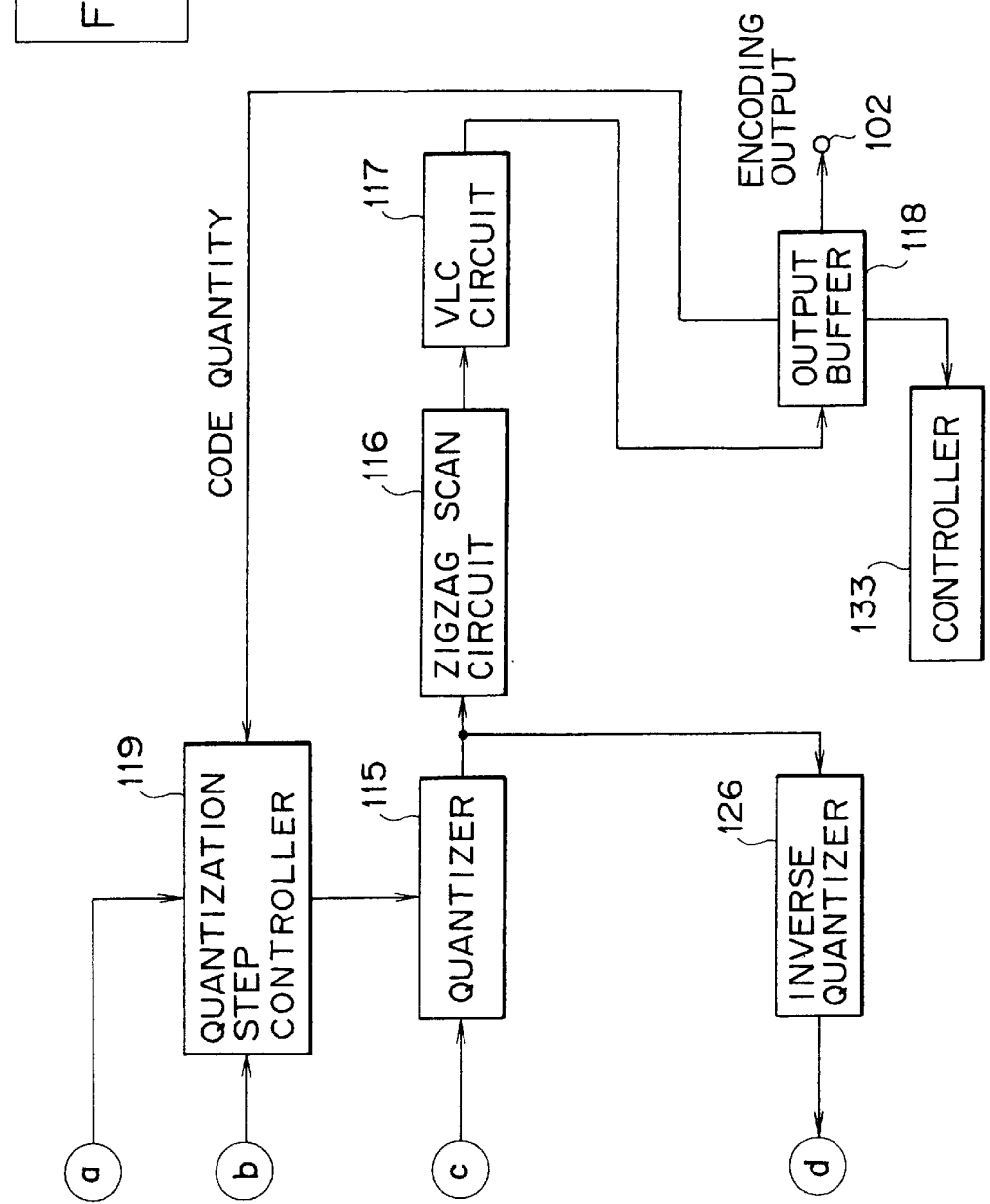

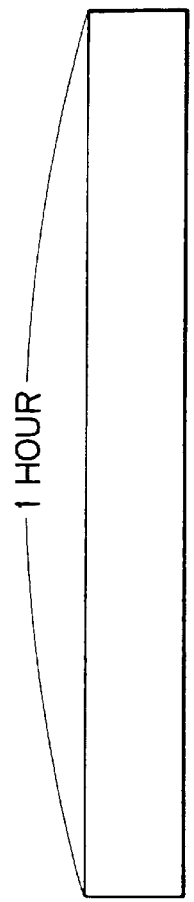
FIG. 9A NORMAL TAPE
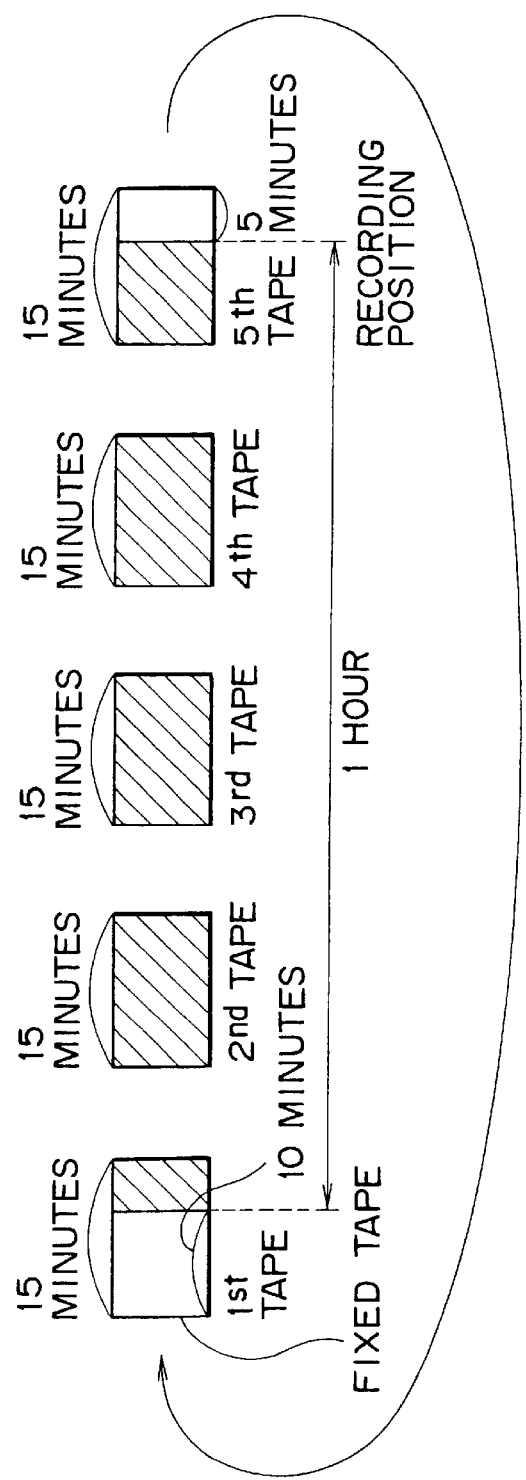
FIG. 9B ENDLESS TAPE

FIG. 10

| VIDEO RECORDING MODE | SIZE | SYSTEM BIT RATE | VIDEO BIT RATE | FRAME RATE | AUDIO BIT RATE | AUDIO RECORDING MODE | VIDEO RECORDING TIME OF A 1-GB TAPE |
|---|---|---|---|---|---|---|---|
| High | 320×240 | 2379200 | 2120000 | 30 | 224000 | dual/stereo | ABOUT 60 MINUTES |
| Normal | 352×240 | 1411200 | 1151929 | 30 | 224000 | dual | ABOUT 102 MINUTES |
| Long | 160×112 | 478400 | 374800 | 30 | 96000 | dual/stereo | ABOUT 5 HOURS |
| Network | 112×80 | 124400 | 90000 | 10 | 32000 | single | ABOUT 12 HOURS (640 MB) |

F I G. 14
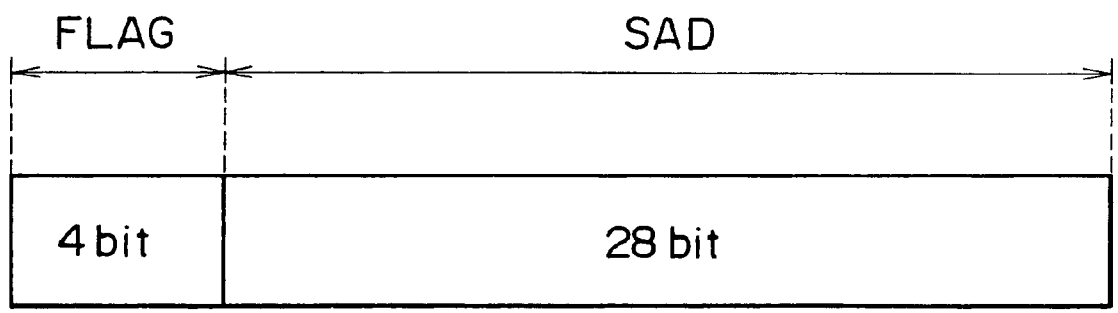
INDEX DATA

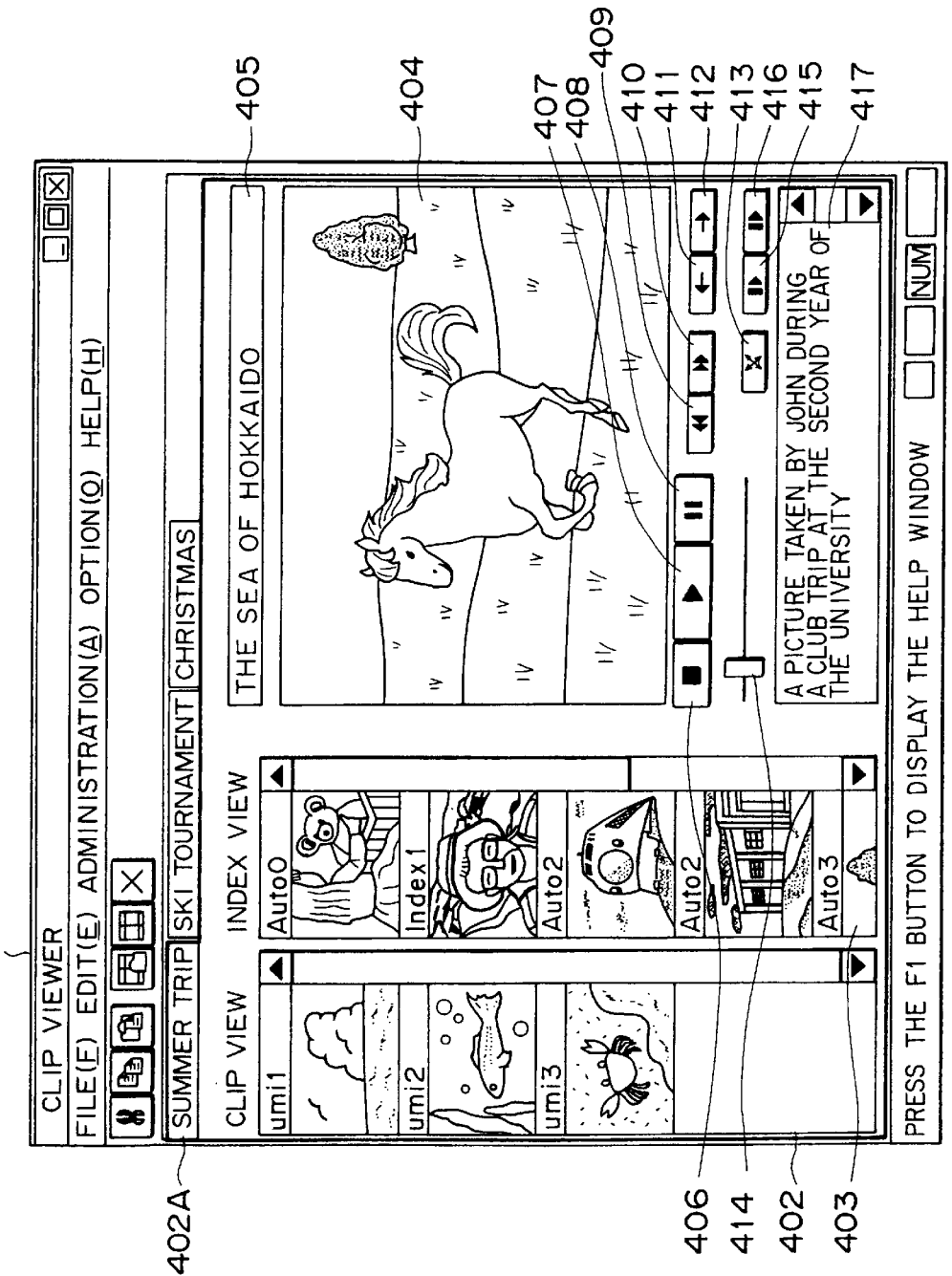

RECORDING APPARATUS, RECORDING METHOD AND RECORDING MEDIUM

BACKGROUND OF THE INVENTION

In general, the present invention relates to a recording apparatus, a recording method and a recording medium. In particular, the present invention relates to a recording apparatus, a recording method and a recording medium wherein the recording apparatus and the recording method are well suited for recording of information including pictures in the recording medium such as a hard disc.

With the increasing speed and the increasing number of functions of the CPU (Central Processing Unit) as well as the increasing storage capacity of the memory, the hard disc and other recording and storage media along with the decreasing price of hardware including the CPU and the recording and the storage media seen in recent years, a high performance computer can be implemented at a price that the personal user can afford.

With the popularization of a high performance computer at such a price, there is a rising user demand for computer functions of carrying out various kinds of processing such as recording, reproduction and editing of a processing object with a large amount of data such as a picture which were impossible so far but can now be implemented through simple user operations.

SUMMARY OF THE INVENTION

It is thus an object of the present invention addressing the problem described above to allow various kinds of processing demanded by the user to be carried out through simple operations.

A recording apparatus for recording information according to claim 1 is characterized in that said apparatus comprises:

a setting means for setting a recording time required for recording said information and for setting bit rate information on a bit rate of said information;

a computing means for computing a required capacity, that is, a recording capacity required for recording said information, from said recording time and said bit rate information set by said setting means;

an allocating means for allocating a required area, that is, a recording area with a size equal to at least said required capacity, in an information recording medium for recording said information; and a recording means for recording said information in said required area.

A recording method for recording information according to claim 7 is characterized in that said method comprises the steps of:

computing a required capacity, that is, a recording capacity required for recording of said information, from a recording time required for recording said information and bit rate information on a bit rate of said information;

allocating a required area, that is, a recording area with a size equal to at least said required capacity, in an information recording medium for recording said information; and recording said information in said required area.

A recording medium for recording a program to let a computer record information according to claim 8 is characterized in that said program prescribes a recording method comprising the steps of:

computing a required capacity, that is, a recording capacity required for recording of said information from a recording time required for recording said information and bit rate information on a bit rate of said information;

allocating a required area, that is, a recording area with a size equal to at least said required capacity, in an information recording medium for recording said information; and recording said information in said required area.

In a recording apparatus for recording information according to claim 1, a setting means sets a recording time required for recording said information and sets bit rate information on a bit rate of said information;

a computing means computes a required capacity, that is, a recording capacity required for recording said information, from said recording time and said bit rate information set by said setting means;

an allocating means allocates a required area, that is, a recording area with a size equal to at least said required capacity, in an information recording medium for recording said information; and a recording means records said information in said required area.

A recording method for recording information according to claim 7 comprises the steps of:

computing a required capacity, that is, a recording capacity required for recording said information, from a recording time required for recording said information and bit rate information on a bit rate of said information;

allocating a required area, that is, a recording area with a size equal to at least said required capacity, in an information recording medium for recording said information; and recording said information in said required area.

In a recording medium for recording program according to claim 8, there is stored a program to let a computer record information in accordance with a recording method which comprises the steps of:

computing a required capacity, that is, a recording capacity required for recording said information from a recording time required for recording said information and bit rate information on a bit rate of said information;

allocating a required area, that is, a recording area with a size equal to at least said required capacity, in an information recording medium for recording said information; and recording said information in said required area.

BRIEF DESCRIPTION OF THE DRAWINGS

Preferred embodiments of the present invention will be described by referring to the following diagrams wherein:

FIG. 5 is a block diagram showing a typical electrical configuration of the personal computer shown in FIGS. 1 and 2;

FIG. 6 and FIG. 6A and FIG. 6B are block diagrams showing a typical configuration of an MPEG1 real time encoder board 213 employed in the personal computer shown in FIG. 5;

FIG. 9A and 9B are diagrams used for explaining normal and endless tapes;

FIG. 10 is a table showing specifications for a variety of video recording modes;

FIG. 14 is a diagram showing a typical format of index data;

FIG. 24 is a diagram showing a clip viewer main window 401.

DETAILED DESCRIPTION OF THE PREFERRED EMBODIMENTS

The present invention will become more apparent from a careful study of the following detailed description of some preferred embodiments with reference to the accompanying diagrams. Before starting the description, in order to clarify the relation between a variety of means cited in claims of the patent specification and the embodiments, characteristics of the present invention are explained by appending an embodiment to each means corresponding to the embodiment as a phrase expressed in a form "implemented typically by an embodiment" enclosed in parentheses as follows.

Figure 8:
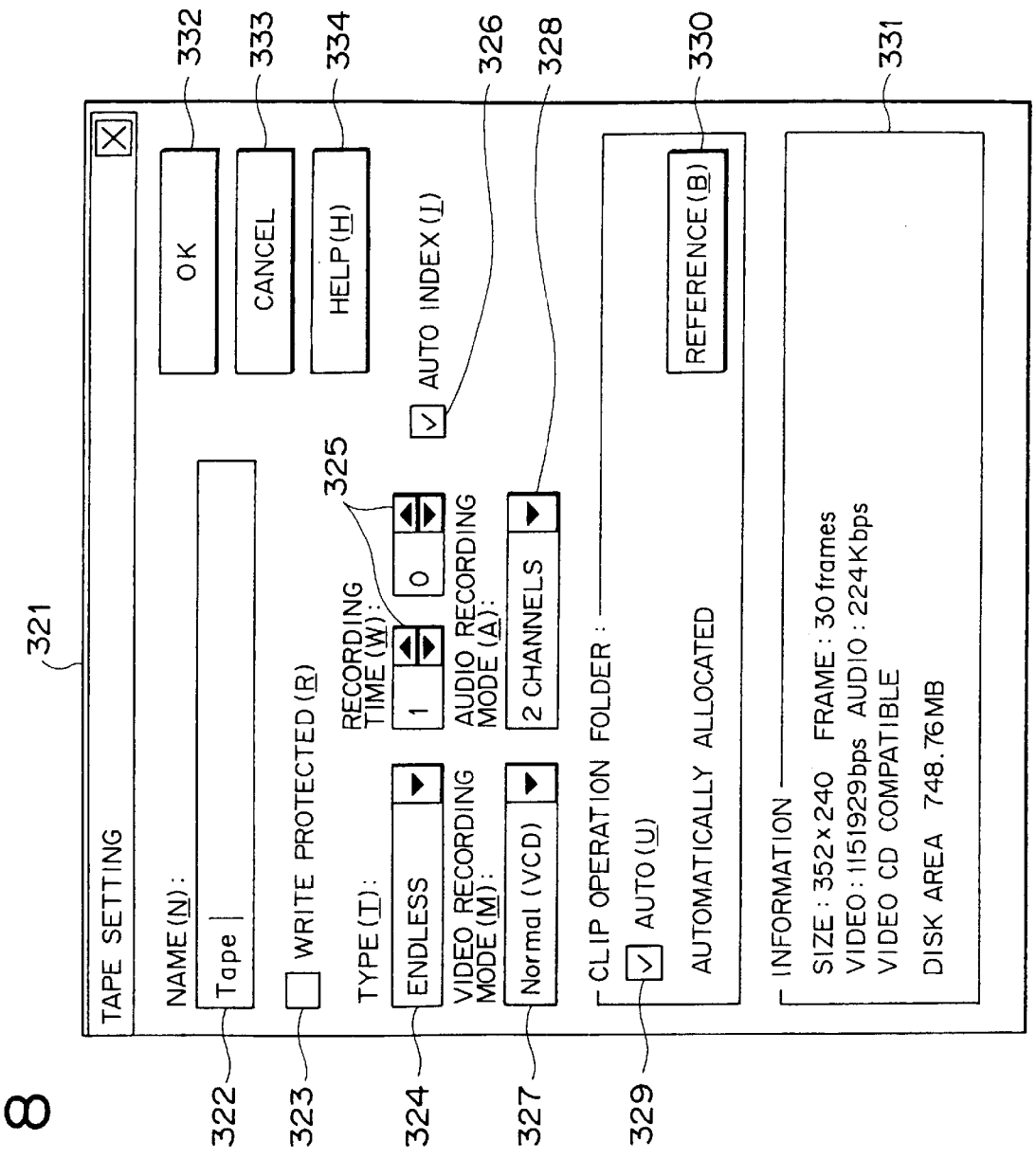
FIG. 8 is a diagram showing a tape setting dialog box 321.
Figure 11:
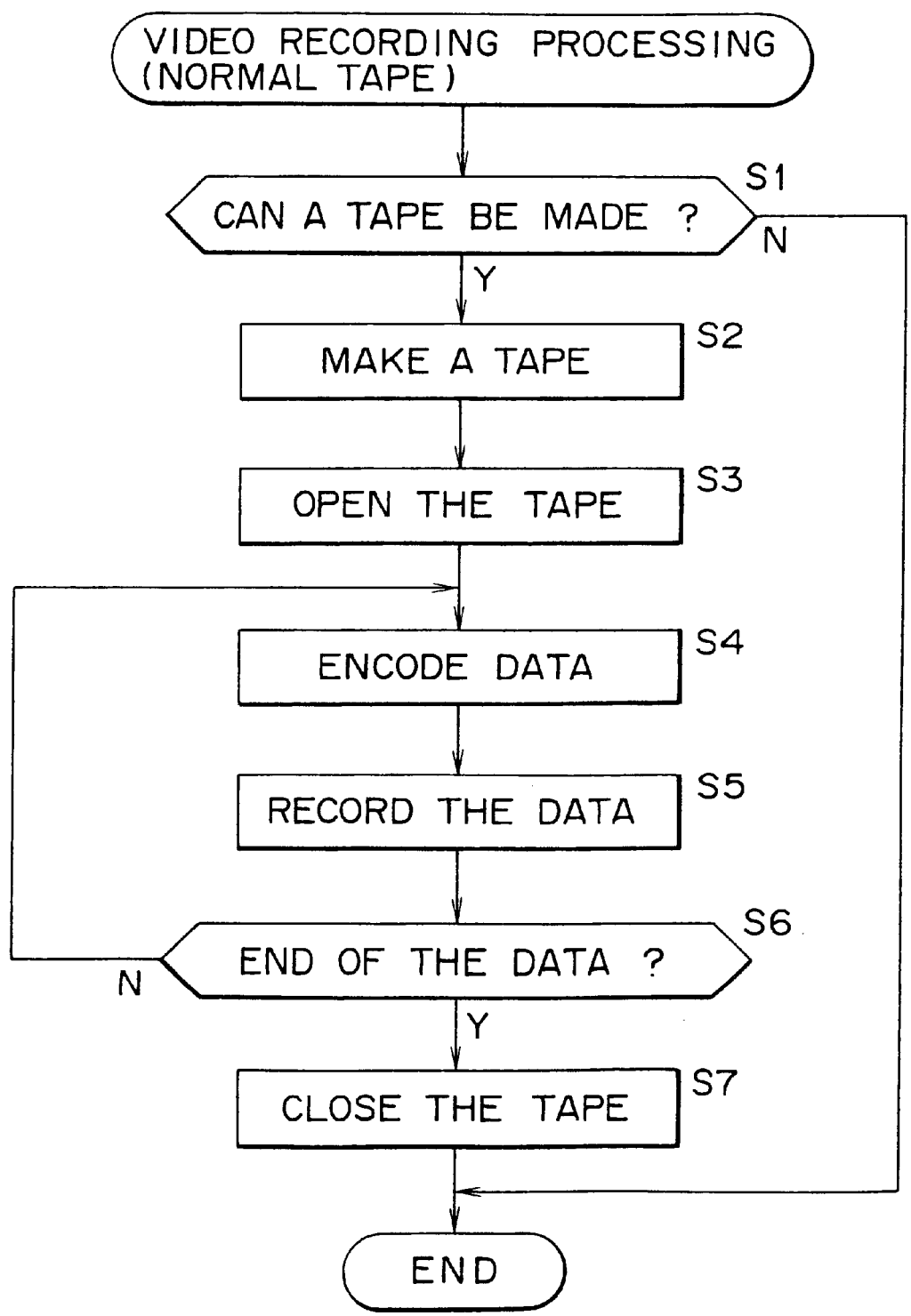
FIG. 11 shows a flowchart representing a recording process wherein a normal tape has been set as a tape used in the recording process.
Figure 12:
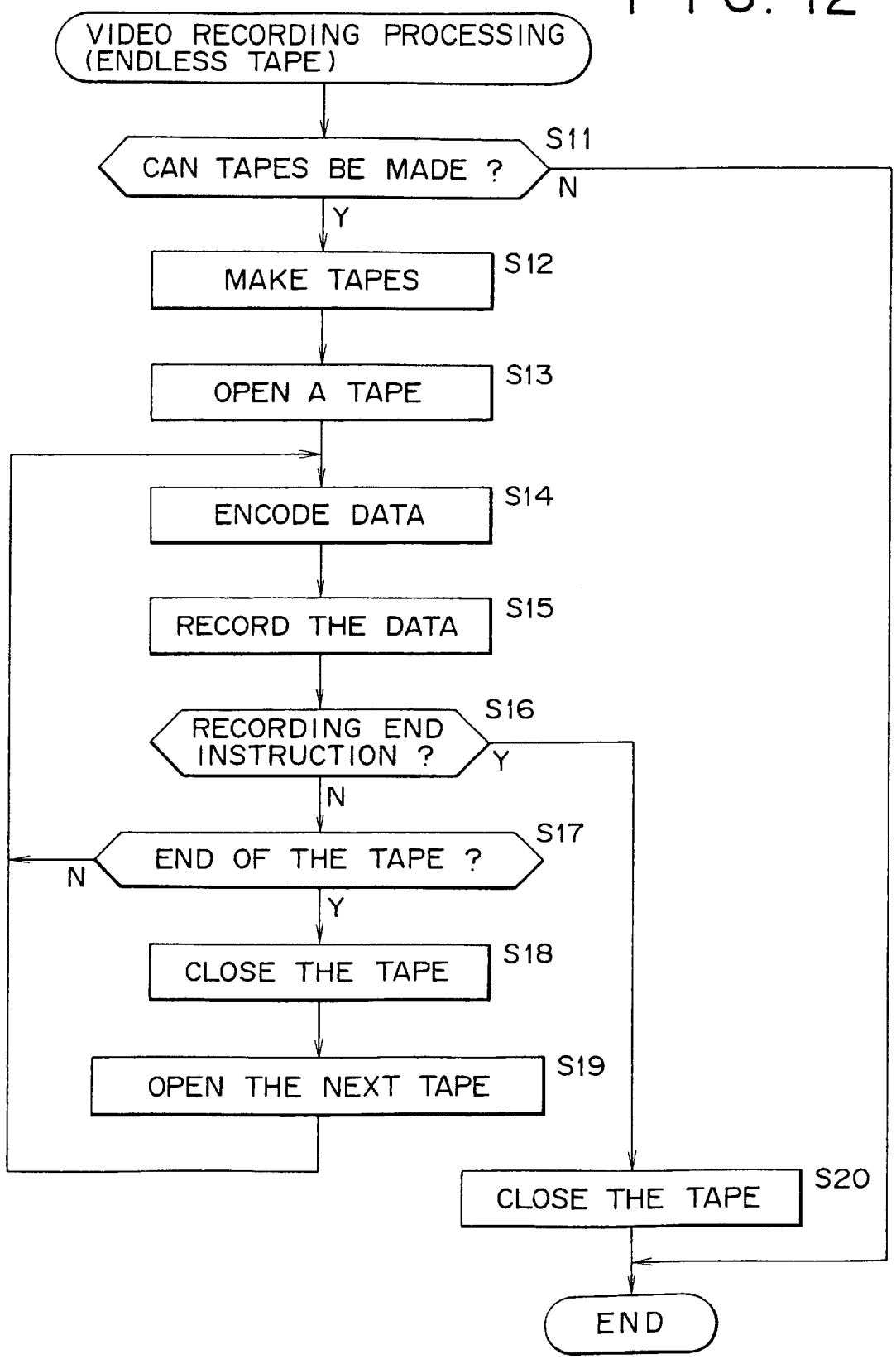
FIG. 12 shows a flowchart representing a recording process wherein an endless tape has been set as a tape used in the recording process.

A recording apparatus for recording information is characterized in that said apparatus comprises:

a setting means (implemented typically by an embodiment such as a tape setting dialog box 321 shown in FIG. 8) for setting a recording time required for recording said information and for setting bit rate information on a bit rate of said information;

a computing means (implemented typically by embodiments such as a processing step S1 of a program shown in FIG. 11 and a processing step S11 of a program shown in FIG. 12) for computing a required capacity, that is, a recording capacity required for recording said information, from said recording time and said bit rate information set by said setting means;

an allocating means (implemented typically by embodiments such as a processing step S2 of the program shown in FIG. 11 and a processing step S12 of the program shown in FIG. 12) for allocating a required area, that is, a recording area with a size equal to at least said required capacity, in an information recording medium for recording said information; and a recording means (implemented typically by embodiments such as a processing step S5 of the program shown in FIG. 11 and a processing step S15 of the program shown in FIG. 12) for recording said information in said required area.

Figure 17:
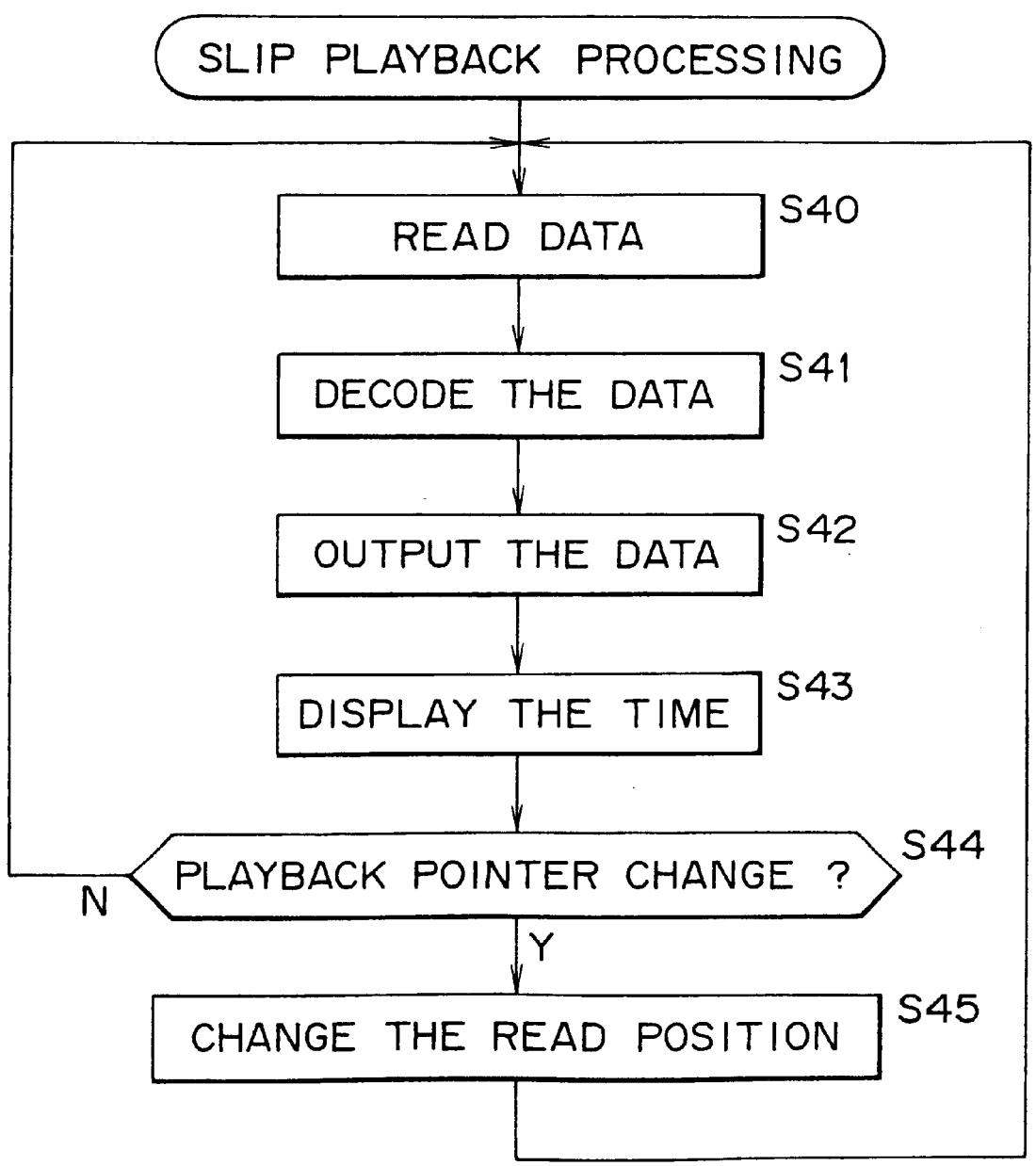
FIG. 17 shows a flowchart representing a slip playback process.

According to claim 3, a recording apparatus claimed as claim 2 is further characterized in that said apparatus also includes a playback means (implemented typically by an embodiment such as a processing step S40 of a program shown in FIG. 17) for playing back said information already recorded in said required area from a range retroactive with respect to a last point of time at which said information is recorded wherein said retroactive range has a size corresponding to said recording time.

Figure 18:
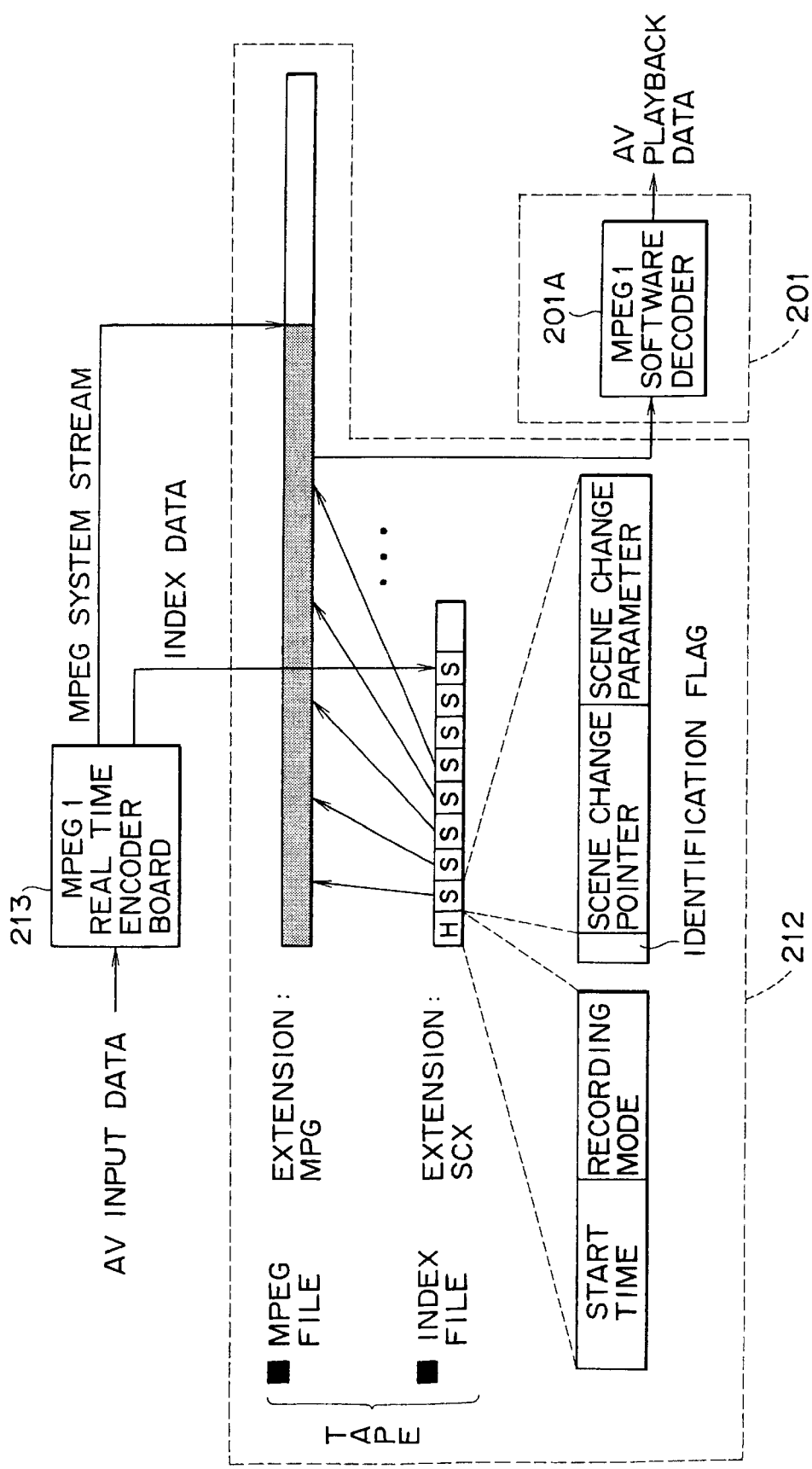
FIG. 18 is a block diagram used for explaining processing carried out by execution of a slip recorder application program.

According to claim 4, a recording apparatus claimed as claim 3 is further characterized in that said apparatus also includes an encoding means (implemented typically by an embodiment such as an MPEG1 real time encoder board 213 shown in FIG. 5) for encoding said information to be recorded by said recording means into said information recording medium and a decoding means (implemented typically by an embodiment such as an MPEG1 software decoder 201A shown in FIG. 18) for decoding said information encoded by said encoding means.

According to claim 6, a recording apparatus claimed as claim 1 is further characterized in that said apparatus also includes an encoding means (implemented typically by an embodiment such as the MPEG1 real time encoder board 213 shown in FIG. 5) for encoding said information to be recorded by said recording means into said information recording medium.

It should be noted that, of course, the embodiments appended to the means associated with the embodiments are not intended to be construed in a limiting sense. That is to say, implementation of a means is not limited to the embodiment appended to the means.

Figure 1:
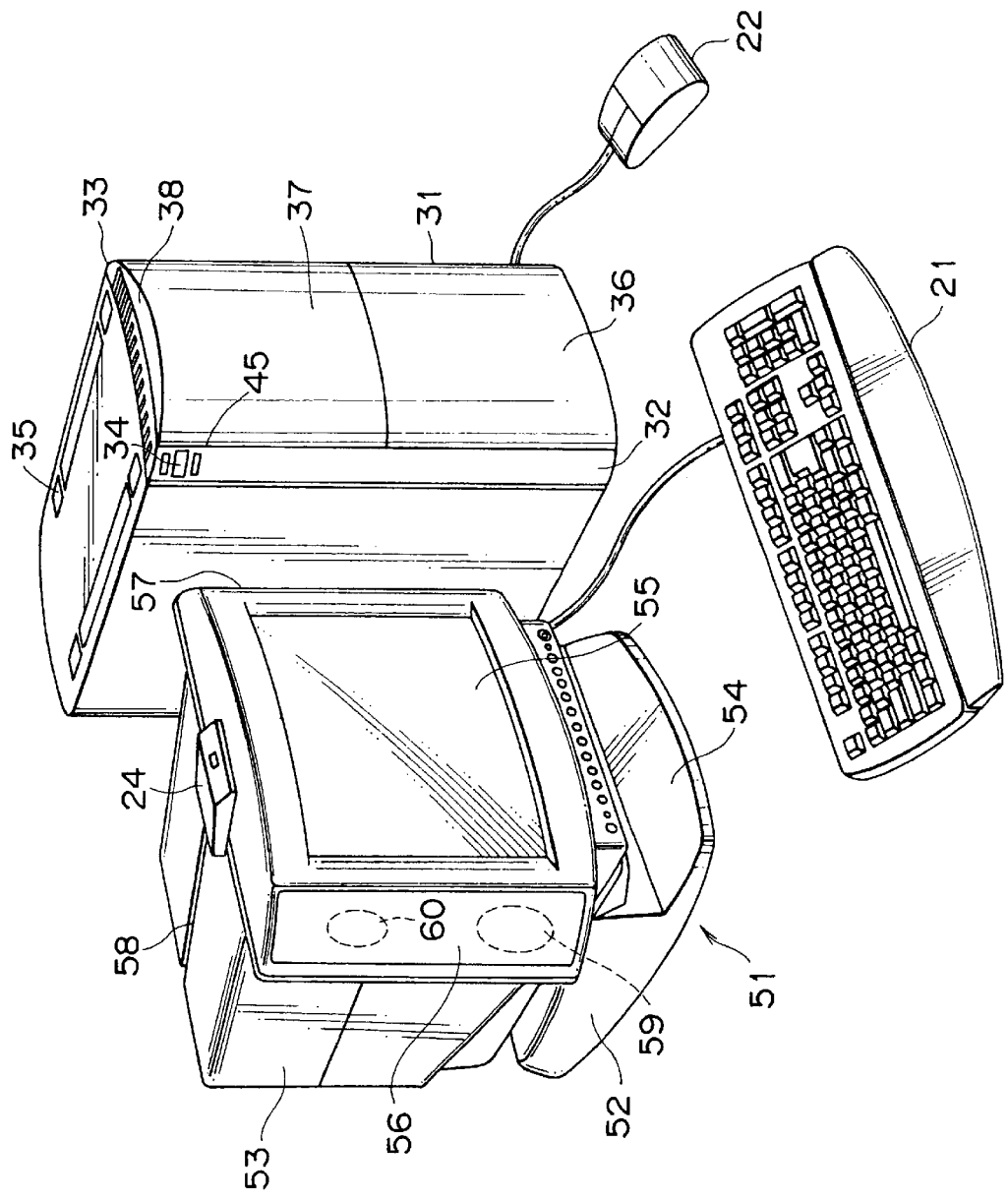
FIG. 1 is a diagram showing an external perspective view of a typical configuration of an embodiment implementing a personal computer to which the present invention is applied.
Figure 2:
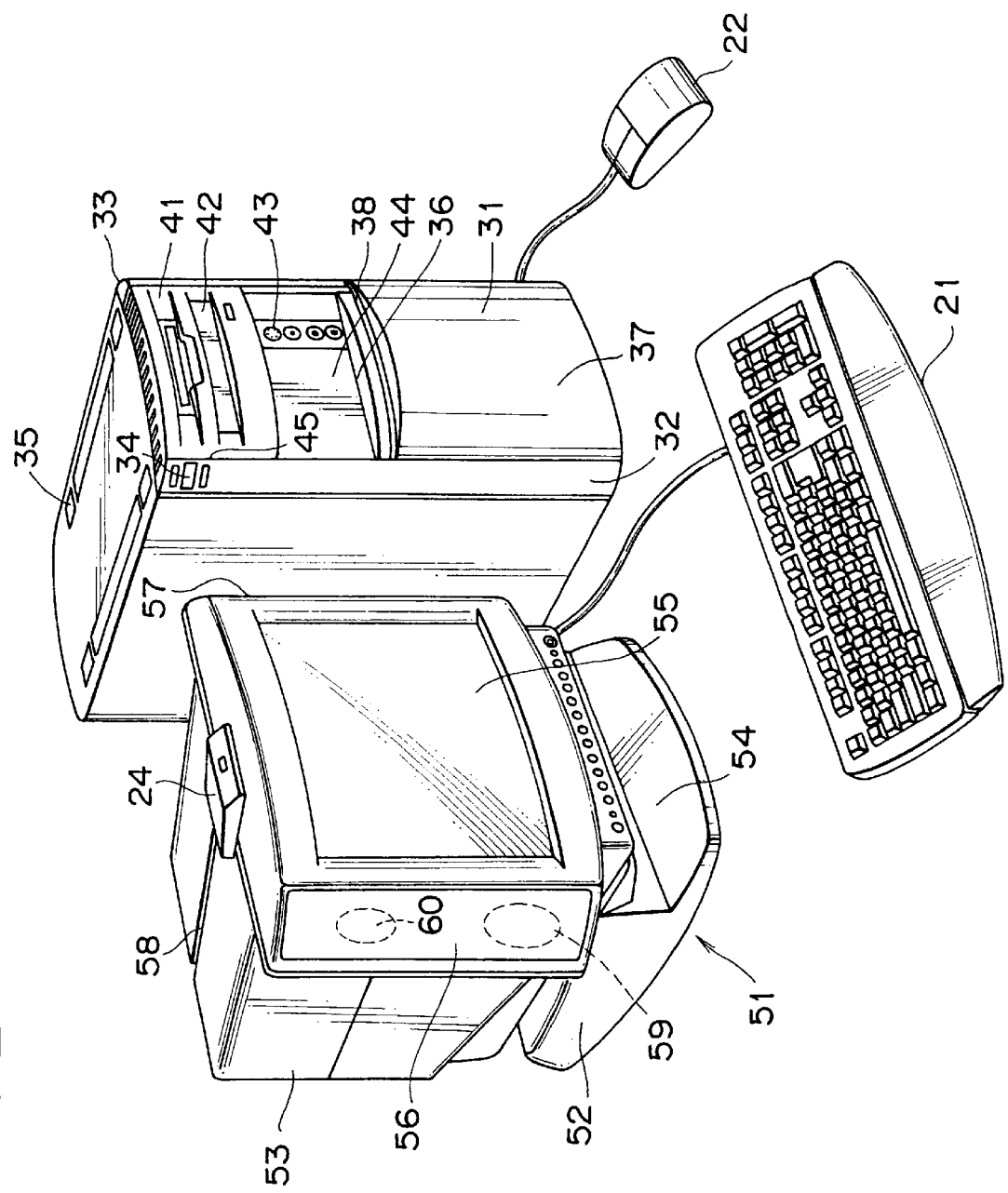
FIG. 2 is a diagram showing an external perspective view of a typical configuration of an embodiment implementing a personal computer to which the present invention is applied.

FIGS. 1 and 2 are diagrams each showing a typical configuration of an embodiment implementing a personal computer to which the present invention is applied.

As shown in the figures, the personal computer comprises a main unit 31, a keyboard 21 as well as a mouse 22 operated by the user for entering a command to the main unit 31 and a display apparatus 51 for displaying a picture.

The main unit 31 is of the so-called mini tower type with a typical width of 225 mm, a typical height of 367.9 mm and a typical depth of 451.5 mm. A right front corner surface 32 is provided between a front surface and a right side surface, diagonally crossing the corner between the front surface and the right side surface. By the same token, a left front corner surface 33 is provided between the front surface and a left side surface, diagonally crossing the corner between the front surface and the left side surface. At the upper portion of the right front corner surface 32, a power supply button 34 is provided. The power supply button 34 is operated to turn on and off the power supply of the main unit 31.

A dent 35 is provided on the top surface of the main unit 31 at a position which will coincide with the feet of a peripheral unit connected to the main unit 31 to be mounted thereon. When the peripheral unit is mounted on the main unit 31, the feet of the peripheral unit are placed in the dent 35 so that the feet of peripheral unit are engaged with the dent 31 of the main unit in a stable state.

The front surface of the main unit 31 comprises a lower panel 36 and an upper panel 37. The lower panel 36 is normally pushed in the outward direction to protrude outward by a force of a spring not shown in the figure. The user can press the lower panel 36 from the outwardly protruding state in a direction toward the inside of the main unit 31 to a dented state, resisting the force of the spring. The upper panel 37 can be moved up and down freely along right and left guides 45. With the lower panel 36 in a protruding state, the motion of the upper panel 37 in the downward direction is blocked by the lower panel 36.

When using the main unit 31, the user presses the lower panel 36 from the outwardly protruding state in a direction toward the inside of the main unit 31 to a dented state, resisting the force of the spring. With the lower panel 36 put in a dented state, the restriction of the motion of the upper panel 37 in the downward direction is removed, allowing the upper panel 37 to be slided in the downward direction along the guides 45. As a result, an FDD (Floppy Disc Drive) 41, a CD-ROM (Compact Disc Read-Only Memory)/CD-R (compact Disc Recordable) drive 42 and an AV (Audio Visual) terminal unit 43 embedded in the main unit 31 are put in a state exposed to the user as shown in FIG. 2. The CD-ROM (Compact Disc Read-Only Memory)/CD-R (compact Disc Recordable) drive 42 is referred to hereafter simply as a CD drive.

It should be noted that the main unit 31 also has an extension unit 44 for allowing other predetermined apparatuses to be installed thereon.

When the use of the personal computer is finished, the user puts a finger thereof on a dent 38 created on the upper portion of the upper panel 37 and moves the upper panel 37 in the upward direction. As the upper panel 37 moves in the upward direction along the guides 45, reaching a predetermined position, the lower panel 36 is restored to the outwardly protruding state by the force of the spring. In this state, the motion of the upper panel 37 in the downward direction is again blocked by the lower panel 36.

As described above, the right front corner surface 32 and the left front corner surface 33 each having a taper shape are provided on the corners between the right side surface and the front surface and the left side surface and the front surface respectively in order to make the width of the main unit 31 looks narrow. In addition, the upper panel 37 provided as part of the front surface of the main unit 31 can be slided freely and serves as a protector of devices accommodated in the main unit 31. When the personal computer is not used, the upper panel 37 is put in a state of concealing the accommodated devices by putting them in an unexposed state. As a result, a flat and simple design image can be implemented.

Taking the potential application to the future AV equipment, the upper panel 37 is designed so that it can be modified into a drawer or rotary type.

Basically, the display apparatus 51 comprises a base 52 and a display unit 53 which is provided in such a way that it can be freely moved in the horizontal direction (pan direction) and the vertical direction (tilt direction) with respect to the base 52. On the front portion of the base 52, a dent 54 is provided.

As the front surface of the display unit 53, a CRT (Cathode Ray Tube) 55 is provided. The CRT 55 serves typically as a high precision 17-inch trinitron monitor. On the right front corner between the right side surface of the display unit 53 and the CRT 55, a right front corner surface 56 having a taper shape is provided. On the inner side of the right front corner surface 56, a lower speaker 59 and an upper speaker 60 are provided. By the same token, on the left front corner between the right side surface of the display unit 53 and the CRT 55, a left front corner surface 56 having a taper shape is also provided and, on the inner side of the left front corner surface 57, a lower speaker 59 and an upper speaker 60 are provided as well. With such components provided, reproduction of a high quality picture and loud high quality stereo sound can be realized.

On the front portion of the top of the display unit 53, a microphone 24 is provided. The microphone 24 is used for inputting voice of the user. In conjunction with the speakers 59 and 60, the microphone 24 can be used for implementing, for example, a hands free phone.

At the center of the top of the display unit 53, a groove 58 is provided. The groove 58 is used for accommodating a cord of the microphone 24. When a television camera of a television telephone is mounted on the display apparatus 51, the cord of the television camera can also be accommodated in the groove 58.

Figure 3:
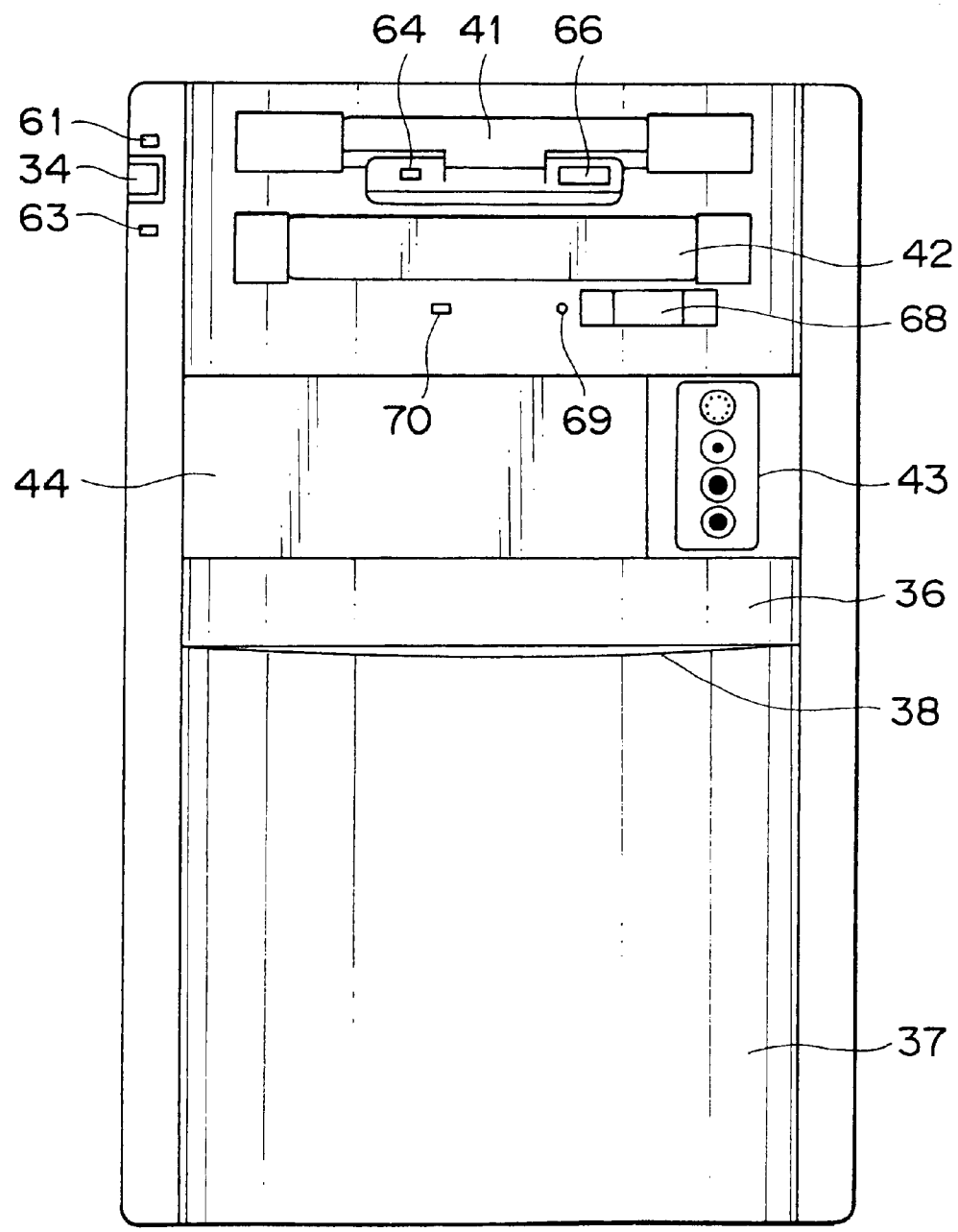
FIG. 3 is a diagram showing a front view of a main unit 31 of the personal computers shown in FIGS. 1 and 2.

FIG. 3 is a diagram showing a typical detailed configuration of the front surface of the main unit 31.

As shown in the figure, a power supply lamp 61 is provided above the power supply button 34 described earlier. The power supply lamp 61 lights up to indicate that the power supply has been turned on. When the power supply is off, on the other hand, the power supply lamp 61 dies out. Beneath the power supply button 34, a hard disc access lamp 63 is provided. As will be described later, the main unit 31 has an embedded hard disc 212 as shown in FIG. 5. When an access is being made to the hard disc 212, the hard disc access lamp 63 lights up. Typically, the hard disc access lamp 63 has an orange color.

The FDD 41 is typically a driver for 3.5-inch FD with a storage capacity of 1.44 MB (megabytes), 1.2 MB or 720 KB (kilobytes). On the front surface of the FDD 41, a floppy disc drive access lamp 64 and a floppy disc inject button 66 are provided. The floppy disc drive access lamp 64 lights up when an access is being made to an FD mounted on the FDD 41. The user presses the floppy disc inject button 66 to take out an FD from the FDD 41.

The CD drive 42 reads out data from a CD-ROM disc not shown in the figure and reads out or writes data from or into a CD-R (CD-R FS) disc 211 shown in FIG. 5. It should be noted that the CD drive 42 typically reads out data at an 8-time speed and writes data at a double speed.

On the front surface of the CD drive 42, an eject button 68, an eject hole 69 and an access lamp 70 are provided. The eject button 68 is operated to draw a tray of the CD drive 42. The eject hole 69 is operated in case the tray can not be drawn by pressing the eject button 68. That is to say, a stick with a sharp end is introduced into the eject hole 69 to draw the tray. The access lamp 70 lights up when an access is being made to a CD-ROM or the CD-R disc 211 mounted on the CD drive 42.

The AV terminal unit 43 comprises an S video input terminal, a video input terminal for a composite signal and 2 audio input terminals (pin jacks) for L (left) and R (right) channels. Pictures and sound recorded by a video camera or a VTR (Video Tape Recorder) to be edited by this personal computer are entered through the terminals of the AV terminal unit 43.

Figure 4:
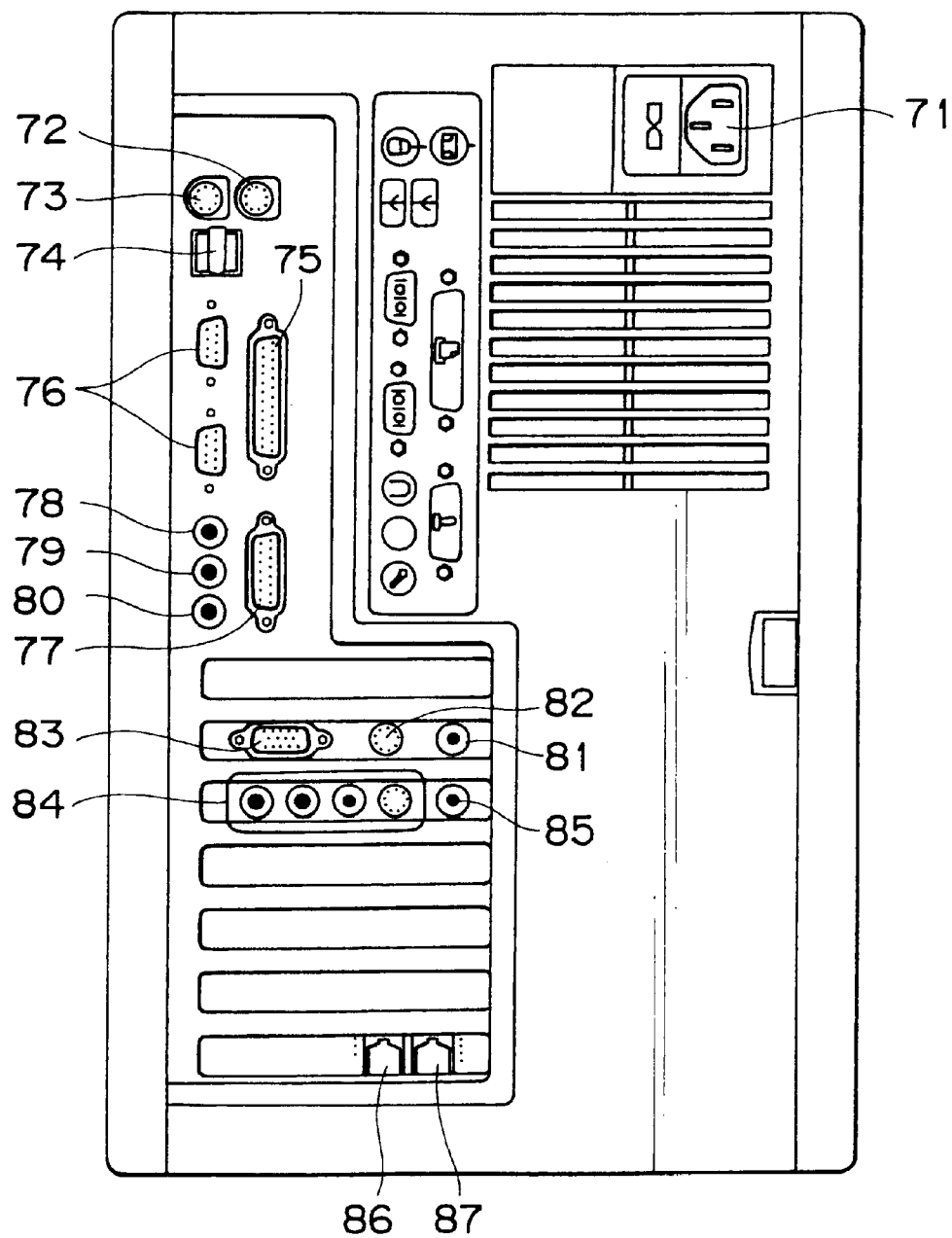
FIG. 4 is a diagram showing a rear view of the main unit 31 shown in FIG. 3.

FIG. 4 is a diagram showing a typical detailed configuration of the rear surface of the main unit 31.

At the right upper corner of the rear surface of the main unit 31, a power supply input terminal 71 is provided. A power supply cord not shown in the figure is connected to the power supply input terminal 71 to supply power to the main unit 31.

At the left upper corner of the rear surface of the main unit 31, a keyboard terminal 72 and a mouse terminal 73 are provided. The keyboard terminal 72 and the mouse terminal 73 are connected to the keyboard 21 and the mouse 22 respectively. Beneath the mouse terminal 73, a USB (Universal Serial Bus) terminal 74 is provided. The USB terminal 74 is used for connecting an apparatus conforming to USB specifications to the main unit 31. Below the USB terminal 74, a printer terminal 75 and 2 serial terminals 76 are provided. The printer terminal 75 is connected to a printer or an image scanner. Typically, an infrared communication adapter is connected to one of the serial terminals 76. That is to say, in this embodiment, by connecting one of the serial terminals 76 to an infrared adapter which serves as an infrared communication interface, infrared communication can be implemented between the main unit 31 and another apparatus.

Beneath the printer terminal 75, a game terminal 77 is provided. The game terminal 77 is connected typically to a joy stick or a MIDI (Musical Instrument Digital Interface) apparatus.

Below the serial terminal 76, a headphone terminal 78, a line input terminal 79 and a microphone terminal 80 are provided one beneath another in an order they are enumerated. Typically, the headphone terminal 78, the line input terminal 79 and the microphone terminal 80 are connected respectively to an external speaker, an audio apparatus and the microphone 24 shown in FIGS. 1 and 2.

It should be noted that, on the right side of each of the terminals described above, pictures are shown to indicate what device or apparatus is to be connected to the terminal.

Below the microphone terminal 80, a video output terminal 81 for a composite signal, an S video output terminal 82 and a monitor terminal 83 are provided. A composite video signal and an S video signal are output from the video output terminal 81 for a composite signal and the S video output terminal 82 respectively. The monitor terminal 83 is connected to the display apparatus 51.

Beneath the video output terminal 81 for a composite signal, the S video output terminal 82 and the monitor terminal 83, an AV terminal unit 84 is provided. Much like the AV terminal unit 43 on the front surface, the AV terminal unit 84 comprises an S video input terminal, a video input terminal for a composite signal and 2 audio input terminals for the L and R channels.

On the right side of the AV terminal unit 84, an antenna terminal 85 is provided, allowing a television signal typically in a VHF (Very High Frequency) band and in a UHF (Ultra High Frequency) band to be received.

On a further lower part of the rear surface of the it main unit 31, a line jack 86 and a telephone jack 87 are provided. The line jack 86 is connected to a telephone line and the telephone jack 87 is connected to typically a telephone set or a facsimile apparatus.

FIG. 5 is a diagram showing a typical electrical configuration of the personal computer shown in FIGS. 1 and 2.

In this embodiment, the personal computer is provided with an embedded MPEG1 (Moving Picture Experts Group) real time encoder board 213 which in turn has an embedded TV (Television) tuner 213A. The personal computer is also provided with application programs as a standard for carrying out editing, recording, reproduction as well as MPEG decoding of pictures and other picture processing. The MPEG1 real time encoder board 213 and the application programs allow the editing of pictures and sound taken by a video camera 214, the creation of a video CD for recording pictures and sound obtained as a result of the editing and other processing to be carried out with ease. In addition, a television broadcast program received by the TV tuner 213A can also be recorded with ease and other processing can be carried out easily as well. On the top of that, while a television broadcast program received by the TV tuner 213A is being recorded, any arbitrary scene of an already recorded video signal or pictures can be played back with ease.

To put it in detail, a microprocessor 201 carries out editing, recording, reproduction as well as MPEG encoding of pictures and other predetermined picture processing by execution of a variety of application programs stored in the hard disc 212 under control of an operating system such as Windows 95 (trademark) made by Microsoft which is also stored in the hard disc 212. As the microprocessor 201, the Pentium II processor of Intel with a frequency of 266 MHz and an embedded secondary cache memory of 512 KB not shown in the figure is employed. The Pentium II processor is the Pentium Pro processor also made by Intel with an MMX technology and a facility to generate optimized 16-bit code added thereto. Provided with such a processor, the personal computer is capable of displaying a high performance even when processing a large amount of picture and sound data. It should be noted that Pentium and MMX are trademarks.

A main memory unit 202 is used for storing a program to be executed by the microprocessor 201 and data required in operations carried out by the microprocessor 201. As a standard, the main memory unit 202 has a storage capacity of typically 32 MB which allows processing of, for example, a picture with a large amount of data to be carried out at a high speed. It should be noted that the storage capacity of the main memory unit 202 can be increased up to typically 128 MB by memory extension.

A bus bridge 204 controls exchanges of data between an internal bus and an extension bus such as a PCI (Peripheral Component Interconnect) local bus or an ISA (Industry Standard Architecture) bus.

The microprocessor 201, the main memory unit 202 and the bus bridge 204 are connected to each other by the internal bus. On the other hand, the remaining blocks are connected to each other by the extension bus. It should be noted that the bus bridge 204 is connected to both the internal bus and the extension bus.

As a modem 206, a 33.6-Kbps (bits per second) DSVD/DATA/FAX modem is employed. The modem 206 controls communication through a telephone line. The modem 206 receives a picture and sound from a source such as the Internet to be subjected to processing such as encoding and editing. On the other hand, the modem 206 is also capable of transmitting a picture and sound completing processing such as encoding and editing to an external destination. In addition, the modem 206 transmits sound input through the microphone 24 and receives incoming sound to output to the speakers 59 and 60, allowing a hands free phone to be implemented. It should be noted that, when the modem 206 is used as a FAX modem, the transfer rate is set at 14.4 Kbps.

An I/O (Input/Output) interface unit 207 generates an operation signal representing an operation carried out by the user on the keyboard 21 or the mouse 22. In addition, the I/O interface unit 207 also functions as an interface for receiving an electrical signal as an audio signal output by the microphone 24.

An auxiliary storage interface unit 210 functions as an interface of reading out and writing data from and onto recording media such as the CD-R (Compact Disc Recordable) disc 211, a CD-ROM disc not shown in the figure, the HD (Hard Disc) 212 and an FD also not shown in the figure.

On the CD-R disc 211, pictures and sound encoded by the MPEG1 real time encoder board 213 is stored, allowing a user original video CD to be made. It should be noted that the CD drive 42 is also capable of handling a CD-R FS disc. Data of up to about 650 MB can be stored in the CD-R disc 211 whereas a CD-R FS disc is capable of storing data of up to only about 520 MB.

The hard disc 212 has a typical storage capacity of 4.3 GB (gigabytes) which is capable of keeping up with a high speed bus master IDE (Integrated Drive Electronics) transfer. The hard disc 212 is used for storing typically data obtained as a result of compression and encoding carried out by the MPEG1 real time encoder board 213 and data required in processing carried out by the microprocessor 201. It should be noted that the main unit 31 is designed to allow an SCSI (Small Computer System Interface) board to be installed therein. With the SCSI board installed, a hard disc drive having an SCSI interface can be added.

In addition, the hard disc 212 is also used for storing an operating system as well as software including application programs to be executed by the microprocessor 201 to carry out processing such as recording, reproduction, editing and decoding of pictures.

As an application program for the so-called video creation through processing such as recording, reproduction and editing of pictures, a software called Slipclip is installed.

The Slipclip software comprises 5 application programs called as a Slip recorder, a clip editor, a clip viewer, a video CD creator and a video CD copy tool.

The slip recorder is executed to record a picture and sound or to play back a recorded picture and sound. The clip editor is executed to edit a recorded picture and its accompanying sound. The clip viewer is executed to administer recorded pictures and sound. A video CD creator is executed to record an edited picture or other data onto a CD-R disc 211 in order to make a video CD. The video CD copy tool is executed to make a copy video CD of a video CD made earlier.

It should be noted that, in the present embodiment, only a picture obtained as a result of editing work done in the main unit 31 can be copied in order to prevent a so-called pirate disc from being made illegally.

Among the slip recorder, the clip editor, the clip viewer, the video CD creator and the video CD copy tool, only the slip recorder, the clip editor and the clip viewer relate to recording, reproduction and editing of a picture in particular and will be explained one after another later.

In the hard disc 212, there is further stored an application program to be executed by the microprocessor 201 to decode data encoded by the MPEG1 real time encoder board 213 typically in conformity with MPEG1 specifications. Thus, in this case, a picture is encoded by hardware and decoded by software. It should be noted that a picture can also be encoded by software and decoded by hardware.

The encoder board 213, strictly speaking, the MPEG1 real time encoder board 213, encodes a picture and sound in a real time manner typically in conformity with the MPEG1 specifications. To be more specific, the MPEG1 real time encoder board 213 is capable of encoding a picture and sound in 4 different video recording modes including a mode of encoding at a high bit rate for high quality picture recording and a mode of encoding at a low bit rate for transmission. As will be described later, enumerated in an order of decreasing bit rates, the video recording modes are "High", "Normal", "Long" and "Network". It should be noted that the normal video recording mode conforms to video CD specifications. When pictures and sound are encoded in this video recording mode, recording of about 100 minutes per 1 GB can be carried out.

As described above, the MPEG1 real time encoder board 213 has an embedded TV tuner 213A for receiving a television broadcast program. A program received by the TV tuner 213A is subjected to MPEG encoding in the MPEG1 real time encoder board 213. In addition, the MPEG1 real time encoder board 213 is also capable of encoding data supplied thereto by way of the extension bus, data supplied thereto by way of the AV processing circuit 215 and data supplied thereto from an external apparatus such as the video camera 214. An example of data supplied thereto by way of the AV processing circuit 215 is a picture played back by the VTR 216.

It should be noted that the TV tuner 213A allows typically 62 channels, from Channel 1 to Channel 62, to be selected. As for its audio facility, stereo and bilingual programs can be received.

The video camera 214 is used typically for taking a picture to be supplied to the MPEG1 real time encoder board 213. It should be noted that the MPEG1 real time encoder board 213 also has a function for interfacing with the video camera 214, allowing a picture and sound taken by the video camera 214 to be supplied to the MPEG1 real time encoder board 213.

The AV processing circuit 215 comprises components including a VGA (Video Graphic Array) and a 3-dimensional accelerator which are not shown in the figure. The AV processing circuit 215 carries out processing required for displaying graphics and other information on the display apparatus 51. In addition, the AV processing circuit 215 also carries out processing required for outputting sound to the speakers 59 and 60. The AV processing circuit 215 has an embedded NTSC encoder 215A which is used for converting a picture into one conforming to the NTSC system before outputting the picture to typically the VTR 216.

The AV processing circuit 215 is connected to the MPEG1 real time encoder board 213 typically by an AMC bus. The MPEG1 real time encoder board 213 is designed so that a picture subjected to MPEG encoding is once stored in a frame memory unit 110 shown in FIG. 6. The frame memory unit 110 will be described more later. When an instruction to monitor a picture subjected to MPEG encoding is received, the picture is read out from the frame memory unit 110 and supplied from the MPEG1 real time encoder board 213 to the AV processing circuit 215 by way of the AMC bus. The AV processing circuit 215 then displays the picture on the display apparatus 51.

To put it in detail, the AV processing circuit 215 draws a drawing on a VRAM (Video RAM (Random Access Memory)) unit 203 and outputs the drawing to the display apparatus 51.

The VTR 216 records pictures and sound output by the AV processing circuit 215 if necessary.

Figure 6A:
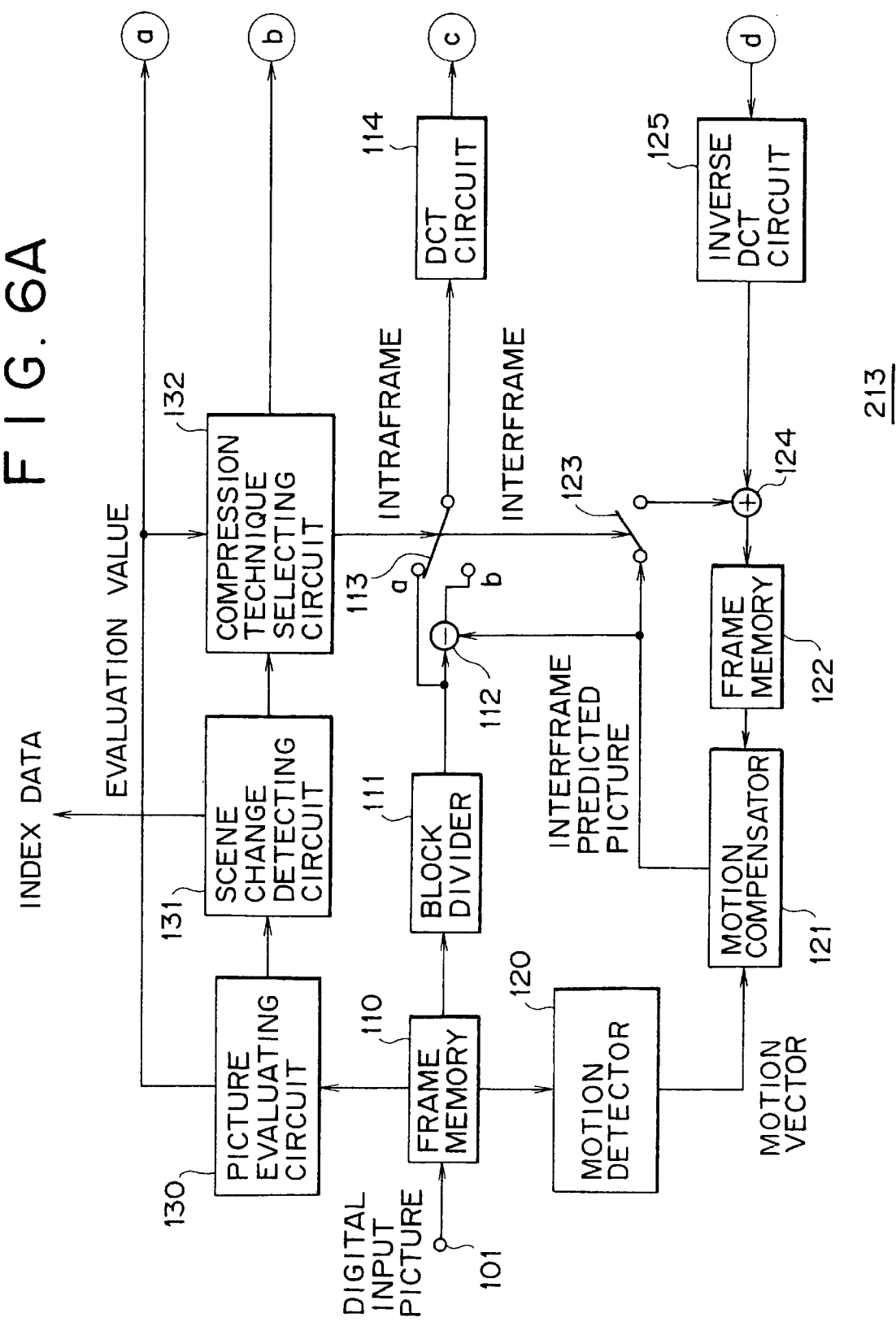

FIG. 6 is a diagram showing a typical configuration of the MPEG1 real time encoder board 213 employed in the personal computer shown in FIG. 5. It should be noted that FIG. 6 shows only blocks relating to MPEG encoding. Other blocks such as blocks constituting the TV tuner 213A are omitted from the figure. Speaking more strictly, FIG. 6 shows only blocks relating to MPEG encoding of a picture. Blocks relating to MPEG encoding of sound are also omitted from the figure.

Digital picture data of 1 frame composed of a predetermined number of pixels is supplied to an input terminal 101 at a typical transfer rate of about 30 frames per second.

Picture data supplied through the input terminal 101 is temporarily stored in the memory frame unit 110 which is capable of storing a plurality of frames of picture data, typically, 27 frames of picture data, so that the frames can be rearranged into a predetermined order. The picture data is then supplied to a block divider 111 and a motion detector 120. The block divider 111 divides a frame of the picture data supplied from the memory frame unit 110 into luminance components of typically 8×8 pixels and blocks of chroma components Cb and Cr. A macroblock (MB) comprises a total of 6 blocks, namely, 4 luminance component blocks and 1 Cb chroma component block as well as 1 Cr chroma component block which are associated with the 4 luminance component blocks.

The block divider 111 supplies the picture data to a subtractor 112 in macroblock units. The subtractor 111 computes a difference between the picture data supplied by the block divider 111 and interframe predicted picture data to be described later and supplies the difference to a switched terminal b of a change-over switch 113 as data of a frame subjected to interframe prediction encoding also to be described later. On the other hand, picture data output by the block divider 111 is supplied to a switched terminal a of the change-over switch 113 as data of a frame subjected to intraframe prediction encoding also to be described later.

The change-over switch 113 selects either the switched terminal a or b and picture data supplied to the selected switched terminal is passed on to a DCT (Discrete Cosign Transformation) circuit 114 in block units. The DCT circuit 114 carries out DCT processing on picture data passed on thereto and outputs a DCT coefficient obtained as a result of the DCT processing to a quantizer 115. The quantizer 115 quantizes the DCT coefficient supplied thereto by the DCT circuit 114 at a predetermined quantization step and outputs a quantized coefficient obtained as a result of the quantization to a zigzag scan circuit 116.

The zigzag scan circuit 116 carries out zigzag scanning on quantized coefficients of each block and outputs the scanned coefficients to a VLC (Variable Length circuit 117 in the scanning order. The VLC circuit carries out VLC processing on the quantized coefficients supplied thereto by the zigzag scan circuit 116 and supplies variable length encoded data obtained as a result of the VLC processing to an output buffer 118. The output buffer 118 has a storage capacity of typically 160 KB. By temporarily storing the variable length encoded data received from the VLC circuit 117, the output buffer 118 carries out a function of mainly smoothing of the amount of data to be output to an output terminal 102. Data appearing at the output terminal 102 is supplied typically to the hard disc 212 to be stored therein.

In addition, the output buffer 118 also supplies information on the amount of data stored temporarily therein to a quantization step controller 119. The quantization step controller 119 sets the quantization step at such a value that neither overflow nor underflow occurs in the output buffer 118 and outputs the value of the quantization step to the quantizer 115. As described above, the quantizer 115 quantizes a DCT coefficient supplied thereto by the DCT circuit 114 at a predetermined quantization step, that is, a quantization step supplied by the quantization step controller 119.

On the other hand, the quantizer 115 also supplies a quantized coefficient to an inverse quantizer 126 in addition to the zigzag scan circuit 116 described above. The inverse quantizer 126 carries out inverse quantization on the quantized coefficient supplied by the quantizer 115 and supplies a DCT coefficient obtained as a result of the inverse quantization to an inverse DCT circuit 125. The inverse DCT circuit 125 carries out inverse DCT processing on the DCT coefficient and outputs data obtained as a result of the inverse DCT processing to an adder 124. Also supplied to the adder 124 is interframe predicted picture data supplied by a motion compensator 121 by way of a turned on change-over switch 123 which is turned on when a frame subjected to interframe prediction encoding is processed. The adder 124 adds the data output by the inverse DCT circuit 125 to the interframe predicted picture data supplied by the motion compensator 121 and outputs the sum to a frame memory unit 122.

The motion compensator 121 compensates data stored in the frame memory unit 122 for a motion in accordance with a motion vector output by the motion detector 120. Interframe predicted picture data obtained as a result of the compensation is supplied to the subtractor 112 as described earlier and the change-over switch 123.

Frames composing a picture, strictly speaking, a moving picture, to be encoded are arranged in a display order starting with the head as follows: I0, B1, B2, P3, B4, B5, P6, B7, B8, I9, B10, B11, B12, - - - . The symbols I, P and B indicate that frames denoted thereby are an I picture, a P picture and a B picture respectively and a number appended to a symbol indicates a position in the display order.

In the MPEG system, first of all, a picture I0 is encoded. Then, a picture P3 is supposed to be encoded. In this case, however, instead of encoding the picture P3 itself, a difference between the pictures P3 and I0 is encoded. Subsequently, a picture B1 is supposed to be encoded, however, instead of encoding the picture B1 itself, a difference between the pictures B1 and I0 or P3 or a difference between the picture B1 and an average of the pictures I0 and P3 is encoded. In this case, one is selected among the picture I0, the picture P3 and the average of the pictures I0 and P3 so that a so-called predicted residual obtained as a result of the encoding is minimum. That is to say, the encoding of a difference between the picture B1 and the selected one results in data with a minimum amount.

After the encoding of the picture B1, a picture B2 is supposed to be encoded, however, instead of encoding the picture B2 itself, a difference between the pictures B2 and I0 or P3 or a difference between the picture B2 and an average of the pictures I0 and P3 is encoded. In this case, one is selected among the picture I0, the picture P3 and the average of the pictures I0 and P3 so that the so-called predicted residual obtained as a result of the encoding of a difference between the picture B2 and the selected one results in data with a minimum amount.

Subsequently, a picture P6 is supposed to be encoded, however, instead of encoding the picture P6 itself, a difference between the pictures P6 and P3 is encoded. Thereafter, encoding is carried out by following the same procedure.

A picture supposed to be encoded and a partner cture whose difference from the picture supposed to be coded is actually encoded form a pair. Such pairs are sted in the following table in an encoding order. coding order Picture to be encoded Partner picture

| Encoding order | Picture to be encoded | Partner picture |
| --- | --- | --- |
| 1 | I0 | — |
| 2 | P3 | I0 or P3 |
| 3 | B1 | I0 or P3 |
| 4 | B2 | I0 or P3 |
| 5 | P6 | P3 |
| 6 | B4 | P3 or P6 |
| 7 | B5 | P3 or P6 |
| 8 | P9 | P6 |
| 9 | B7 | P6 or P9 |
| 10 | B8 | P6 or P9 |
| 11 | I9 | — |
| 12 | P12 | I9 |
| 13 | B10 | I9 or P12 |
| 14 | B11 | I9 or P12 |
| | — | |
| | — | |
| | — | |

As shown in the above table, the encoding order is I0, P3, B1, B2, P6, B4, B5, P9, B7, B8, I9, P12, B10, B11, - - - and, thus, different from the display order. Data after the encoding is output in such an order.

It should be noted that, in the case of a P picture or a B picture, as described above, it is normal to encode a difference between the P picture or the B picture from another picture. If the amount of data obtained as a result of the encoding of the picture itself is smaller than that obtained as a result of encoding the difference, nevertheless, the picture itself is encoded.

In the MPEG1 real time encoder board 213 shown in FIG. 6, encoding is carried out as described above.

Thus, in an operation to encode the first picture I0, data of the picture is read out from the frame memory unit 110 and supplied to the block divider 111 to be divided into blocks. To be more specific, the data of the picture is divided by the block divider 111 in a blocking process into the 4 luminance blocks and the Cb and Cr chrominance blocks described earlier which are output sequentially one block after another. In an operation to encode an I picture, the change-over switch 113 is set at the switched terminal a. Thus, picture data output by the block divider 111 is supplied to the DCT circuit 114 by way of the change-over switch 113. In the DCT circuit 114, picture data supplied thereto in block units is subjected to vertical horizontal 2 dimensional DCT processing. As a result, picture data on the time axis is converted into DCT coefficients of data on a frequency axis.

The quantizer 115 quantizes a DCT coefficient supplied thereto by the DCT circuit 114 at a quantization step determined by the quantization step controller 119 and outputs a quantized coefficient obtained as a result of the quantization to the zigzag scan circuit 116. The zigzag scan circuit 116 carries out zigzag scanning on quantized coefficients of each block and outputs the scanned coefficients to the VLC circuit 117 in the scanning order.

The VLC circuit 117 carries out variable length coding processing such as Huffman coding on the quantized coefficients supplied thereto by the zigzag scan circuit 116 and supplies variable length encoded data obtained as a result of the variable length coding processing to the output buffer 118 to be stored therein temporarily. Then, the variable length encoded data is output by the buffer 118 at a fixed bit rate. Thus, the output buffer 118 plays the role of a so-called buffer memory allowing data generated irregularly to be output at a fixed bit rate.

As described above, the picture I0, an I (intra) picture, is encoded alone without involving other pictures in the encoding. Such encoding of a picture alone without involving other pictures is referred to hereafter as intraframe encoding. It should be noted that a picture completing inframe encoding is decoded in accordance with a reversed procedure opposite to the procedure described above.

Next, the encoding of the second picture P3 is described. The second and subsequent pictures can also be encoded as an I picture. By doing so, however, the compression ratio of the encoding will be low. In order to solve this problem, utilizing the fact that correlation among consecutive pictures exists, the second and subsequent pictures are encoded as follows.

The motion detector 120 detects a portion of the first picture I0 that well resembles one of macroblocks composing the second picture P3 for each of the macroblocks. A vector representing a shift in positional relation between a macroblock and a portion that well resembles the macroblock is detected as a motion vector. Described in documents such as the ISO/ISC 11172-2 annex D.6.2, the method of detecting a motion vector is not described in this specification.

As for the second picture P3, instead of supplying its blocks to the DCT circuit 114 as they are, a difference between a P3 block and a block obtained from the first picture I0 as a result of motion compensation carried out by the motion compensator 121 in accordance with a motion vector of the block is computed by the subtractor 112 for each block and supplied to the DCT circuit 114 by way of the change-over switch 113.

In this case, if the correlation between a block obtained as a result of motion compensation of the first picture I0 in accordance with a motion vector and a block of the second picture P3 is good, the difference between the blocks is small. In this case, the amount of data obtained as a result of encoding the difference is smaller than the amount of data obtained as a result of intraframe encoding of a block of the second picture P3.

The technique of encoding a difference between blocks is referred to hereafter as interframe encoding.

It should be noted, however, that the amount of data obtained as a result of interframe encoding of a difference between 2 blocks is not always smaller than the amount of data obtained as a result of intraframe encoding. Depending on the complexity of a picture being encoded and the degree of correlation between a frame and an immediately preceding frame, the amount of data obtained as a result of interframe encoding of a difference between 2 blocks may be adversely larger than the amount of data obtained as a result of intraframe encoding, resulting in a higher compression ratio for the latter encoding. In such a case, the intraframe encoding is preferred and implemented instead. A decision as to whether interframe encoding or intraframe encoding is to be carried out can be made for each macroblock.

By the way, in order to carry out interframe encoding, that is, in order to find a difference between a current picture and the picture immediately preceding the current picture, it is necessary to find in advance a locally decoded immediately preceding picture obtained by locally decoding encoded data of the immediately preceding picture which has been encoded previously as will be described below.

For this reason, the MPEG1 real time encoder board 213 is provided with the so-called local decoder which comprises the motion compensator 121, the frame memory unit 122, the change-over switch 123, the adder 124, the inverse DCT circuit 125 and the inverse quantizer 126. It should be noted that picture data stored in the frame memory unit 122 is called a local decoded picture or local decoded data. On the other hand, picture data before coding is called an original picture or original data.

In an operation to encode the first picture I0, data output by the quantizer 115 is also locally decoded by the inverse quantizer 126 in conjunction with the inverse DCT circuit 125. In this case, the change-over switch 123 is turned off, causing the locally decoded data to be passed on by the adder 124 as it is to the frame memory unit 122. That is to say, with the change-over switch 123 turned off, the adder 124 in essence does not carry out addition on the locally decoded data.

It should be noted that the picture data stored in the frame memory unit 122 is not an original picture but a picture obtained as a result of encoding the original picture and then locally decoding data obtained as a result of the encoding of the original picture. Thus, the picture data stored in the frame memory unit 122 is the same as a picture obtained as a result of decoding carried out by a data decoding apparatus. Obtained as a result of encoding the original picture and then locally decoding data obtained as a result of the encoding of the original picture, the picture data stored in the frame memory unit 122 has a picture quality poorer than the original data to a certain degree.

With locally decoded data of the first picture I0 stored in the frame memory unit 122, the second picture P3 41 is supplied from the frame memory unit 110 to the subtractor 112 by way of the block divider 111 in block units. It should be noted that, by this point of time, it is necessary to end the detection of motion vectors of the picture P3 carried out by the motion detector 120.

On the other hand, the motion detector 120 supplies a motion vector detected for each macroblock of the second picture P3 to the motion compensator 121. The motion compensator 121 carries out MC (motion compensation) on the already locally decoded picture I0 stored in the frame memory unit 122 in accordance with a motion vector supplied by the motion detector 120. 1 macroblock of MC (motion compensation) data obtained as a result of the motion compensation is supplied to the subtractor 112 as interframe predicted picture data.

The subtractor 112 computes a difference between the original data of each pixel of the picture P3 supplied thereto through the block divider 111 and the corresponding pixel of the interframe predicted picture data supplied by the motion compensator 121 for each pixel. The difference computed by the subtractor 112 is supplied to the DCT circuit 114 by way of the change-over switch 113. Thereafter, the difference is subjected to encoding in the same way as an I picture. Thus, in this case, the change-over switch 113 is set to the switched terminal b.

As described above, in the case of a P (predicted) picture, that is, in the case of the picture P3 in the above example, basically, an I or P picture encoded right before is used as a reference picture to which motion compensation is applied to produce a predicted picture, and a difference between the predicted picture and the P picture is then encoded.

That is to say, in the case of a P picture, for a macroblock, strictly speaking, an interframe macroblock, for which the amount of data obtained as a result of interframe encoding is smaller than that obtained as a result of intraframe encoding, the change-over switch 113 is set to the switched terminal b in order to implement the interframe encoding. For a macroblock, strictly speaking, an intraframe macroblock, for which the amount of data obtained as a result of intraframe encoding is smaller than that obtained as a result of interframe encoding, on the other hand, the change-over switch 113 is set to the switched terminal a in order to implement the intraframe encoding.

It should be noted that a macroblock of a P picture that has completed intraframe encoding is locally decoded and the locally decoded data is stored in the frame memory unit 122 in the same way as an I picture. On the other hand, a macroblock of a P picture that has completed interframe encoding is locally decoded by addition of data passing through the inverse quantizer 126 and the inverse DCT circuit 125 to interframe predicted picture data from the motion compensator 121 passed on by the turned-on change-over switch 123 by means of the adder 124. The locally decoded data output of the adder 124 is then stored in the frame memory unit 122.

Next, encoding of the third picture B1 is explained.

In an operation to encode a B picture, namely, the picture B1 in this case, the motion detector 120 detects 2 motion vectors with respect to an I or P picture displayed right before and an I or P picture displayed right after. Thus, in this example, 2 motion vectors of the picture B1 with respect to the pictures I0 and P3 are detected. The motion vector with respect to the picture I0, an I picture displayed right before the picture B1, is referred to as a forward vector. On the other hand, the motion vector with respect to the picture P3, an P picture displayed right after the picture B1, is referred to as a backward vector.

The picture B1 is encoded by encoding one selected from the following 4 pieces of data which will result in a smallest amount of encoded data. The 4 pieces of data are:

1 A difference between the picture B1 and interframe predicted picture data obtained as a result of motion compensation of the locally decoded picture I0 according to the forward vector.

2 A difference between the picture B1 and interframe predicted picture data obtained as a result of motion compensation of the locally decoded picture P3 according to the backward vector.

3 A difference between the picture B and the average of the 2 pieces of interframe predicted picture data in 1 and 2.

4 The picture B1 itself.

When difference 1, 2 or 3 is encoded, that is, when interframe encoding is carried out, necessary motion vectors are supplied by the motion detector 120 to the motion compensator 121. Interframe predicted picture data obtained as a result of motion compensation carried out by the motion compensator 121 according to the motion vector is supplied to the subtractor 112 which then computes the difference between the original data of the picture B1 and the interframe predicted picture data supplied by the motion compensator 121. The difference is supplied to the DCT circuit 114 by way of the change-over switch 113.

Thus, in this case, the change-over switch 113 is set to the switched terminal b. When data 4 of the picture B1 itself is encoded, that is, when intraframe encoding is carried out, on the other hand, the data, that is, the original data of the picture B1, is supplied to the DCT circuit 114 by way of the change-over switch 113. Thus, in this case, the change-over switch 113 is set to the switched terminal a.

In the operation to encode the picture B1, which is a B picture, the pictures I0 and P3 have already been encoded, then locally decoded and finally stored in the frame memory unit 122. Thus, the encoding can be implemented.

The fourth picture B2 is encoded in the same way as the picture B1. That is to say, the description of the encoding of the picture B1 given so far is applicable to the picture B2 provided that the symbol B1 in the description is replaced by the symbol B2.

The fifth picture P6 is encoded in the same way as the picture P3. That is to say, the description of the encoding of the picture P3 given so far is applicable to the picture P6 provided that the symbols P3 and I0 in the description are replaced by the symbols P6 and P3 respectively.

The sixth and subsequent pictures are encoded by repeating the encoding process described above. It is thus not necessary to repeat the description.

By the way, the MPEG1 real time encoder board 213 determines the picture type of a picture of each screen to be encoded, that is, whether the picture to be encoded is an I, P or B picture, and determines the macro block type of a macroblock of each picture to be encoded in accordance with the amount of data which will obtained as a result of the encoding as described above. However, the amount of data depends on the picture to be encoded and is thus not known accurately unless the encoding is actually carried out.

By the way, it is basically necessary to set the bit rate of a bit stream obtained as a result of MPEG encoding at a fixed value. As a method of keeping the bit rate at a fixed value, for example, there is a technique of controlling the quantization step (the quantization scale) used in the quantizer 115. To put it in detail, at a large quantization step, data is quantized coarsely, resulting a small amount of generated data or generated code. At a small quantization step, on the other hand, data is quantized finely, resulting a large amount of generated data or generated code.

The quantization step is controlled in concrete terms as follows.

At the output stage of the MPEG1 real time encoder board 213, the output buffer 118 is provided. The output buffer 118 is used for temporarily storing encoded data to absorb changes in amount of generated data to a certain degree. As a result, the bit rate of an output bit stream can be made constant.

If generation of encoded data, strictly speaking, variable length encoded data, at a bit rate higher than a predetermined value continues, however, the amount of data stored in the output buffer 118 will keep increasing, resulting in an overflow eventually. If generation of encoded data, strictly speaking, variable length encoded data, at a bit rate lower than a predetermined value continues, on the other hand, the amount of data stored in the output buffer 118 will keep decreasing, resulting in an underflow eventually.

In order to solve the problem described above, the amount of data or code stored in the output buffer 118 is fed back to the quantization step controller 119 which controls the quantization step in accordance with the amount of data or code fed back thereto so as to prevent an overflow and an underflow from occurring in the output buffer 118.

To put it in detail, when the amount of data or code stored in the output buffer 118 approaches the storage capacity of the output buffer 118, leading to a state in which an overflow is about to occur imminently, the quantization step controller 119 increases the quantization step in order to decrease the amount of data generated by the quantizer 115. When the amount of data or code stored in the output buffer 118 approaches 0, leading to a state in which an underflow is about to occur imminently, on the other hand, the quantization step controller 119 decreases the quantization step in order to increase the amount of data generated by the quantizer 115.

By the way, the amount of generated code also varies in dependence on whether a picture is encoded by using the intraframe or interframe encoding technique.

In general, since intraframe encoding results in a relatively larger amount of generated code, it is necessary to set the quantization step at a very large value when the amount of data stored in the output buffer 118 is large. In this case, nevertheless, an overflow may occur in the output buffer 118 anyway even if the quantization step is increased to a maximum value. In addition, when quantization is carried out at a large quantization step, basically, the quality of the decoded picture deteriorates and the quality of a picture encoded and decoded with the decoded picture taken as a reference picture also deteriorates as well. Thus, when intraframe encoding is carried out, it is necessary to preserve a sufficiently large free area in the output buffer 118 in order to prevent an overflow from occurring in the output buffer 118 and to prevent the quality of a decoded picture from deteriorating.

For that reason, the quantization step controller 119 recognizes an order in which intraframe or interframe encoding is to be carried out in advance from a signal supplied thereto by the compression technique selecting circuit 132. The quantization step controller 119 controls the quantization step so as to preserve a sufficiently large free area in the output buffer 118 in the case of intraframe encoding.

By the way, from the decoded picture quality point of view, quantization needs to be carried out at a small quantization step for a complicated picture or a large quantization step in the case of a simple picture. In the quantization step set only on the basis of information fed back from the output buffer 118, however, such a quantization requirement is not taken into consideration. If the quantization step is set at a value which is improper from the picture complexity point of view, an excessively large or small number of bits will be allocated. If an inappropriate number of bits are allocated to a certain picture, the number of bits allocated to another picture will be affected, resulting in an undesirable state.

In order to solve this problem, the quantization step controller 119 sets the quantization step at a value based on by not only the fed back amount of data stored in the output buffer 118 in the buffer feedback control but also the complexity of a picture subjected to encoding.

To put it in detail, a picture evaluating circuit 130 employed in the MPEG1 real time encoder board 213 reads out data of a picture to be encoded from the frame memory unit 110, computing an evaluation value to be used as an indicator of the complexity of the picture. The picture evaluating circuit 130 then outputs the evaluation value to a scene change detecting circuit 131, the compression technique selecting circuit 132 and the quantization step controller 119.

The quantization step controller 119 learns the relation among a quantization step actually us ed in the encoding of a picture, the amount of data or code obtained as a result of the quantization carried out at the quantization step and an evaluation value indicating the complexity of the picture from the picture evaluating circuit 130 and, from a result of the learning process, finds a basic quantization step used as a base for setting a next quantization step.

To put it in detail, the quantization step controller 119 performs a regression analysis using a quantization step actually used in the encoding of a picture, the amount of data or code obtained as a result of the quantization carried out at the quantization step and an evaluation value indicating the complexity of the picture and learns the relation among them from a graph representing results of the analysis. Subsequently, a basic quantization step which is optimum for encoding a next picture is predicted from the graph with an evaluation value indicating the complexity of the next picture to be encoded taken as a parameter.

Then, the quantization step controller 119 changes the basic quantization step in accordance with information fed back from the output buffer 118 and sets the modified value as a quantization step.

A basic quantization step can be predicted from the learning process with a high degree of accuracy by taking the complexity of a picture into consideration. Thus, by finding a quantization step from such a basic quantization step, the quality of a decoded picture can be improved in comparison with a picture obtained as a result of controlling the quantization step only on the basis of information fed back from the output buffer 118.

It should be noted that the scene change detecting circuit 131 detects whether or not the scene changes from an evaluation value supplied thereto by the picture evaluating circuit 130. A result of the detection is supplied to the compression technique selecting circuit 132. The compression technique selecting circuit 132 selects a technique of compressing a picture in accordance with an evaluation value supplied thereto by the picture evaluating circuit 130 and, if necessary, the result of detection output by the scene change detecting circuit 131. To put it in detail, the compression technique selected by the compression technique selecting circuit 132, for example, determines the I, P or B picture as a picture type of a picture to be encoded, determines the number of pictures composing a GOP and determines a macroblock type, that is, whether a macroblock is subjected to infraframe or interframe encoding.

After selecting a compression technique, the compression technique selecting circuit 132 controls the change-over switches 113 and 123 in dependence on whether a current macroblock is subjected to intraframe or interframe encoding. To be more specific, in the case of a macroblock subjected to intraframe encoding, the change-over switch 113 is set to the switched terminal a and the change-over switch 123 is turned off. In the case of a macroblock subjected to interframe encoding, on the other hand, the change-over switch 113 is set to the switched terminal b and the change-over switch 123 is turned on.

In addition, the compression technique selecting circuit 132 notifies the quantization step controller 119 of either the intraframe encoding technique or the interframe encoding technique which is selected thereby. The encoding technique is used by the quantization step controller 119 to recognize an order in which the intraframe encoding and the interframe encoding are carried out.

If the compression technique selecting circuit 132 has been consecutively selecting the P or B picture as a picture type of consecutive pictures to be encoded for a long time, if a picture with a low correlation between frames caused by a scene change arrives, the amount of generated data increases and the quality of a decoded picture deteriorates because, a P or B picture is basically encoded by using the interframe encoding technique.

In order to solve the problem described above, the scene change detecting circuit 131 supplies a result of detection of a scene change to the compression technique selecting circuit 132. When the compression technique selecting circuit 132 is informed of a scene change, the I picture is selected as a picture type of a picture following the scene change in a process called a forced selection.

It should be noted that the method, whereby a basic quantization step is inferred from a learning process and a quantization step is set from the learned basic quantization step as described above, is described in detail in documents such as Japanese Patent Laid-open No. Hei8-102951 submitted earlier by the patent applicant.

The picture evaluating circuit 130 computes the following 2 parameters representing the complexity of a picture as evaluation values to be used for evaluation of a picture subjected to encoding by referencing the frame memory unit 110.

To put it in detail, as a first parameter, an evaluation value representing the amount of information of a picture itself is calculated. With the first parameter, the amount of code obtained as a result of intraframe encoding of the picture, that is, the amount of code obtained as a result of encoding of the picture as an I picture, can be predicted (or inferred). To put it concretely, as a typical first parameter, a sum of DCT coefficients each obtained from DCT processing of a block of a picture or another statistical quantity can be used. As a typical alternative, an average of pixel values for a block is computed. Then, a sum of the absolute values of differences between the average and the pixel values is found. The sum is referred to as a mean absolute difference for the sake of convenience. Then, a sum of mean absolute differences for all blocks can also be used as another typical first parameter. It should be noted that, in the case of the other typical first parameter found by calculating a sum of mean absolute differences, the size of the picture evaluating circuit 130 can be made relatively small and, hence, the load can be reduced to a relatively small one in comparison with the typical first parameter found by calculating a sum of DCT coefficients.

For the reason described above, in the picture evaluating circuit 130, a sum of mean absolute differences for all blocks is found as a first parameter as follows.

To put it in detail, now consider, for example, a block S of a picture subjected to encoding. Let $S_{i,j}$ be a pixel value of a pixel at a position on the ith column to the right from the leftmost top corner of the block S and the jth row down from the corner. The MAD (Mean Absolute Difference) for the block S is found by Eq. (1) given below. Even though the equation can be applied to all luminance and chrominance blocks, the MAD is typically calculated for each luminance block only.

$$MAD = \sum_{i=1}^{8} \sum_{j=1}^{8} |S_{i,j} - S_{AVE}| \quad (1)$$

where notation $S_{AVE}$ used in Eq. (1) is an average of pixel values for the block S.

Then, a sum SMAD of mean absolute differences MADs for all blocks is computed as a first parameter by using Eq. (2) as follows:

$$SMAD = \Sigma MAD \quad (2)$$

where the symbol $\Sigma$ used in Eq. (2) indicates summation of mean absolute differences MADs for all blocks composing the picture.

It should be noted that, in the picture evaluating circuit 130, the mean absolute difference MAD expressed by Eq. (1) can also be found as a sum for a macroblock instead of a block. Such a mean absolute difference is typically used by the compression technique selecting circuit 132 in determination of whether the macroblock is to be encoded using the intraframe encoding technique or the interframe encoding technique and, in the case of the interframe encoding technique, selection of forward prediction encoding, backward prediction encoding or both forward and backward prediction encoding.

As a second parameter, an evaluation value representing the amount of information on a difference between a picture and a reference picture used in interframe encoding of the picture is computed. With the second parameter, the amount of code obtained as a result of interframe encoding of the picture can be predicted. To put it concretely, as a second parameter, a sum of the absolute values of differences between, for example, a picture and a predicted picture is found for each block. The sum is referred to as a mean absolute difference for the sake of convenience. A predicted picture is a picture obtained from motion compensation of a reference picture. Then, a sum of mean absolute differences for all blocks is used as a second parameter.

A mean absolute difference is found when a motion vector is detected by the motion detector 120. Then, in the picture evaluating circuit 130, as a second parameter, a sum of mean absolute differences is typically found by using results of motion detection carried out by the motion detector 120.

To put it in detail, now, consider, for example, a block of a reference picture. The block comprises 8×8 pixels. Let $R_{i,j}$ be a pixel value of a pixel at a position on the ith column to the right from the leftmost top corner of the block and the jth row down from the corner. Also consider an x axis in the horizontal direction and a y axis in the vertical direction for a picture to be encoded. In a block with a leftmost top pixel thereof coinciding with a point (x, y), let $S_{x+i, y+j}$ be a pixel value of a pixel at a position on the ith column to the right from the leftmost top corner of the block and the jth row down from the corner.

In the motion detector 120, a sum d (x, y) of the absolute values of differences between the pixel values Sx+i, y+j and Rij expressed by Eq. (3) is found by incrementing the subscripts i and j each by 1 at a time.

$$d(x, y) = \sum_{i=1}^{8} \sum_{j=1}^{8} |S_{x+i,y+j} - R_{i,j}| \quad (3)$$

In the motion detector 120, coordinates (x, y) that minimize the sum d (x, y) of Eq. (3) is detected as a motion vector and the minimum d (x, y) is found as an absolute difference AD.

Then, in the picture evaluating circuit 130, a sum SAD of absolute differences ADs each found in the motion detector 120 for a block is computed as a second parameter by using Eq. (4) expressing summation for all blocks as follows:

$$SAD = \Sigma AD \quad (4)$$

where the symbol Σ used in Eq. (4) indicates summation of absolute differences ADs for all blocks composing the picture.

It should be noted that, in the picture evaluating circuit 130, the absolute difference AD expressed by Eq. (3) can also be found as a sum for a macroblock instead of a block. Such an absolute difference is typically used by the compression technique selecting circuit 132 in determination of whether the macroblock is to be encoded using the infraframe encoding technique or the interframe encoding technique and, in the case of the interframe encoding technique, selection of forward prediction encoding, backward prediction encoding or both forward and backward prediction encoding.

The first parameter SMAD and the second parameter SAD found by the picture evaluating circuit 130 are supplied to the scene change detecting circuit 131, the compression technique selecting circuit 132 and the quantization step controller 119.

As described above, the scene detecting circuit 131 detects the occurrence of a scene change on the basis of the evaluation values output by the picture evaluating circuit 130. The compression technique selecting circuit 132 selects a technique of compressing a picture in accordance with the evaluation values supplied thereto by the picture evaluating circuit 130 and, if necessary, the result of detection output by the scene change detecting circuit 131. The quantization step controller 119 sets a quantization step as described above.

It should be noted that, in the scene change detecting circuit 131, a ratio of the second parameter SAD of a picture to the second parameter SAD of a picture immediately succeeding the picture is found. The magnitude of the ratio is used as a criterion as to whether or not the scene has changed.

In addition, the scene change detecting circuit 131 also generates index data to be described later. The index data is supplied to the microprocessor 201 to be stored in a generated index file also to be described later.

In the compression technique selecting circuit 132, for a P or B picture for example, the total mean absolute difference MAD and the total absolute difference AD for a macroblock supplied thereto by the picture evaluating circuit 130 are compared with each other and the outcome of the comparison is used to make a decision as to whether the macroblock is to be encoded by using the intraframe or interframe encoding technique. To put it in detail, if the total mean absolute difference MAD for a macroblock is found smaller than the total absolute difference AD for the macroblock, that is, if the amount of code obtained as a result of intraframe encoding is predicted to be smaller than the amount of code obtained as a result of interframe encoding, the intraframe encoding is selected. If the mean absolute difference AD for a macroblock is found smaller than the total mean absolute difference MAD for the macroblock, that is, if the amount of code obtained as a result of interframe encoding is predicted to be smaller than the amount of code obtained as a result of intraframe encoding, the interframe encoding is selected.

It should be noted that, in the MPEG1 real time encoder board 213 shown in FIG. 6, the controller 133 monitors the amount of data stored in the output buffer 118 and controls the encoding process in the MPEG1 real time encoder board 213 in accordance with the amount of data as will be described later.

The following is a description of Slipclip, a set of 5 application programs stored in the hard disc 212 for video creative work.

When the power supply of the main unit 31 is turned on by the user by operating the power supply button 34, the operating system stored in the hard disc 212, namely, Windows 95 cited earlier, is activated. When a start button of a task bar thereof is clicked, a start menu is displayed.

In this embodiment, as an item of the start menu, typically "VAIO" is displayed. In the "VAIO" item, predetermined application programs including Slipclip are cataloged.

As described above, the Slipclip software comprises 5 application programs called the slip recorder, the clip editor, the clip viewer, the video CD creator and the video CD copy tool which are all cataloged in Slipclip of "VAIO". Thus, when the "Slipclip" item is clicked by operating the mouse 22, 5 items representing the 5 application programs, namely, "slip recorder", "clip editor", "clip viewer", "video CD creator" and "video CD copy tool" are displayed on the screen.

The user then clicks one of the items in accordance with the purpose of the job to invoke an application program corresponding to the clicked item.

Figure 7:
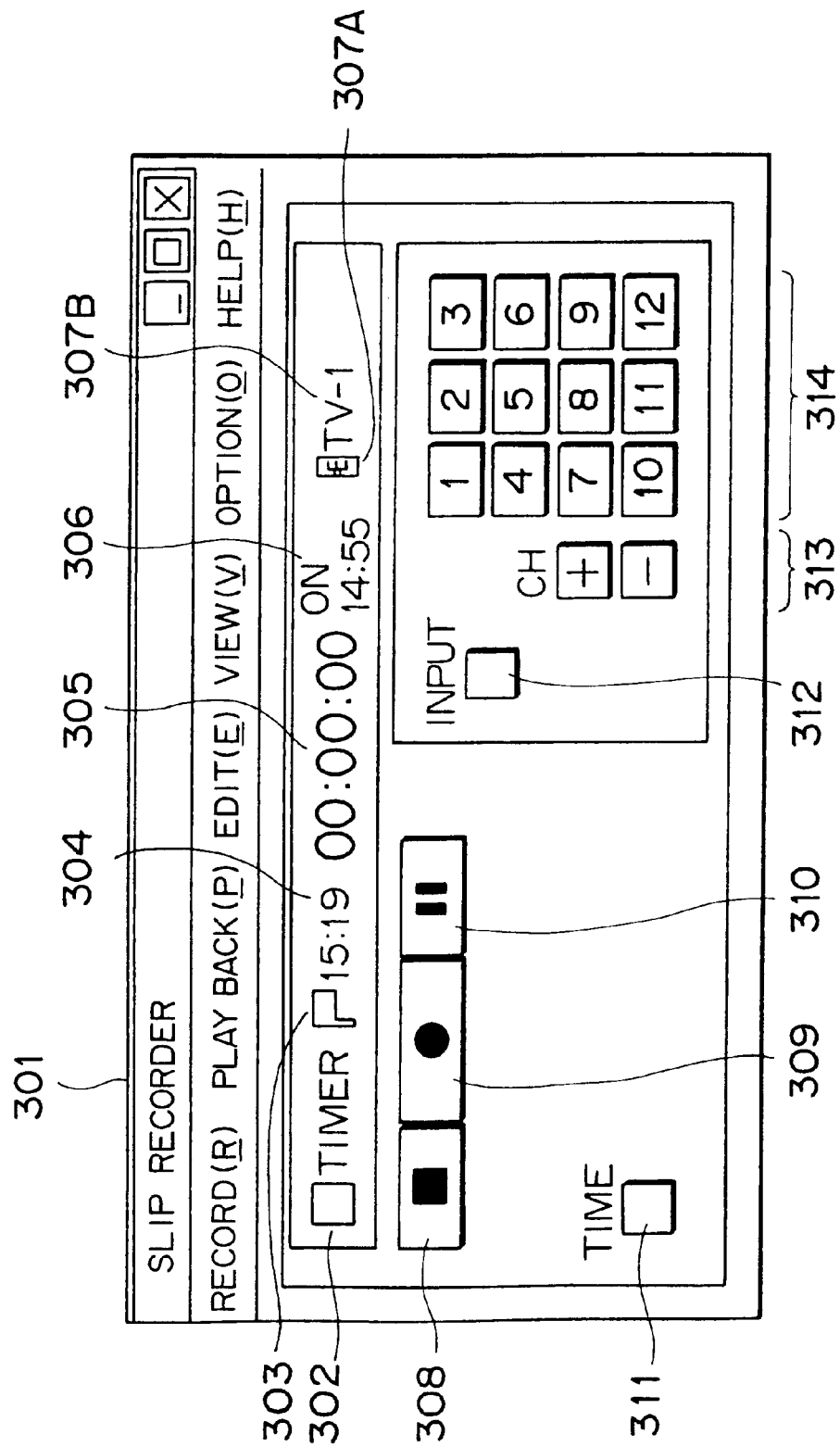
FIG. 7 is a diagram showing a slip recorder main window 301.

When a photographic material to be used in creation of a video CD is taken by means of the video camera 214 and recorded on a recording medium, the slip recorder is activated if the photographic material is recorded in a simple way as is the case with recording of a television broadcast program by using a recording apparatus such as the VTR 216. In this case, a slip recorder main window 301 like one shown in FIG. 7 is displayed.

As shown in the figure, the slip recorder main window 301 comprises a variety of indicator and display fields and buttons.

To put it in detail, on a recording indicator field 302, recording status is displayed. To put it concretely, for status of waiting for the start of a recording operation after a recording reservation, typically the word "TIMER" is displayed on the recording indicator field 302. For status of carrying out a reserved recording operation, typically the words "TIMER REC" are displayed on the recording indicator field 302. If a recording operation is started by operating a recording button 309, typically the word "REC" is displayed on the recording indicator field 302. If a recording operation is temporarily halted by operating a pause button 310 or halted by operating a stop button 308, typically the word "PAUSE" or the word "STOP" respectively is displayed on the recording indicator field 302.

A scene change indicator field 303, which has a shape resembling a flag, is displayed only when the occurrence of a scene change on a picture being recorded is detected. In other words, normally, the scene change indicator field 303 is not displayed. If a scene change is detected, the scene change indicator field 303 is displayed for a fixed period of time to notify the user of the occurrence of the scene change.

On a present time display field 304, the present time is displayed on a so-called 24-hour basis. The present time display field 304 displays typically the time controlled by "date and time" of a control panel of Windows 95 as it is.

On a recording time display field 305, time information such as a time lapse since the start of a recording operation, a remaining time to the end of the recording operation or a remaining period of time till the end of a tape to be described later is displayed. By operating a time button 311, that is, a recording time display change button, the user can select which time information is to be displayed on the recording time display field 304. It should be noted that, if a recording operation is not being carried out, typically "00:00:00" is displayed on the recording time display field 305.

On a timer standby indicator field 306, the status of a reservation recording operation is displayed. When a recording reservation is made, putting the status in a state of waiting for the start of the reservation recording operation, for example, the start time of the reservation recording operation is displayed on the timer standby indicator field 306 to indicate the status of waiting for the start of the reservation recording operation. To put it concretely, when the present status is status of waiting for a reservation recording operation which will start at 14:55, for example, the word "ON" is displayed to indicate the status of waiting for a reservation recording operation and the time "14:55" is displayed to indicate that the reservation recording operation will start at 14:55 as shown in FIG. 7. Status of presently carrying out a reservation recording operation is also displayed along with an end time of the reservation recording operation. To put it concretely, for example, status of presently carrying out a reservation recording operation which will end at 21:43 is indicated by the word "OFF" and the time "21:43" displayed on the timer standby indicator field 306.

It should be noted that, in the case of a recording operation other than a reservation recording operation which is referred to hereafter simply as ordinary recording for the sake of convenience, a message identical with that for indicating that the ordinary recording is under way is displayed even if the end time has been set.

Status of carrying out an ordinary recording operation with no end time set is indicated by "-- : --", for example, displayed on the timer standby indicator field 306.

For operations other than the reservation and ordinary recording operations, nothing is displayed on the timer standby indicator field 306.

On an endless recording display field 307A, a message indicating a type of a tape to be described later is displayed. In the case of an "endless" tape type, the character "E" is displayed on the endless recording display field 307A as shown in FIG. 7. In the case of a "normal" tape type, on the other hand, nothing is displayed on the endless recording display field 307A.

On an input source display field 307B, a message indicating a selected recording object is displayed. To be more specific, if an input from the AV terminal unit 84 on the rear surface of the main unit 31 or an input from the AV terminal unit 43 on the front surface of the main unit 31 is selected, the words "Video 1" or "Video 2" respectively are displayed on the input source display field 307B. If the output of the TV tuner 213A is selected, a message "TV-0" is displayed on the input source display field 307B. It should be noted that, on the 0 mark portion of the message, the number of a channel selected by the TV tuner 213A is displayed. On the window shown in FIG. 7, a message "TV-1" is displayed on the input source display field 307B to indicate that a program broadcasted through Channel 1 is selected as a recording object.

The stop button 308, the recording button 309 or the pause button 310 is operated to stop a recording operation, to start a recording operation or to temporarily stop a recording operation respectively. It should be noted that, when a recording operation has been halted temporarily by operating (or clicking) the pause button 310, the recording operation can be resumed by operating the pause button 310 once more.

As described above, the recording time display change button 311 is operated to change a message displayed on the recording time display field 305. To be more specific, each time the recording time display change button 311 is operated, the message displayed on the recording time display field 305 is switched alternately from a time lapse to a remaining period of time and vice versa.

An input switch button (input button) 312 is operated to change an input selected as a recording object. To be more specific, each time the input switch button 312 is operated, one of an input from the AV terminal unit 84 on the rear surface of the main unit 31, an input from the AV terminal unit 43 on the front surface of the main unit 31 and the output of the TV tuner 213A is selected on the so-called rotation basis. When the input switch button 312 is operated, a message displayed on the input source display field 307B is also change accordingly.

With the output of the TV tuner 213A selected as an input to a recording operation, for example, one of two up and down buttons 313 is operated to change the number of a channel selected by the TV tuner 213A from a channel currently selected to respectively a succeeding or preceding channel shown on channel buttons 314. With the output of the TV tuner 213A selected as an input to a recording operation, one of the channel buttons 314 is operated to choose a channel to be selected by the TV tuner 213A. It should be noted that, the numbers of the channels displayed by the channel buttons 314 can be set at any values in the range 1 to 62 by using a "channel setting" item of an optional menu on the slip recorder main window 301.

With the slip recorder main window 301 having the above configuration displayed, assume that the input switch button 312 is operated to select an input to a recording operation and, if the output of the TV tuner 213A is selected as the input, the up or down button 313 or the one of the channel buttons 314 is operated to select a channel of the input. Then, the recording button 309 is operated to start the operation to record pictures along with their accompanying sound of the selected input. If the recording operation is carried out by the slip recorder, it is necessary to set a tape to be used in the recording operation.

To put it in detail, when a recording operation is requested by operating the recording button 309 and the others as described above, pictures of the recording object are encoded by the MPEG1 real time encoder board 213 and encoded data obtained as a result of the encoding operation is stored in the hard disc 212. If the encoded data is simply stored in the hard disc 212, however, a free area in the hard disc may be insufficient, making it impossible to carry out the recording operation.

By the way, if the recording operation is carried out to record data on a video tape by means of an apparatus such as a VTR, for example, the data can be recorded in a space between the beginning and the end of the video tape without any restriction. This is because the video tape is considered to have a recording capacity allocated in advance. With the "Slipclip" facility, a recording area larger than a recording capacity required for carrying out a normal recording operation is allocated in the hard disc 212 and data including encoded code is then recorded in the recording area. The recording capacity is a minimum recording size required for carrying out a recording operation without aborting the operation in the course of recording due a free area in the hard disc 212 running out. For the sake of convenience, the recording capacity and the recording area required for recording are referred to hereafter as a required capacity and a required area respectively.

To put it in detail, in an operation to record pictures carried out in this embodiment, a large file required for recording an MPEG system stream obtained as a result of MPEG encoding performed by the MPEG1 real time encoder board 213 and a large file required for recording information such as indexes to be described later are generated. The former and the latter files are referred to hereafter as an MPEG file and an index file respectively for the sake of convenience. Since the files are stored in the hard disc 212, it is necessary to allocate an area required for recording data including encoded code, that is, the MPEG system stream, in the hard disc 212 in advance.

After all, the MPEG and index files with a total size equal to or greater than the required capacity are allocated in a free area in the hard disc 212.

The contents of the MPEG and index files right after allocation in the hard disc 212 are information with no meaning in particular. The allocation of the files corresponds to preparation of a new video tape in a recording operation by means of a VTR. For this reason, the files are referred to as a tape in slip recorder.

A tape can be set by using typically a tape setting dialog box 321 like one shown in FIG. 8.

The tape setting dialog box 321 is displayed by clicking a message "Standard tape setting", an item of an "Edit" menu displayed on the upper part of the slip recorder main window 301 shown in FIG. 7.

The user enters a name to be appended to a tape into a name field 322 on the tape setting dialog box 321. In the embodiment shown in FIG. 8, the name "Tape" is entered. A name entered in the name field 322 is a file name common to the MPEG and index files constituting a tape being set. It should be noted that, in order to distinguish the MPEG and index files from each other, typical file name extensions "MPG" and "SCX" are given to the MPEG and index files respectively. Thus, with the name "Tape" entered in the name field 322 as a file name, the full file names of the MPEG and index files constituting the tape are as a rule "Tape.MPG" and "Tape.SCX" respectively.

A write protect box 323 is checked to put write protection on the tape. A type field 324 is used for setting a type of the tape described below.

In the case of the slip recorder, 2 types of a tape, namely, "normal" and "endless", are provided to indicate a normal tape and an endless tape which are shown in FIGS. 9A and 9B respectively.

When a normal tape is specified, MPEG and index files are created to form a tape with a minimum required recording capacity at least equal to a recording time set in a recording time field 325 described later. If a recording time of 1 hour is set in the recording time field 325, for example, a tape with a recording capacity of 1 hour shown in FIG. 9A is created.

When an endless tape is specified, on the other hand, tapes each with a fixed recording capacity of typically 15 minutes are created to form the endless tape like one shown in FIG. 9B. Such tapes are each referred to hereafter as a fixed tape for the sake of convenience. As many fixed tapes as required to form an endless tape with a recording capacity at least equal to a value corresponding to a recording time set in the recording time field 325 are created. That is to say, the number of fixed tapes each having a recording capacity of 15 minutes is obtained by dividing the recording time set in the recording time field 325 by 15 minutes and then adding 1 to a quotient obtained as a result of the division. In this embodiment, the recording time of each fixed tape is set at a typical value of 15 minutes as will be described later. To put it concretely, assume that a recording time of 1 hour is set in the recording time field 325 for example. In this case, 5 fixed tapes are created to from an endless tape as shown in FIG. 9B. Since the number 5 is obtained by dividing 1 hour by 15 minutes to give a quotient of 4 and adding 1 to the quotient, the endless tape which is composed of 5 fixed tapes can be used for recording data for a period of up to 1 hour and 15 minutes.

As described above, a normal tape comprises 1 MPEG file and 1 index file. It is obvious from the embodiment given above, however, that an endless tape may comprise a plurality of fixed tapes which each comprise an MPEG file and an index file. In order to distinguish MPEG files and index files of an endless tape from each other, the name of each MPEG file or each index file includes the symbol "#" followed by the sequence number of the file.

Consider the endless tape shown in FIG. 9B as an example. The endless tape comprises 5 MPEG files and 5 index files. Their file names are Tape#1.MPG, Tape#1.SCX, Tape#2. MPG, Tape#2.SCX, Tape#3.MPG, Tape#3.SCX, Tape#4.MPG, Tape#4.SCX, Tape#5.MPG and Tape#5.SCX.

An operation to record data on a normal tape is begun at the start of the tape and, at a point of time the end of the tape is reached, the operation is terminated. It should be noted that, if an instruction to halt the operation is issued before the end of the tape is reached, the operation is terminated at a point of time the instruction is issued. In this case, portions of the MPEG and index files that have not been used in the recording operation are freed. That is to say, they are released as free areas.

On the other hand, an operation to record data on an endless tape is begun at the start of the first fixed tape if the endless tape comprises a plurality of fixed tapes. As the end of the first fixed tape is reached, the operation to record data on the first fixed tape is terminated and an operation to record data on the second fixed tape is begun. Thereafter, operations to record data on the third, fourth, - - -, last fixed tapes are carried out sequentially one tape after another. As the end of the last fixed tape is reached, an operation to record, strictly speaking, to overwrite, data on the first fixed tape is carried out again.

That is to say, in the embodiment shown in FIG. 9B, when the operation to record data on all the first to fifth fixed tapes is finished, an operation to record, strictly speaking, to overwrite, data on the first fixed tape is started. The recording operation is carried out on a rotation basis till an instruction to end the operation is issued typically when the stop button 308 is operated. Such a recording operation on a rotation basis is continued, so to speak, endlessly.

Then, as an instruction to end the recording operation is issued, the operation is terminated right away at that point of time. In this case, in "Slipclip", a retroactive area with a length specified in the recording time field 325 in the endless tape starting from the point of time the recording operation is terminated is made a playback range.

To put it concretely, consider the endless tape shown in FIG. 9B for example. Assume that an instruction to end the recording operation is issued at a point of time 10-minute recording on the fifth fixed tape is ended. A hatched area of 1 hour in length shown in the figure which starts at a 10-minute position on the first fixed tape and ends at a 10-minute position on the fifth fixed tape is made a playback range.

It should be noted that, in this case, an area on the first fixed tape from the start thereof to the 10-minute position and an area on the fifth fixed tape from the 10-minute position to the end thereof are not playback ranges. Thus, when viewed from the standpoint of the, utilization efficiency of the hard disc 212, these areas should be both freed. In this case, however, only the area on the fifth fixed tape from the 10-minute position to the end thereof is freed while the area on the first fixed tape from the start thereof to the 10-minute position is not for the following reason.

At the head of an MPEG file of a fixed tape, a system header and information required in an operation to decode data experiencing MPEG encoding are recorded. If such an area is discarded, the decoding operation will be difficult to carry out.

Thus, data recorded in the area on the first fixed tape from the start thereof to the 10-minute position can be played back by directly accessing the MPEG file of the first fixed tape.

It should be noted that an endless tape may comprise only 1 fixed tape as is the case with a normal tape instead of a plurality of fixed tapes described above. When such an endless tape is created, the endless tape is specified as a type of the tape. In this case, there can be considered a recording technique whereby a recording operation is started at the beginning of the fixed tape and, as the end thereof is reached, the operation to record, strictly speaking, to overwrite, data is repeated from the same beginning of the fixed tape. As described above, however, information including a system header is recorded at the head of an MPEG file of a fixed tape. Thus, if such information is overwritten, the decoding operation will be difficult to carry out. It is therefor desirable to create an endless tape from a plurality of fixed tapes.

Refer back to FIG. 8. The user enters a recording time, that is, a period of time required for recording, to the recording time field 325. A recording time up to 12 hours with a resolution of 15 minutes can be typically entered to this field. It should be noted that a recording time is entered in terms of hours and minutes.

An automatic index check box 326 is checked to request that an index serving as a mark for representing a position of a scene change of a picture be automatically appended in a recording operation. If the automatic index check box 326 is not checked, information such as a scene change pointer and a scene change parameter to be described later is not recorded in an index file.

In a video recording mode field 327, a video recording mode indicating bit rate information is set. 4 video recording modes are provided to represent 4 bit rates, namely, enumerated in a decreasing order, "High", "Normal", "Long" and "Network".

FIG. 10 is a table showing the size of a frame, a system bit rate, a video bit rate, a frame rate, an audio bit rate, an audio recording mode that can be set and a video recording time of a 1-GB tape for each of the video recording modes. The size of a frame is the number of pixels in the horizontal direction X the number of pixels in the vertical direction. The system bit rate is the bit rate of a system stream obtained as a result of MPEG encoding of a picture. The video bit rate is the bit rate of code obtained as a result of MPEG encoding. The frame rate is the number of frames per second. The audio bit rate is the bit rate of a system stream obtained as a result of MPEG encoding of sound. The video recording time of a 1-GB tape is a period of time during which data can be recorded on a tape with a storage capacity of 1 GB.

As shown in the table, even though the video recording time of a 1-GB tape for the "High" video recording mode is shortest, a decoded picture with the highest picture quality can be obtained. In the "Normal" video recording mode, a system stream conforming to video CD (VCD) specifications can be obtained as described above. The "Long" video recording mode is suitable for an application with a relatively long recording time but requiring a not so high picture quality of decoded pictures. The bit rates for the "Network" video recording mode are set at values allowing real time transmission through an ISDN (Integrated Service Digital Network). Thus, the "Network" video recording mode is suitable for an application involving such transmission.

It should be noted that, in the "Long" video recording mode, the number of pixels composing a frame is about ¼ of those of the "High" and "Normal" video recording modes. The number of pixels for the "Network" video recording mode is even smaller. The frame rate, that is, the number of frames per second, is 30 for the "High" and "Normal, and "Long" video recording modes and 10, ⅓ of 30, for the "Network" video recording mode.

Refer back to FIG. 8. In an audio recording mode field 328, an audio recording mode is set. 3 audio recording modes, namely, 2 channels (dual), stereo and monophonic (single) are provided.

It should be noted that, in the "High" and "Long" video recording modes, either the 2-channel audio recording mode or the stereo audio recording mode can be selected as shown in the table of FIG. 10. In the "Normal" video recording, however, the audio recording mode is fixed at the 2-channel mode and, in the "Network" video recording, however, the audio recording mode is fixed at the monophonic mode.

An auto check box 329 of a clip creation folder is checked to request that a folder set in advance to be used as a folder for creating a clip. A clip is a pair of MPEG and index files. In the slip recorder, such a pair is referred to as a tape. In the clip editor and the clip viewer, however, the pair is called a clip. Thus, a normal tape is considered to be the same as a clip. Composed of a plurality of pairs of MPEG and index files, however, an endless tape corresponds to a plurality of clips.

A reference button 330 of the clip creation folder is operated to specify a folder for creating a clip.

On an information field 331, information including a size, a frame rate, a video bit rate and an audio bit rate of a decoded picture obtained as a result of encoding in a video recording mode set in the video recording node field 327 is displayed. That is to say, the information such as size shown in the table of FIG. 10 for the specified video recording mode is displayed on the information field 331.

Also displayed on the information field 331 is a size or a recording capacity of a tape allocated on the hard disc 212, that is, a size of a disc area allocated to the tape for recording an MPEG system stream obtained as a result of an encoding operation in a video recording mode set in the video recording mode field 327 for a recording time set in the recording time field 325.

The size of the tape is typically calculated as follows.

The system bit rate for a video recording mode set in the video recording mode field 327 is multiplied by a recording time set in the recording time field 325 to find the size of the MPEG file of the tape. The size of the index file of the tape is estimated to be typically 0.1% of the size of the MPEG file. Finally, the size of the tape is found by adding the size of the index file to the size of the MPEG file.

It should be noted that, basically, system bit rates for the video recording modes have the values shown in the table of FIG. 10. For the "Normal" video recording mode, however, a value smaller than a system bit rate of 1,411,200 bps shown in the table of FIG. 10 is used for a reason described as follows. The system bit rate shown in the table of FIG. 10 for the "Normal" video recording mode is a value applicable to an operation to record an MPEG system stream onto a video CD. This value represents the bit rate of a bit stream obtained by adding information such as a sink and a header prescribed in video CD specifications to a pack of the MPEG system stream. That is to say, the system bit rate shown in the table of FIG. 10 is a bit rate conforming to the video CD specifications. In an operation to record an MPEG system stream onto the hard disc 212, such information including a sink and a header is not required. In addition, when viewed from the standpoint of the utilization efficiency of the hard disc 212, unnecessary data should not be recorded in the hard disc 212.

Thus, for the "Normal" video recording mode, the size of a tape is calculated by assuming that the bit rate of the MPEG system stream composing of only a pack is 1,394, 400 bps.

To put it concretely, consider the embodiment shown in FIG. 8 in which the "Normal" video recording mode is selected and a recording time of 1 hour is set. If a normal tape is specified as a tape type, the size of the tape will be computed by multiplying the system bit rate 1,394,400 bps by the recording time 1 hour and adding 0.1% of the product obtained as a result of the multiplication to the product. In the embodiment shown in FIG. 8, however, an endless tape is specified as a tape type. According to what has been described before, the recording capacity of the endless tape is longer than the recording time 1 hour specified in the recording time field 325 by a difference of 15 minutes. An endless tape size of 748.76 MB is found by multiplying the system bit rate 1,394,400 bps by the recording time (1 hour+15 minutes) and adding 0.1% of the product obtained as a result of the multiplication to the product. The size 748.76 MB of the endless tape is displayed on the information field 331 of the tape setting dialog box 321 shown in FIG. 8.

An OK button 332 is operated to confirm items set anew in the tape setting dialog box 321 and close the dialog box 321. A cancel button 333 is operated to keep items set previously in the tape setting dialog box 321 and close the dialog box 321. A help button 334 is operated to display explanations for helping the user understand the tape setting dialog box 321.

Next, the recording process carried out by means of the slip recorder is explained by referring to flowcharts shown in FIGS. 11 and 12.

In order to carry out a recording operation, first of all, the user opens the tape setting dialog box 321 shown in FIG. 8 for setting a tape as described earlier.

Then, assume that a television broadcast program is recorded as an example. In this case, the input switch button 312 of the slip recorder main window 301 shown in FIG. 7 is operated to select the output of the TV tuner 213A shown in FIG. 5 as an input to the recording process. Then, one of the up and down buttons 313 or one of the channel buttons 314 is operated to select the channel of the program to be recorded.

When recording or dubbing pictures and the accompanying sound which have been recorded by means of the video camera 214, video and audio output terminals of the video camera 214 not shown in the figures are connected to the AV terminal unit 84 on the rear surface of the main unit 31 or the AV terminal unit 43 on the front surface thereof. Then, the input switch button 312 is operated to select the AV terminal unit 84 or 43 as an input to the recording process.

When the user operates the recording button 309 of the slip recorder main window 301 after the setting operations described above, the microprocessor 201 carries out a recording process in accordance with the flowchart shown in FIG. 11 or 12.

The flowchart shown in FIG. 11 represents a recording process wherein a normal tape has been set as a tape used in the recording process. As shown in the figure, the flowchart begins with a step S1 to form a judgment as to whether a tape can be created or not.

An area in the hard disc 212 required for a recording process is not allocated to a specified tape by merely setting the tape through the tape setting dialog box 321. That is to say, it is not until the recording button 309 is operated that a tape is allocated in the hard disc 212. This is because, when viewed from the standpoint of utilization efficiency of the hard disc 212, allocation of a tape prior to the start of a recording process is not desirable.

In the formation of the judgment at the step S1, the size of the specified tape is computed in the way described earlier. The judgment is then based on confirmation as to whether an area with the computed size can be allocated in the hard disc 212.

If the outcome of the judgment formed at the step SI indicates that the specified tape can not be made, that is, if the outcome indicates that a free area with a size at least equal to the computed tape size in the hard disc 212 can not be allocated to the specified tape, typically a message indicating this problem is displayed and the recording process is terminated. In this case, no recording is carried out.

If the outcome of the judgment formed at the step Si indicates that the specified tape can be made, that is, if the outcome indicates that an MPEG file and an index file of the specified tape can be stored in the hard disc 212, on the other hand, the flow of the process goes on to a step S2 at which the MPEG and index files are allocated in the hard disc 212. It should be noted that, at the present stage, the MPEG and index files contain no meaningful information in particular as described before. That is to say, a free area in the hard disc 212 is merely allocated to the MPEG and index files.

Then, the flow of the process proceeds to a step S3 at which the MPEG file of the tape is opened. The flow of the process then continues to a step S4 at which the MPEG1 real time encoder board 213 is controlled to carry out MPEG processing therein on an input selected by operating the input switch button 312.

Subsequently, the flow of the process goes on to a step S5 at which an MPEG system stream obtained as a result of the MPEG encoding is transferred to the hard disc 212 to be written into the MPEG file allocated therein at the step S2. Then, the flow of the process proceeds to a step S6 to form a judgment as to whether or not the MPEG system stream being written has reached the end of the MPEG file and whether or not the stop button 308 has been operated to request that the recording process be terminated. If the outcome of the judgment indicates that the MPEG system stream being written has not reached the end of the MPEG file and the stop button 308 has not been operated, the flow of the process returns to the step S4 to continue the encoding and the recording of object pictures.

If the outcome of the judgment indicates that the MPEG system stream being written has reached the end of the MPEG file or the stop button 308 has been operated, on the other hand, the flow of the process goes on to a step S7 at which the MPEG file is closed to end the recording process.

The following is a description of a recording process wherein an endless tape has been set as a tape used in the recording process carried out in accordance with the flowchart of FIG. 12.

As shown in the figure, the flowchart begins with a step S11 to be followed by a step S12 which are basically the same as the steps Si and S2 of the flowchart shown in FIG. 11 respectively. It should be noted, however, that at the step S12, an endless tape comprising a plurality of fixed tapes like the one shown in FIG. 9B described before is created.

After completing the processing of the step S12, the flow of the process goes on to a step S13 at which the MPEG file of a head fixed tape, that is, the first fixed tape, of the endless tape is opened. The flow of the process then proceeds to a step S14 at which the MPEG1 real time encoder board 213 is controlled to carry out MPEG processing therein on an input selected by operating the input switch button 312.

Subsequently, the flow of the process goes on to a step S15 at which an MPEG system stream obtained as a result of the MPEG encoding is transferred to the hard disc 212 to be written into the MPEG file. Then, the flow of the process proceeds to a step S16 to form a judgment as to whether or not a request has been made to terminate the recording process typically by operating the stop button 308. If the outcome of the judgment formed at the step S16 indicates that a request has not been made to terminate the recording process, the flow of the process continues to a step S17 to form a judgment as to whether or not the MPEG system stream being written has reached the end of the MPEG file of the fixed tape. If the outcome of the judgment formed at the step S17 indicates that the MPEG system stream being written has not reached the end of the MPEG file of the fixed tape, the flow of the process returns to the step S14 to continue the encoding and the recording of object pictures.

If the outcome of the judgment formed at the step S17 indicates that the MPEG system stream being written has reached the end of the MPEG file of the fixed tape, on the other hand, the flow of the process goes on to a step S18 at which this MPEG file is closed. Then, the flow of the process proceeds to a step S19 at which the MPEG file of the next fixed tape is opened. The flow then returns to the step S14. As a result, the MPEG system stream is recorded on the MPEG file of the next fixed tape.

As the MPEG system stream being written has reached the end of the MPEG file of the last fixed tape, at the step S19, the MPEG file of the first fixed tape is opened again. The MPEG system stream is then recorded on the first fixed tape, overwriting data recorded thereon previously. As a result, the MPEG system stream is recorded endlessly so to speak till the outcome of the judgment formed at the step S16 indicates that a request has been made to terminate the recording process.

When the stop button 308 is operated, for example, the outcome of the judgment formed at the step S16 indicates that a request has been made to terminate the recording process. In this case, the flow of the process goes on to a step S20 at which the opened MPEG file is closed to terminate the recording process.

In the recording process, an MPEG system stream is recorded on the MPEG file of a tape as described above and, at the same time, predetermined data is stored in the index file of the same tape.

Figure 13:
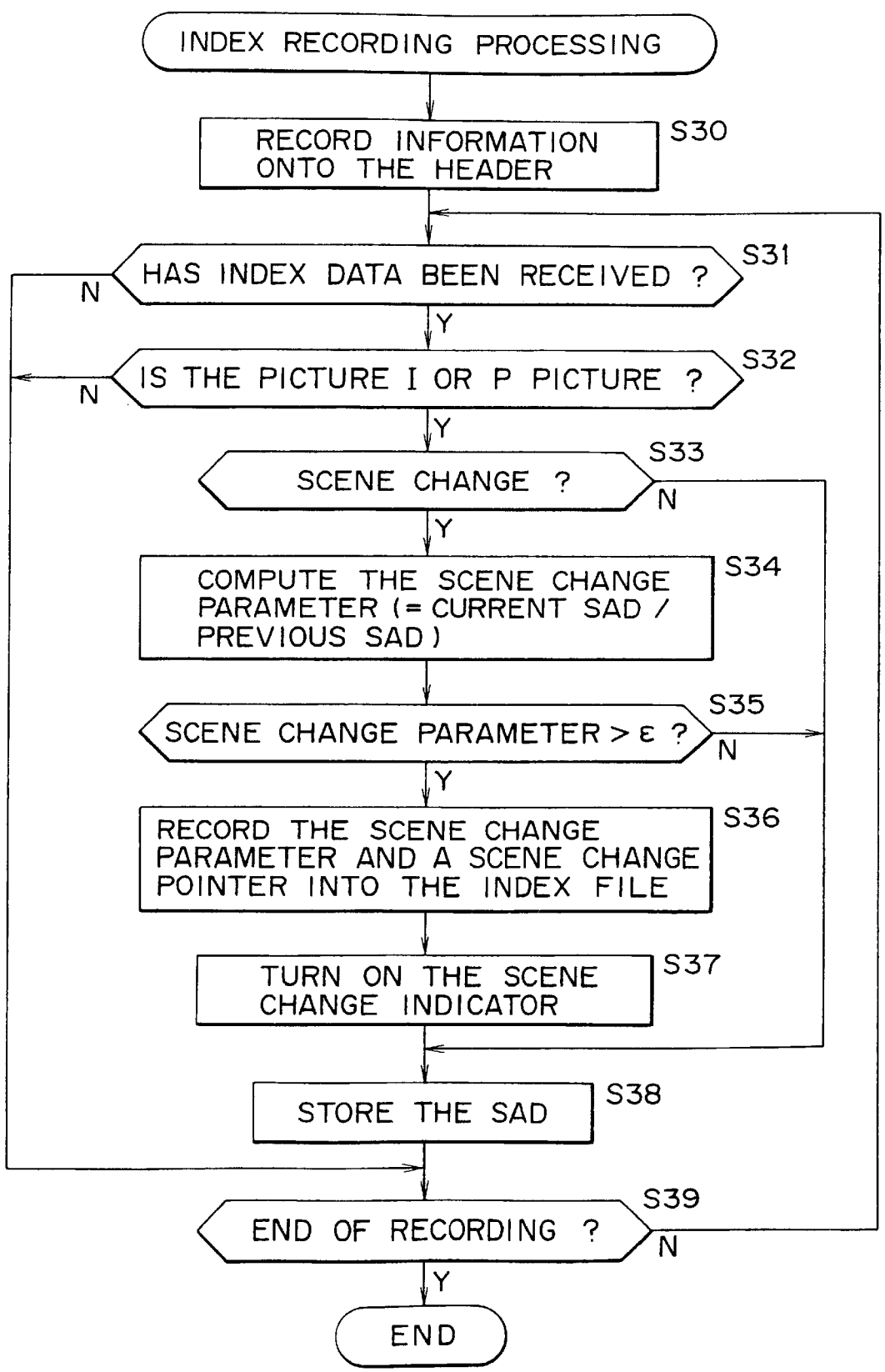
FIG. 13 shows a flowchart representing an index recording process to record index data in an index file.

FIG. 13 shows a flowchart representing an index recording process to record data in an index file.

As shown in the figure, the flowchart begins with a step S30 at which an index file is opened and a header is recorded in the index file. The header includes, among other information, a start time and a recording mode set on the tape setting dialog box 321 shown in FIG. 8. The start time is a time, strictly speaking, the present time, at which recording is started. The flow of the process then goes on to a step S31 at which the microprocessor 201 forms a judgment as to whether or not index data has been transmitted by the scene change detecting circuit 131 employed in the MPEG1 real time encoder board 213 shown in FIG. 6. If index data has not been received, the flow of the processing goes on to a step S39, skipping steps S32 to S38.

If the outcome of the judgment formed at the step S31 indicates that index data has been transmitted by the scene change detecting circuit 131 shown in FIG. 6, on the other hand, the microprocessor 201 receives the index data. The flow of the process then proceeds to the step S32.

FIG. 14 is a diagram showing a typical format of index data transmitted by the scene change detecting circuit 131.

As shown in the figure, the index data comprises a 4-bit area for storing a variety of flags followed by a 28-bit area for storing the second parameter SAD computed by using Eq. (4) as described earlier to give a total length of 32 bits. The 4-bit area typically includes a picture type flag and a scene change flag. The picture type flag indicates a picture type of a frame subjected to computation of the second parameter SAD and the scene change flag indicates whether or not the scene change detecting circuit 131 has detected a scene change.

Refer back to FIG. 13. At the step S32, the microprocessor 201 examines the index data received from the scene change detecting circuit 131 in order to form a judgment as to whether the index data indicates an I or P picture. It should be noted that the judgment is formed typically by referring to the picture type flag included in the index data.

If the outcome of the judgment formed at the step S32 shows that the index data indicates that the picture type is neither an I picture nor a P picture, that is, if the picture type is the B picture, the flow of the processing goes on to the step S39, skipping the steps S33 to S38. If the outcome of the judgment formed at the step S32 shows that the index data indicates an I picture or a P picture, on the other hand, the flow of the process proceeds to the step S33 at which the microprocessor 201 forms a judgment as to whether or not a scene change in the I or P picture has been detected. It should be noted that the judgment is formed typically by referring to the scene change flag included in the index data.

If the outcome of the judgment formed at the step S33 indicates that a scene change has not been detected, the flow of the processing goes on to the step S38, skipping the steps S34 to S37. If the outcome of the judgment formed at the step S33 indicates that a scene change has been detected, on the other hand, the flow of the processing goes on to the step S34 at which the microprocessor 201 computes a scene change parameter. To be more specific, the microprocessor 201 divides an SAD included in the index data received this time by a previous SAD saved at the step S38 to be described later, using a result of the division as a scene change parameter.

The scene change parameter indicates the magnitude of a scene change, that is, a degree to which a screen changes. The larger the magnitude, the greater the value of the scene change parameter. It should be noted that the scene change parameter is not limited to the quantity obtained by the division described above. The scene change parameter can be any quantity of physics as long as the quantity indicates the magnitude or the degree of a scene change.

After the scene change parameter is computed, the flow of the process continues to the step S35 at which the microprocessor 201 forms a judgment as to whether or not the scene change parameter is greater than a predetermined threshold value $\epsilon$ of typically 3. If the outcome of the judgment formed at the step S35 indicates that the scene change parameter is not greater than the predetermined threshold value $\epsilon$, the flow of the processing goes on to the step S38, skipping the steps S36 and S37.

If the outcome of the judgment formed at the step S35 indicates that the scene change parameter is greater than the predetermined threshold value $\epsilon$, on the other hand, the flow of the processing goes on to the step S36 at which a scene change pointer is found and associated with the scene change parameter. A scene change pointer is information on a location in the MPEG file for storing encoded data of a frame whose scene change is represented by the scene change parameter. Then, an identification flag to be described later is added to the scene change pointer and the scene change parameter. Finally, the identification flag, the scene change pointer and the scene change parameter are stored in the index file.

It should be noted that a scene change pointer is typically an offset of a specific location expressed in terms of bytes from the head of an MPEG file for storing encoded data at the specific location.

For the sake of convenience, information comprising a scene change pointer, a scene change parameter and an identification flag added thereto is referred to as an index. An index plays the role of a mark indicating the position of a scene change.

It should be noted that, an index appended by the microprocessor 201 and stored in the index file in a recording operation is referred to as an automatic index. An index can also be appended by a predetermined operation carried out by the user. An index appended by an operation carried out by the user is referred to as a manual index. The identification flag is typically 1-bit flag for distinguishing an automatic index from a manual index.

After the processing of the step S36, the flow of the process goes on to the step S37 at which a scene change indicator 303 is displayed on the slip recorder main window 301 shown in FIG. 7 for a predetermined period of time in order to inform the user that a scene change has occurred. The flow of the process then proceeds to the step S38 at which the SAD included in the index data received this time is stored in the main memory unit 202 to replace the SAD stored previously. Then, the flow of the process continues to the step S39 to form a judgment as to whether or not the operation to record the MPEG system stream into the MPEG file has been finished. If the operation to record the MPEG system stream into the MPEG file has not been finished, the flow of the process returns to the step S31 to repeat the operations described above.

If the outcome of the judgment formed at the step S39 indicates that operation to record the MPEG system stream into the MPEG file has been finished, on the other hand, the index file is closed to terminate the index recording process.

In the embodiment represented by the flowchart shown in FIG. 13, only if the scene change flag indicates that a scene change has been detected by the scene change detecting circuit 131 and the scene change parameter is greater than the predetermined threshold value $\epsilon$ is an index recorded. It should be noted that an index may also be recorded without regard to the magnitude of the scene change parameter. In this case, however, an index is appended also to a frame without such a large scene change, increasing the number of indexes as a result.

If any arbitrary scene of an already recorded picture can be played back in the course of recording of pictures and their accompanying sound, more convenience can be reaped from the personal computer. When the user looks at something else in the course of recording of pictures and their accompanying sound, overlooking a scene, for example, more convenience can be reaped from the personal computer if the user is allowed to retroactively play back recorded pictures including the overlooked one.

In order to provide such convenience, the slip recorder is designed to include a function that allows any arbitrary scene of an already recorded picture to be played back in the course of recording of pictures and their accompanying sound while the recording is being carried out, that is, without the need to suspend the recording operation. Such a playback operation is referred to hereafter as a slip playback operation for the sake of convenience.

Figure 15:
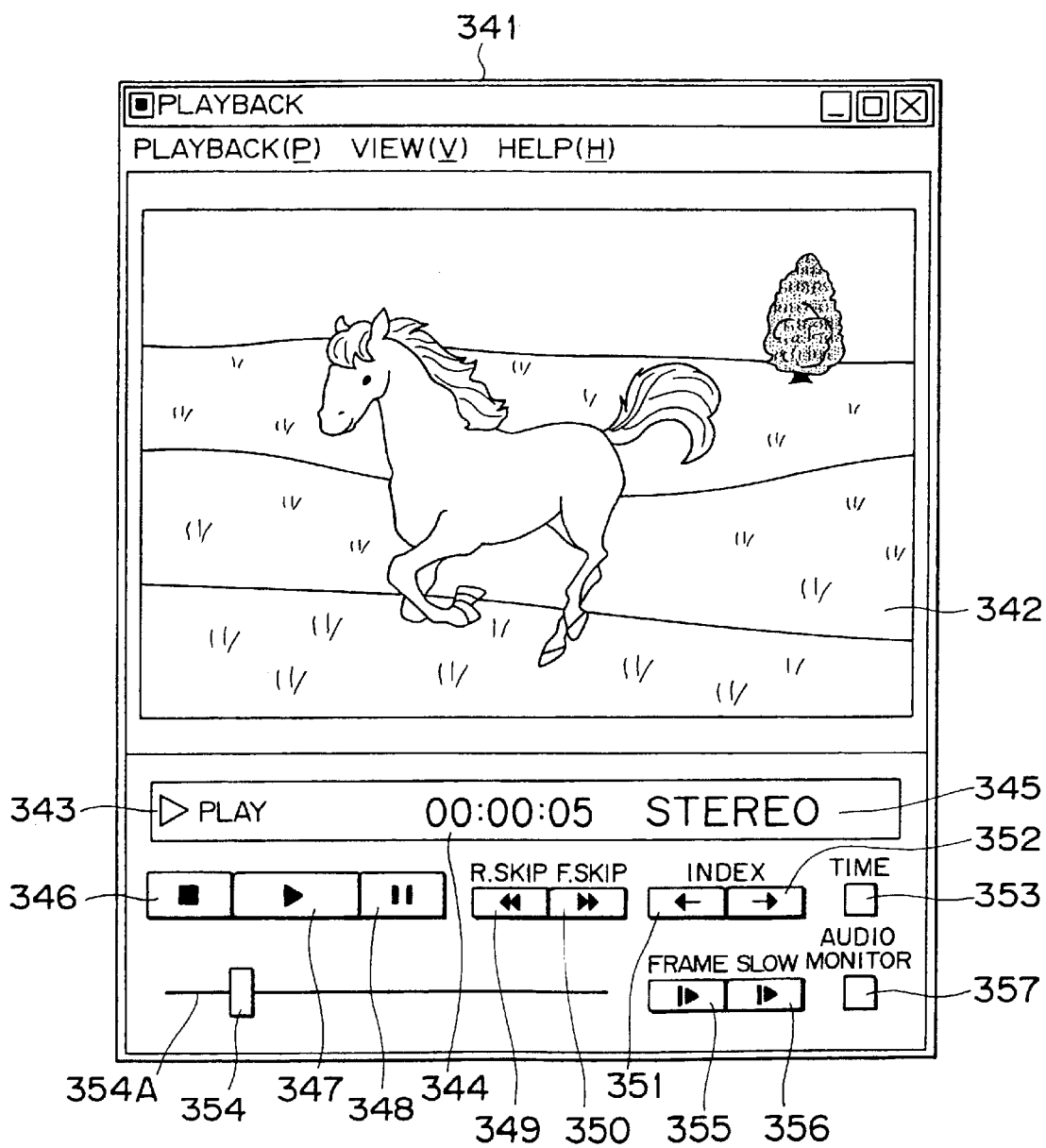
FIG. 15 is a diagram showing a playback window 341.

In order to carry out a slip playback operation, the user selects a "Slip" item from a "Playback" menu at the upper portion of the slip recorder main window 301 shown in FIG. 7. When the "Slip" item is selected, typically, a playback window 341 like one shown in FIG. 15 is displayed.

On a picture display area 342 of the playback window 341, a played back picture is displayed. On the playback indicator 343, the current playback status is displayed. To be more specific, for example, a message "PLAY" indicating that the playback operation is underway, "PAUSE" indicating that the playback operation is temporarily suspended, "STOP" indicating that the playback operation is halted, "SLOW" indicating that a slow playback operation is under way, "F. SKIP" indicating that a skip operation in the forward direction is under way or "R. SKIP" indicating that a skip operation in the backward direction is under way is displayed on the playback indicator field 343.

Figure 16:
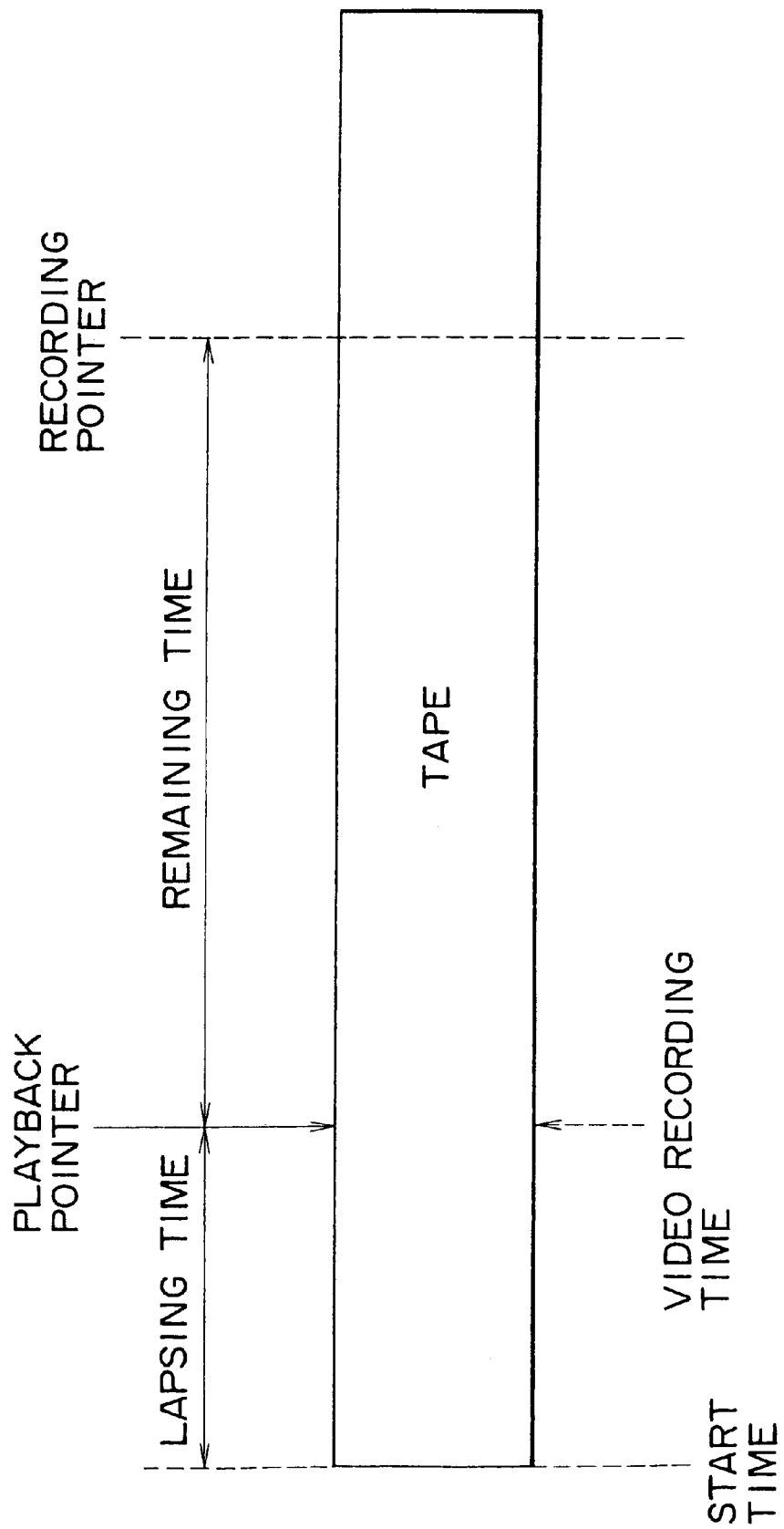
FIG. 16 is a diagram used for explaining a lapsing period of time, a remaining period of time and a recording point of time.

On a playback time display field 344, one of the following 3 pieces of information is displayed as shown in FIG. 16:

a lapsing period of time since a point of time recording is started (referred to hereafter as a start point of time for the sake of convenience) to a position subjected to a slip playback operation (referred to hereafter as a playback point for the sake of convenience);

a remaining period of time from the playback point to a position subjected to recording (referred to hereafter as a recording point for the sake of convenience); or a point of time at which a picture, that is, encoded data, at the playback point was recorded (referred to hereafter as a recording point of time for the sake of convenience).

It should be noted that, in the case of an already recorded tape, the remaining period of time is a period from the playback point to the end of the tape. One of the 3 pieces of information to be displayed is selected by operating a playback time display change button 353.

In a slip playback operation, the relative positional relation between the playback and recording points does not change as long as the playback point is not shifted by a slider 354 to be described later. Thus, in a slip playback operation, if a remaining period of time is selected, time information displayed on the playback time display field 344 remains fixed or all but fixed because the remaining period of time is a period corresponding to a distance from a playback point to a recording point.

It should be noted that the playback window 341 is opened not only when a slip playback operation is requested, but also when a request is made to monitor an input selected by the input switch button 312 of the slip recorder main window 301 or a request is made to play back a tape which has completed a recording operation. When the playback window 341 is opened for monitoring a selected input, "-- : -- : --" is displayed on the playback time display field 344. When the playback window 341 is opened for playing back a tape which has completed a recording operation and a remaining period of time is selected as time information to be displayed on the playback time display field 344, a period from a playback point to the end of the tape is displayed.

On an audio output mode display field 345, the current audio output mode is displayed. Typically, there are provided 3 audio output modes, namely, a stereo audio output mode, a mode to output sound from the right and left speakers of the L channel only and a mode to output sound from the right and left speakers of the R channel only. One of the 3 audio output modes is selected by operating an audio output switch button 357. It should be noted that, when the stereo audio output mode, the mode to output sound from the right and left speakers of the L channel only or the mode to output sound from the right and left speakers of the R channel only is selected, on the audio output mode display field 345, a message "STEREO", "L ONLY" or "R ONLY" is respectively displayed A stop button 346, a playback button 347 or a pause button 348 is operated to respectively halt, start or temporarily suspend the playback operation. A skip button 349 or 350 is operated to skip a portion of the tape in the backward or forward direction respectively. An index button 351 or 352 is operated to skip a portion of the tape to a frame with an index appended thereto that is closest to a playback point in the backward or forward direction respectively.

The playback time display change button 353 is operated to select time information to be displayed on the playback time display field 344. It should be noted that, each time the playback time display change button 353 is operated, the time information is changed on a rotation basis for example as follows: a lapsing period of time → a remaining period of time → a recording point of time → a lapsing period of time - - - and so on.

The slider 354 is used to change the playback point. To put it in detail, the slider 354 can be shifted typically by dragging it using the mouse 22. At that time, the playback point is changed to a position corresponding to a location of the slider 354. It should be noted that the slider 354 can be shifted horizontally along a groove provided for the motion of slider 354. The left end of the groove of the slider 354 corresponds to a position at which recording is started, that is, the beginning of an MPEG file. On the other hand, the right end of the groove of the slider 354 corresponds to a recording point. Thus, the user is capable of playing back any arbitrary screen between a position at which the recording was started and a point immediately preceding a screen currently being recorded by operating the slider 354.

It should be noted, however, that in the MPEG1 real time encoder board 213, a pre-encoding picture is temporarily stored in the frame memory unit 110 and code obtained as a result of the encoding is temporarily stored in the output buffer 118 as described above. In addition, it takes time to a certain degree to carry out MPEG encoding and to store code obtained as a result of the MPEG encoding in the output buffer 118. Thus, a screen that can be subjected to a slip playback operation is a screen preceding a screen currently being recorded by at least a period in the range about 10 seconds to 15 seconds.

The slider 354 can be shifted by the user as described above. In addition, the slider 354 is also shifted in a playback operation along with the motion of the playback pointer. Furthermore, the slider 354 is shifted when the playback point is moved by operating the skip button 349 or 350, or the index button 351 or 352.

It should be noted that when the slider 354 is shifted to change the playback point, the time information displayed on the playback time display field 344 is also changed in accordance with a change in playback point position.

With a playback operation temporarily halted by operating the pause button 348, a frame feed button 355 is operated to feed a frame, that is, to display a next frame on the picture display area 342. A slow playback button 356 is operated to carry out a slow playback operation. The audio output switch button 357 is operated to select an audio output mode. It should be noted that, each time the audio output switch button 357 is operated, the audio output mode is changed on a rotation basis for example as follows: the stereo audio output mode → the mode to output sound from the right and left speakers of the L channel only → the mode to output sound from the right and left speakers of the R channel only → the stereo audio output mode - - - and so on.

Next, a slip playback process carried out by the slip recorder is explained by referring to a flowchart shown in FIG. 17.

As shown in the figure, the flowchart begins with a step S40 at which the microprocessor 201 reads out an MPEG system stream from the head of an MPEG file of a tape currently subjected to a recording operation when the playback window 341 is operated. The flow of the process then goes on to a step S41 at which the microprocessor 201 executes an application program stored in the hard disc 212 to decode the MPEG system stream read out at the step S40. The application program, which is called an MPEG1 software decoder 201A shown in FIG. 18, is an application program for carrying out MPEG decoding as will be described later. Then, the flow of the process proceeds to a step S42 at which a result of the decoding is output.

To be more specific, at the step S42, a picture of the decoding result is displayed on the picture display area 342 of the playback window 341 whereas sound of the decoding result is output to the speakers 59 and 60.

Subsequently, the flow of the process continues to a step S43 at which time information corresponding to a position in the MPEG system stream read out at the step S40 is displayed on the playback time display field 344 of the playback window 341. The time information displayed on the playback time display field 344 is one of the aforementioned 3 types of information selected by operating the playback time display change button 353. The time information is found by the microprocessor 201 as follows.

As described above, since the MPEG system stream has a fixed rate, a lapsing period of time corresponding to a position in the MPEG system stream read out at the step S40 can be found from a recording position in the MPEG system stream, that is, a recording offset from the beginning of the MPEG file expressed in terms of bytes. A remaining period of time can be found as a distance expressed in terms of bytes from a position in the MPEG system stream read at the step S40 to a position in the MPEG system stream currently being recorded. A recording point of time is found by adding the lapsing period of time to a recording start point of time stored at the head of an index file of the tape as described before.

Pieces of time information for each position in an MPEG system stream recorded in an MPEG file can be found in a way described above. It should be noted that, as a typical alternative, a recording point of time for each point in the MPEG system stream is stored and the other pieces of time information can be found from the recording point of time.

After completing the processing of the step S43, the flow of the process goes on to a step S44 at which the microprocessor 201 forms a judgment as to whether or not the playback point has been changed typically by shifting the slider 354 or operating the skip button 349 or 350, or the index button 351 or 352. If the outcome of the judgment formed at the step S44 indicates that the playback point has not been changed, the flow of the process returns to the step S40 at which a continuation to the MPEG system stream read out in the immediately preceding iteration is read out from the MPEG file. The pieces of processing of the subsequent steps are then repeated.

If the outcome of the judgment formed at the step S44 indicates that the playback point has been changed, on the other hand, the flow of the process goes on to a step S45 to change a position in the MPEG system stream, from which code is read out, in accordance with the change in playback point. The flow of the process then returns to the step S40 at which the MPEG system stream is read out from the new position set at the step S45.

The pieces of processing of the subsequent steps are then repeated.

The slip playback process is terminated typically when the playback window 341 is closed or when the stop button 346 is operated.

As described above, during a recording operation, pictures and their accompanying sound already recorded in the hard disc 212 can be played back starting from any arbitrary position while the recording operation is being continued. Thus, the user is capable of viewing a desired scene without suspending the recording operation.

In addition, since time information is displayed on the playback time display field 344 of the playback window 341, by referring to the displayed time information, the user is capable of finding a desired scene in a relatively short period of time.

It should be noted that, during a slip playback operation, data is read out and written from and into the hard disc 212 on the so-called time sharing basis. The scheduling of the operations to read out and write data is carried out under control of the Windows 95 OS (operating system) without any intervention in particular by the Slipclip application program. It should be noted, nevertheless, that the scheduling can also be controlled by the Slipclip application program itself.

To put it in detail, operations to read out and write data from and into a hard disc put to practical use nowadays are carried out at a sufficiently high speed, making it basically possible to carry out a slip playback process by merely reading out and writing data from and into the hard disc under I/O control of the OS without the need to suspend a recording operation.

As described above, a picture reproduced in a slip playback operation is displayed on the picture display area 342 of the playback window 341 as shown in FIG. 15. In addition, such a picture can also be displayed on a so-called full screen. That is to say, the picture display area 342 can be enlarged to the whole screen of the display apparatus 51.

Next, the processing carried out by the slip recorder is explained more by referring to FIG. 18.

During a recording operation carried out by the slip recorder, in the MPEG1 real time encoder board 213, a picture and its accompanying sound are subjected to MPEG encoding to produce an MPEG system stream which is then recorded into an MPEG file of a tape created in advance in the hard disc 212. Then, a scene change parameter is computed from index data output by the MPEG1 real time encoder board 213. The scene change parameter is then stored in an index file of the tape created in advance in the hard disc 212 along with a scene change pointer and an identification flag.

As shown in FIG. 18, at the head of the index file, a header (H) including a start time and a recording mode is recorded. The start time is a point of time at which recording is started.

Figure 19:
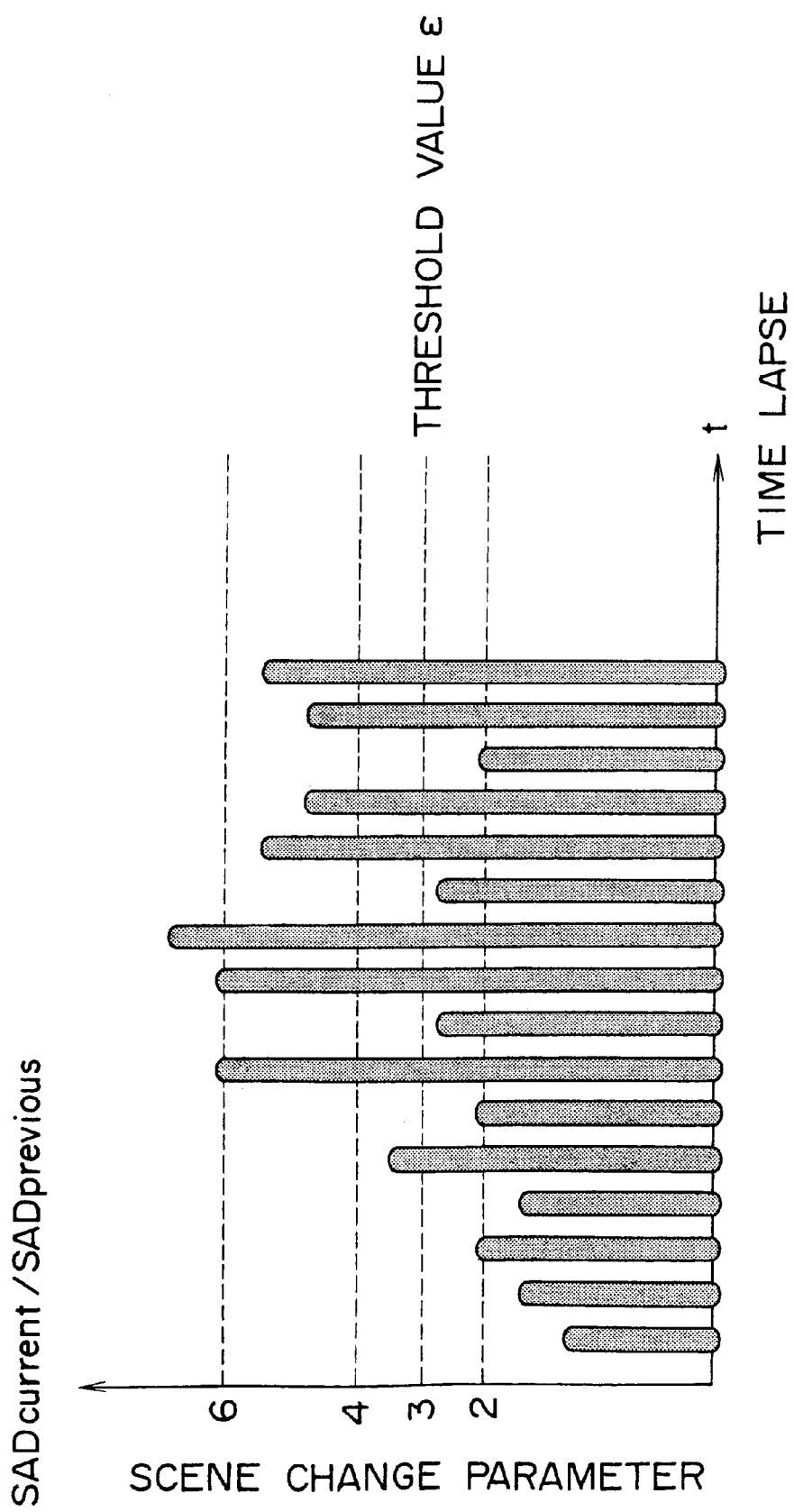
FIG. 19 is a diagram showing variations of a scene change parameter with the lapse of time.

An identification flag, a scene change pointer and a scene change parameter are recorded in the index file when a scene change flag included in index data indicates that a scene change has been detected and the scene change parameter is greater than the predetermined threshold value E as shown in FIG. 19. A scene change pointer recorded in the index file represents a position in the MPEG file as shown in FIG. 18. At that position, encoded data of a frame in which a scene change occurs is recorded.

In the slip playback process carried out by the slip recorder, on the other hand, the MPEG1 software decoder 201A, an application program for carrying out MPEG decoding, is executed by the microprocessor 201 to read out and decode data from any arbitrary position in an area in the MPEG file shown as a long black rectangular in FIG. 18. In the area, an MPEG system stream has already been recorded.

During a recording operation, the MPEG file is opened in the so-called shared mode so that the MPEG file can be accessed by a plurality of application programs. In the shared mode, the MPEG1 real time encoder board 213 is thus allowed to write an MPEG system stream into the MPEG file and, at the same time, the MPEG1 software decoder 201A is allowed to read out the MPEG system stream as well.

In the case of an endless tape, since the endless tape comprises a plurality of fixed tapes as described before, an MPEG system stream specified as code subjected to a slip playback operation may have been recorded in an MPEG file of a fixed tape different from an MPEG file of a fixed tape into which an MPEG system stream output by the MPEG1 real time encoder board 213 is written. In this case, the MPEG file in which an MPEG system stream specified as code subjected to a slip playback operation has been recorded is opened separately from the MPEG file into which an MPEG system stream output by the MPEG1 real time encoder board 213 is written. When the read operation is finished, the MPEG file in which an MPEG system stream specified as code subjected to a slip playback operation has been recorded is closed.

As described above, in this embodiment, an MPEG system stream is recorded in an MPEG file while indexes each comprising an identification flag, a scene change pointer and a scene change parameter are recorded in an index file which is allocated separately from the MPEG file. Thus, data conforming to MPEG specifications can be stored in an MPEG file and can therefore be used by another application program.

It should be noted that an MPEG system stream and indexes can also be recorded in the same file. In this case, however, it will be difficult for other application programs to use the file.

If an automatic index check box 326 of the tape setting dialog box 321 shown in FIG. 8 is not checked, unlike what has been described above, no index is recorded in an index file. That is to say, in this case, an index file comprises only a header.

As described above, recording and playback operations can be carried out concurrently. It should be noted that the "Normal" video recording mode has been assumed and, in order to simplify the description, the amount of data of a video element stream is computed instead of the amount of data of an MPEG system stream.

In the "Normal" video recording mode, a picture frame picture comprises 352 pixels×240 pixels as shown in the table of FIG. 10. Assume that each pixel comprises typically an 8-bits Y luminance signal and, if converted into a pixel, a 2-bit chrominance signal, namely, a 1-bit Cb chrominance signal and 1-bit Cr chrominance signal to give a total of 12 bits. Also assume that 1 GOP comprises typically 15 frames. In this case, the amount of data of 1 GOP (that is, the amount of data prior to encoding) is found by using the following equation to be 1,856 KB.

Amount of data=352 pixels×240 pixels×12 bits×15 frames/8 bits=1,856 KB In addition, in the "Normal" video recording mode, the video rate of a video elementary stream in the MPEG1 real time encoder board 213 is 1,151,929 bps and the frame rate is 30 frames/second as shown in the table of FIG. 10. Thus, picture data of 1 GOP which comprises 15 frames as described above is compressed into an amount of data expressed by the following equation:

1,151,929/30 frames×15 frames/8 bit=70.3 KB

Thus, in this case, the picture data is compressed at a compression ratio of 1/26.4 (=70.3 KB/1,856 KB).

By the way, the inventor of the present invention has found out through measurement that the transfer speed of a certain HDD is about 4 MB/second. At this transfer speed, the 70.3 KB compressed data of 1 GOP can be stored in the HDD in about 17.2 ms (=70.3/(4×1,024)).

Thus, even if a very long head seek time of the HDD, for example, a head seek time of 20 ms, is assumed, the length of time it takes to store compressed data of 1 GOP into the HDD is about 37.2 ms (=17.2 ms+20 ms).

On the other hand, a transfer speed at which data is read out from the HDD is generally higher than the write transfer speed. Assume that the read transfer speed is the same as the write transfer speed and that the read seek time is also the same as the write seek time which is 20 ms as described above. In this case, the length of time it takes to read out compressed data of 1 GOP from the HDD is also about 37.2 ms.

Since 1 GOP comprises 15 frames, it takes about 0.5 seconds to transfer 1 GOP at the transfer rate 30 frames/second. Since compressed data of 1 GOP can be read out and written in about 74.4 ms (=37.2 ms+37.2 ms), operations to record and play back pictures can be carried out concurrently during a transfer period of 1 GOP which is about 0.5 seconds.

It should be noted that, in the case of the "Long" video recording mode, the amount of data of 1 GOP prior to compression is 394 KB and reduced to 22.9 KB by encoding. Thus, the data is compressed at a compression ratio of about 1/17.2. Consider an HDD having the same specifications as the "Normal" video recording mode described above. In this case, since the length of time it takes to store or to read out compressed data of 1 GOP into or from the HDD is about 25.6 ms, operations to record and play back pictures can also be carried out concurrently during a transfer period of 1 GOP which is about 0.5 seconds.

By the way, since Windows 95 is an OS having a multitask function, other processing can be carried out while an operation to write an MPEG system stream into the hard disc 212 is in a wait state. Thus, if the user performs an operation requesting that other processing be carried out in the course of a slip playback, the other processing may be implemented even if an operation to write an MPEG system stream into the hard disc 212 is set at the highest priority. It is thus desirable for the user not to perform an operation requesting that other processing be carried out in the course of a slip playback. However, it is difficult to prevent all users without exception from doing such an operation.

On the other hand, if an operation to write an MPEG system stream into the hard disc 212 is in an excessively long wait state that can not keep up with the bit rate of the MPEG system stream, the MPEG system stream will be destroyed, making it difficult to decode the stream. It is thus necessary to absolutely prevent an MPEG system stream from being destroyed.

In case an operation to write an MPEG system stream into the hard disc 212 can not keep up with the bit rate of the stream, encoding carried out by the MPEG1 real time encoder board 213 is suspended under control executed by the controller 133 shown in FIG. 6.

Figure 20:
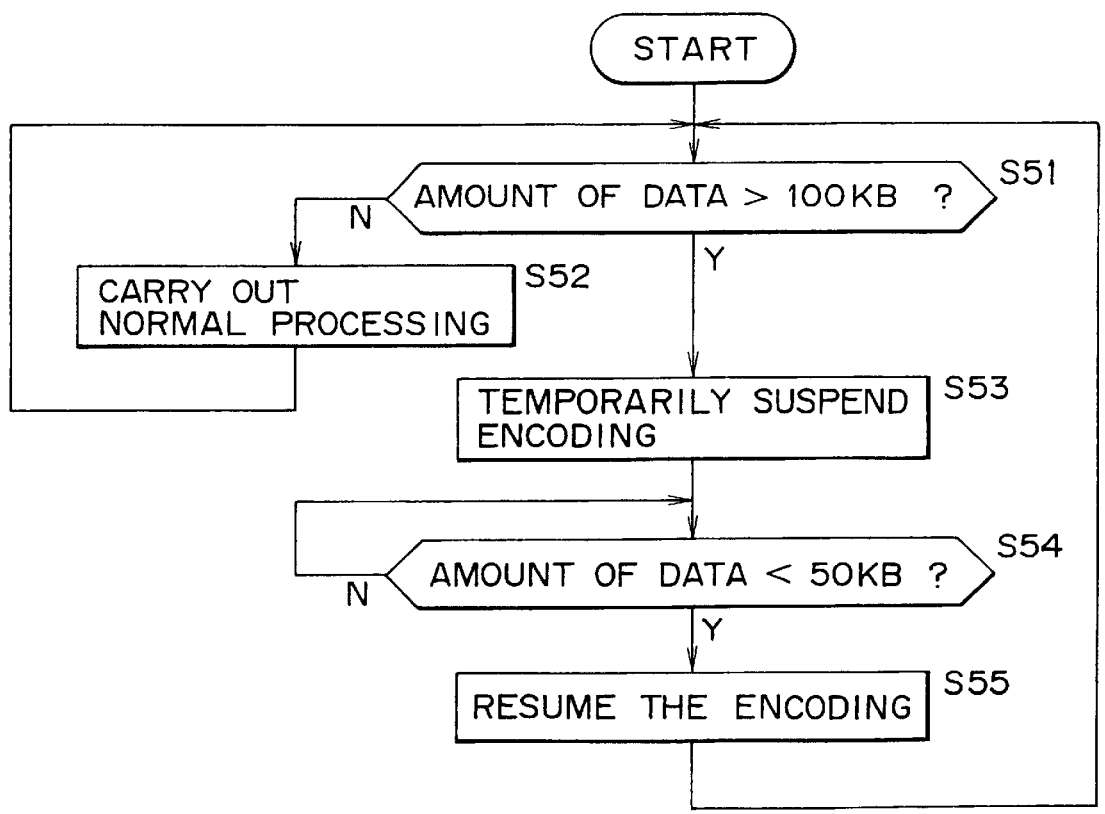
FIG. 20 shows a flowchart representing processing carried out by a:controller 133.

FIG. 20 shows a flowchart representing the control executed by the controller 133 which monitors the amount of data stored in the output buffer 118 as described before. As shown in the figure, the flowchart begins with a step S51 to form a judgment as to whether or not the amount of data stored in the output buffer 118 is greater than a predetermined value of typically 100 KB. If the outcome of the judgment formed at the step S51 indicates that the amount of data stored in the output buffer 118 is not greater than the predetermined value, the flow of the control goes on to a step S52 at which the controller 133 controls blocks composing the MPEG1 real time encoder board 213 to carry out MPEG encoding normally. The flow of the control then returns to the step S51. The reason why the predetermined value is set typically at 100 KB is that the typical storage capacity of the output buffer 118 is 160 KB as described before. It means that, if there is a margin or a free area of at least 60 KB in the output buffer 118, the MPEG encoding carried out by the MPEG1 real time encoder board 213 is continued as it is.

If the outcome of the judgment formed at the step S51 indicates that the amount of data stored in the output buffer 118 is greater than the predetermined value 100 KB, on the other hand, the flow of the control goes on to a step S53 at which the controller 133 suspends or temporarily halts the encoding carried out by the MPEG1 real time encoder board 213. To be more specific, the controller 133 typically neither lets more pictures be stored in the frame memory unit 110 nor a picture be read out from the frame memory unit 110. As a result, the operation to write the MPEG system stream into the hard disc 212 is also discontinued as well. To put it accurately, a device driver of the hard disc 212 does not make a request for an MPEG system stream anymore. Thus, if the amount of data stored in the output buffer 118 exceeds 100 KB, leaving only a free area smaller than 60 KB in the buffer 118, the controller 133 suspends or temporarily halts the MPEG encoding carried out by the MPEG1 real time encoder board 213.

The flow of the control then goes on to a step S54 at which the controller 133 forms a judgment as to whether or not the amount of data stored in the output buffer 118 is smaller than a predetermined value of typically 50 KB. If the outcome of the judgment formed at the step S54 indicates that the amount of data stored in the output buffer 118 is not smaller than the predetermined value, the flow of the control returns to the step 54. If the outcome of the judgment formed at the step S54 indicates that the amount of data stored in the output buffer 118 is smaller than the predetermined value, that is, if an operation to write an MPEG system stream into the hard disc 212 which has been put in a wait state so far is started to extract data from the output buffer 118, reducing the amount of data stored therein to a value smaller than 50 KB, on the other hand, the flow of the control goes on to a step S55 at which the controller 133 requests the MPEG1 real time encoder board 213 to resume the encoding. To be more specific, the controller 133 typically lets more pictures be stored in the frame memory unit 110 and a picture be read out from the frame memory unit 110. Then, the flow of control returns to the step S51.

As described above, in case an operation to write an MPEG system stream into the hard disc 212 can not keep up with the bit rate of the stream, encoding carried out by the MPEG1 real time encoder board 213 is suspended. It is thus possible to prevent the MPEG system stream from being destroyed.

It should be noted that, during an encoding suspension period, a picture supplied to the MPEG1 real time encoder board 213 is not stored in the frame memory unit 110 and, thus, not recorded. Since the number of such frames is expected to be not so large, however, no big problem is raised in comparison with a destroyed MPEG system stream.

As described above, when a free area left in the output buffer 118 becomes smaller than 60 KB in size, the MPEG encoding carried out by the MPEG1 real time encoder board 213 is suspended because of a reason described as follow. The MPEG encoding carried out by the MPEG1 real time encoder board 213 can be suspended only on a frame boundary. That is to say, once the MPEG encoding of a frame has been started, the encoding of the frame can not be suspended till the encoding is completed. A largest amount of data obtained as a result of MPEG encoding is output by intraframe encoding and, in general, the amount of data obtained as a result of intraframe encoding is expected to be about 40 KB.

Is obvious from the above discussion that data of the order of about 40 KB may be supplied to the output buffer 118 even if an attempt is made to suspend MPEG encoding. For this reason, it is necessary to assure that a free area with a size of at least 40 KB for accommodating such data is still left in the output buffer 118 before MPEG encoding can be suspended.

That is why, in this embodiment, when a free area left in the output buffer 118 becomes smaller than 60 Kb, the MPEG encoding is suspended. It should be noted that the number 60 KB is obtained by adding a safety margin of 20 KB to the data amount 40 KB.

Figure 21:
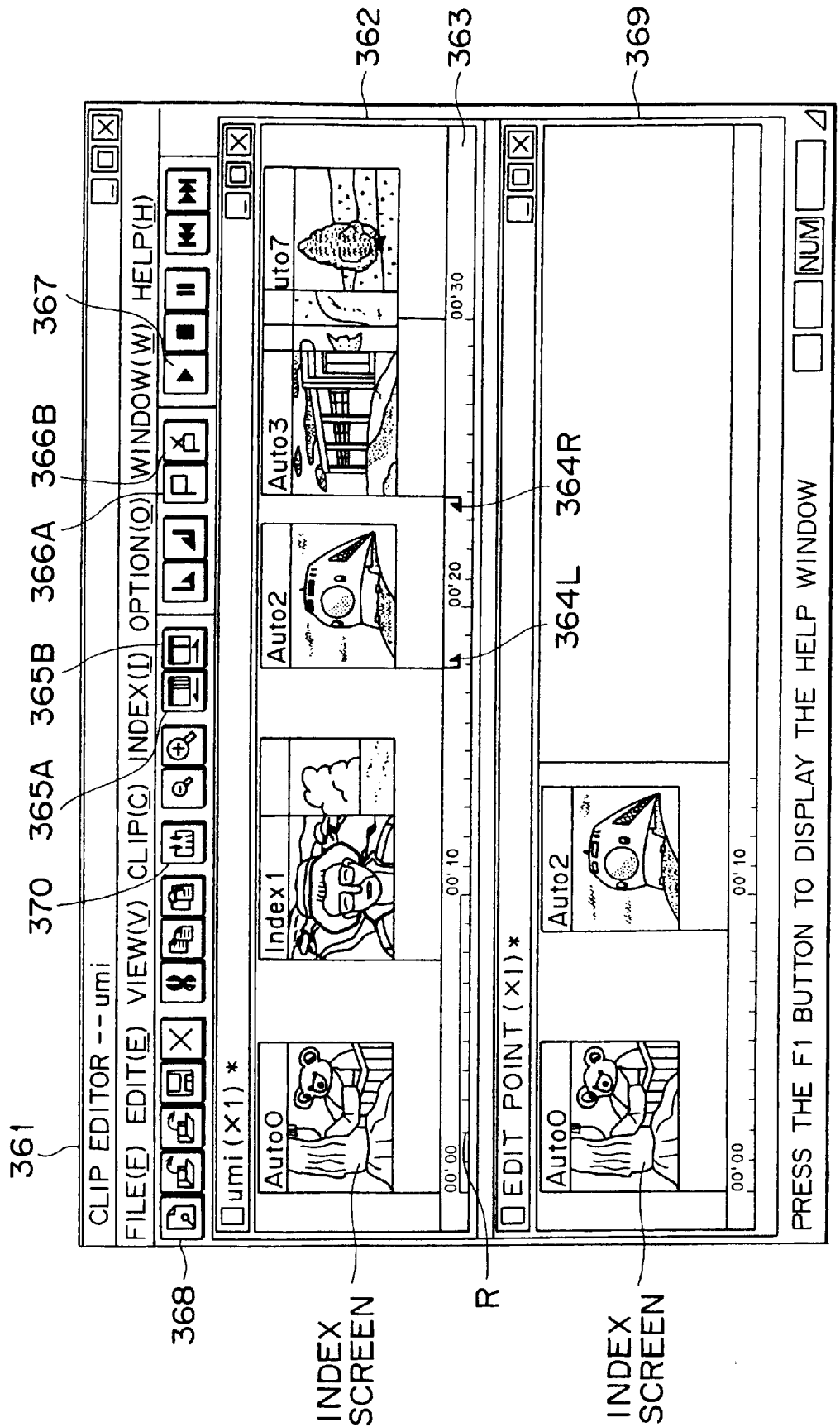
FIG. 21 is a diagram showing a clip editor main window 361.

Next, the clip editor is activated to edit pictures recorded by using the slip recorder. When the clip editor is activated, a clip editor main window 361 like one shown in FIG. 21 is displayed.

With the clip editor main window 361 displayed, the user specifies a clip as an object to be edited.

As described above, while a clip basically has the same meaning as a tape, in the description of the clip editor, the term clip is used. Thus, a clip comprises an MPEG file and an index file.

When a clip is specified, a source window 362 is displayed on the clip editor main window 361. Index screens of the specified clip are further displayed on the source window 361.

To put it in detail, the microprocessor 201 executes the MPEG1 software decoder 201A shown in FIG. 18 to decode encoded data of frames stored in the MPEG file of the specified clip at locations pointed to by scene change pointers stored in the index file of the same clip. The microprocessor 201 then displays shrunk screens of the decoded frames as the index screens on the source window 362.

It should be noted that, above each of the index screens, a name for identifying the index screen is displayed. In the embodiment shown in FIG. 21, examples of the names displayed above the index screens are Auto 0, Index 1, Auto 2 and Auto 3.

In the examples, the names "Auto n" where n is a number indicate that the index screens are associated with automatic indexes. On the other hand, the name "Index n" where n is a number is a default name indicating that the =index screen is associated with a manual index.

As described above, an automatic index is appended during a recording operation while a manual index can be appended to any arbitrary location on the source window 362 when the user operates typically an index adding button 366a on a tool bar of a clip editor main window 362. It should be noted that the location corresponds to a position on the MPEG system screen limited to the head of the GOP in the case of a manual index.

It is worth noting that, in an "Index" menu of the clip editor main window 361, there is included a "Change to manual index" item which can be clicked to change an automatic index to a manual index. Even if an automatic index is changed to a manual index, the name of the index screen representing the automatic index remains unchanged as it is. That is to say, the name "Auto n" is not changed to the name "Index n". An automatic index is changed to a manual index by inverting the identification flag of the index.

In addition, the name of an index screen associated with an automatic index appearing on the clip editor main window 361 is displayed in a color different from the name of an index screen associated with a manual index. In this way, an index screen associated with an automatic index and an index screen associated with a manual index can be distinguished from each other with ease.

An automatic or manual index can be deleted by operating a delete button 366B included in the tool bar of the clip editor main window 361.

At the bottom of the source window 362, a time line 363 used as a time axis is displayed. Typically, the left edge of an index screen coincides with a corresponding point of time on the time line 363. It should be noted that the corresponding point of time on the time line 363 is a time at which the index screen is recorded with the start of the recording taken as a reference.

An index screen is basically the first frame of a scene change. Thus, frames from an index screen to a frame immediately preceding the next index screen basically constitute a scene. Therefore, the user is capable of searching index screens for a desired one with ease.

When it is desired to confirm a picture after index screens have been displayed, a point on the time line 363 is dragged by using the mouse 22 along the time line 363 over a desired range. By doing so, the traced range is denoted by the symbol R in FIG. 21 and the range R is taken as a playback range. Then, when a playback button 367 included in the tool bar of the clip editor main window 361 is clicked, for example, a playback operation is carried out over the playback range R.

To put it in detail, in this case, the playback window 341 shown in FIG. 15 is typically opened. Then, the MPEG1 software decoder 201A is executed to decode an MPEG system stream corresponding to the playback range R and display pictures resulting from the decoding on the picture display area 342 of the playback window 341.

As a result, the user is capable of confirming a scene with ease.

The user looks at index screens and, if necessary, further confirms a scene to determine a scene to be used in editing. The user then clicks an edit point file creation button 368 included in the tool bar of the clip editor main window 361 to display an output window 369 beneath the source window 362 on the clip editor main window 361 as shown in FIG. 21.

After the output window 369 is displayed, the user traces a range on the time line 363 in the source window 362 by dragging using the mouse 22. An index screen in the range is copied as a scene to a new clip. To put it in detail, an area on the source window 362 from an index screen at the beginning of the traced range to a frame immediately preceding an index screen immediately succeeding the traced range is the object to be copied to the new clip. On the time line 363 of the source window 362, a start mark 364L and an end mark 364R are displayed at positions corresponding to the start and end points of the object to be copied respectively. A background on the source window 362 in the area taken as the object to be copied and the traced range on the time line 363 are displayed in a color different from the rest.

The area is copied to the output window 369 by carrying out operations as follows. When a cursor of the mouse 22 is moved to a position in the area of the object to be copied and the mouse 22 is pressed and dragged from the position, the shape of the cursor is changed from typically a shape resembling an arrow to a shape symbolizing an index screen. It should be noted that the cursor itself is not shown in the figure. With the mouse 22 pressed as it is, the cursor is dragged to a position in the output window 369. As the mouse 22 is released from the pressed state, the index screen pointed to by the cursor is copied from the source window 362 to the output window 369. In the embodiment shown in FIG. 21, a scene with an index screen named "Auto 0" serving as the head frame thereof and a scene with an index screen named "Auto 2" serving as the head frame thereof have been copied from the source window 362 to the output window 369.

It should be noted that, when an object to be copied is copied from the source window 362 to the output window 369, all automatic indexes in the object are deleted from the output window 369. In addition, if the head frame of an object copied has an appended automatic index, the automatic index is changed to a manual index.

All automatic indexes in the copied object are deleted from the output window 369 for the following reason. The video CD creator, one of the application programs of the Slipclip software, can be used to create a video CD for recording scenes copied to the output window 369. When a video CD is created by the video CD creator, an index conforming to video CD specifications is set at a location pointed to by each scene change pointer recorded in the index file.

An automatic index is provided to help the user find a desired scene with ease. Basically, a large number of automatic indexes are recorded. If the large number of automatic indexes are not deleted, they will remain in the video CD created by the video CD creator.

On the other hand, each automatic index of the head frame of an object copied to the output window 369 is changed to a manual index because of the following reason. The head frame of a copied object corresponds to an edit point. It is desirable to keep an index also for an edit point in a video CD. If an automatic index of the head frame of an object copied to the output window 369 is not changed to a manual index, the automatic index will be deleted. Thus, an automatic index of the head frame of an object copied to the output window 369 is changed to a manual index in order to prevent the automatic index from being deleted.

As a result, only manual index screens associated with manual indexes are displayed on the output window 369. If it is desired to leave an index at the position of an automatic index, it is necessary to change the automatic index to a manual index in the way described earlier before copying an object to the output window 369.

It should be noted that an automatic index can be prevented from being deleted even if an object including the automatic object is copied to the output window 369. In addition, it is also possible to prevent an automatic index of the head frame of an object copied to the output window 369 from being changed to a manual index.

As described above, the user is capable of copying a desired scene to the output window 369. In addition, since the user is also capable of moving, deleting and rearranging scenes copied to the output window 369, the user is allowed to carry out editing by doing such work if necessary.

Then after desired scenes are rearranged in a desired order on the output window 369, it may be desired to newly create a clip for storing the rearranged scenes. In this case, a build start button 370 included in the tool bar of the clip editor window 361 is typically operated to create such a new clip.

When the build start button 370 is operated, the microprocessor 201 reads out encoded data of the desired scenes laid out on the output window 369 from the MPEG file by referring to the index file. After necessary processing is carried out for each junction point (or edit point) with elementary data (or an elementary stream) of the encoded data read out from the MPEG file used as it is, only system encoding is performed again. Results of the encoding are stored in the hard disc 212 as a new MPEG file.

It should be noted that, at the same time, an new index file for index screens displayed on the output window 369 is also created. It is obvious from the above description that the new index file will include only manual indexes and include no automatic indexes. The new index file and the newly created MPEG file are stored in the hard disc 212 as a new clip.

As described above, index screens associated with automatic indexes stored in the index file are displayed on the source window 362. A large number of index screens separated away from each other by not so large intervals may thus be displayed on the source window 362, adversely forming a hindrance to a search carried out by the user for a desired scene.

In order to solve the problem described above, in this embodiment, index screens associated with automatic indexes stored in the index file can be displayed on the source window 362 conditionally. That is to say, only index screens satisfying a certain condition are displayed on the source window 362. For the sake of convenience, such a condition is referred to hereafter as a display condition.

Figure 22:
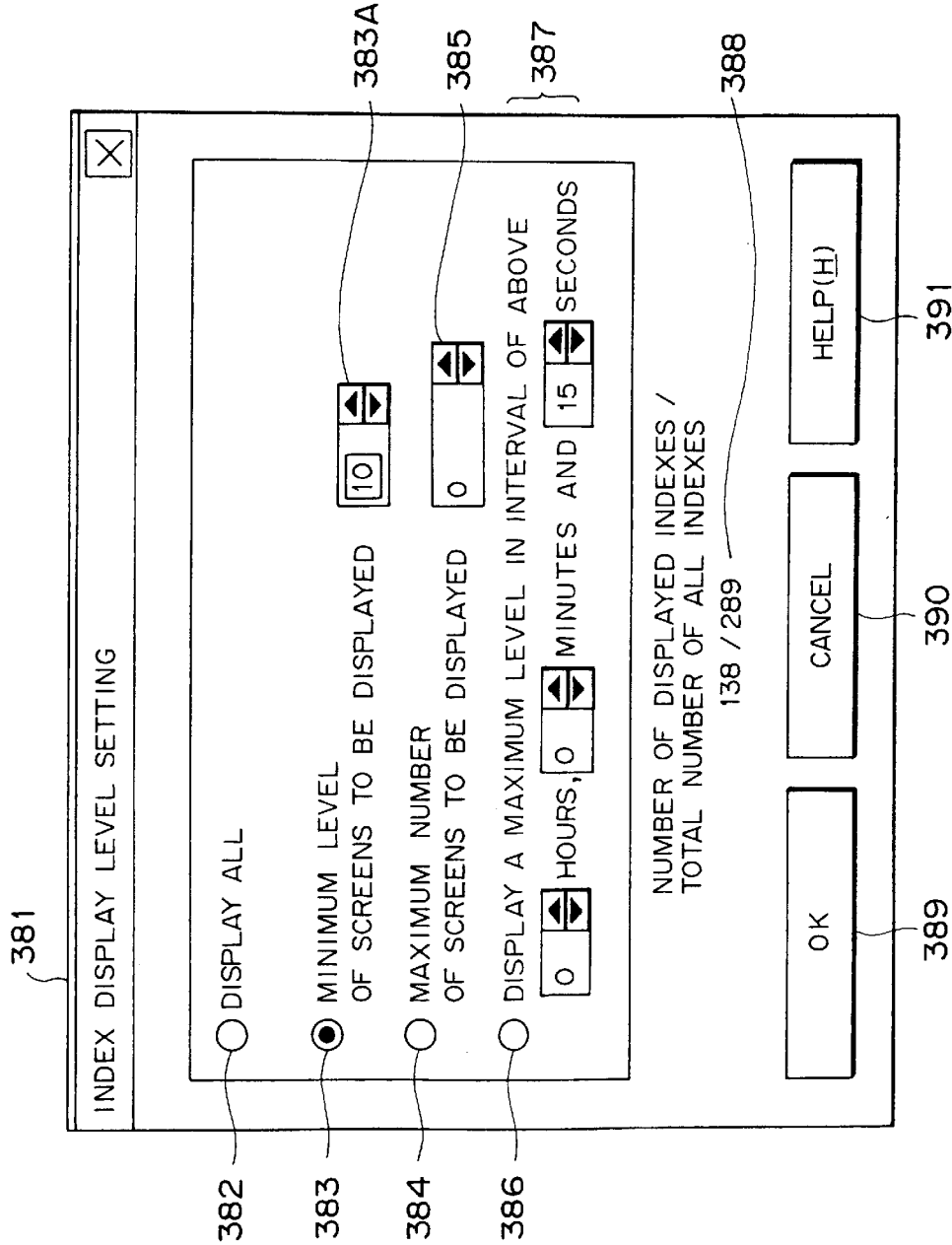
FIG. 22.is a diagram showing an index display level setting dialog box 381.

FIG. 22 is a diagram showing an index display level setting dialog box 381 used by the user for setting a display condition.

It should be noted that the index display level setting dialog box 381 can be displayed typically by clicking an "Index display level setting" item in a Display" menu of the clip editor main window 361 shown in FIG. 21.

A "display all" field 382 on the index display level setting dialog box 381 is specified by being clicked to set a display condition which stipulates that index screens associated with all automatic indexes recorded in an index file be displayed. A level field 383 is specified by being clicked to set a display condition which stipulates that only index screens associated with automatic indexes with the scene change parameters thereof exceeding a predetermined threshold value be displayed on the source window 362. The threshold value is entered by the user to a threshold value input field 383A.

A screen count field 384 is specified by being clicked to set a display condition which stipulates that only up to a specified number of index screens associated with automatic indexes having large scene change parameters be displayed on the source window 362 with automatic indexes having large scene change parameters given high priority. The maximum number of index screens is specified by the user to a "maximum number of screens to be displayed" field 385.

A maximum level display field 386 is specified by being clicked to set a display condition which stipulates that only an index screen associated with an automatic index having the largest scene change parameter in each of intervals be displayed on the source window 362. The length of each interval is entered by the user to time interval input fields 387.

When one of the display conditions described above is selected, the number of automatic indexes to be displayed under the selected condition and the total number of all automatic indexes recorded in the index file are displayed on a "Number of displayed indexes/Total number of all indexes" field 388.

It should be noted that an OK button 389 is operated to confirm set items newly entered to the index display level setting dialog box 381 and to close the index display level setting dialog box 381. A cancel button 390 is operated to keep set items previously confirmed and entered to the index display level setting dialog box 381 and to close the index display level setting dialog box 381. A help button 391 is operated to display explanations for helping the user understand the index display level setting dialog box 381.

Thus, only index screens associated with automatic indexes stored in the index file are displayed on the source window 362 shown in FIG. 21 in accordance with a display condition set by using the index display level setting dialog box 381 as described above.

Figure 23:
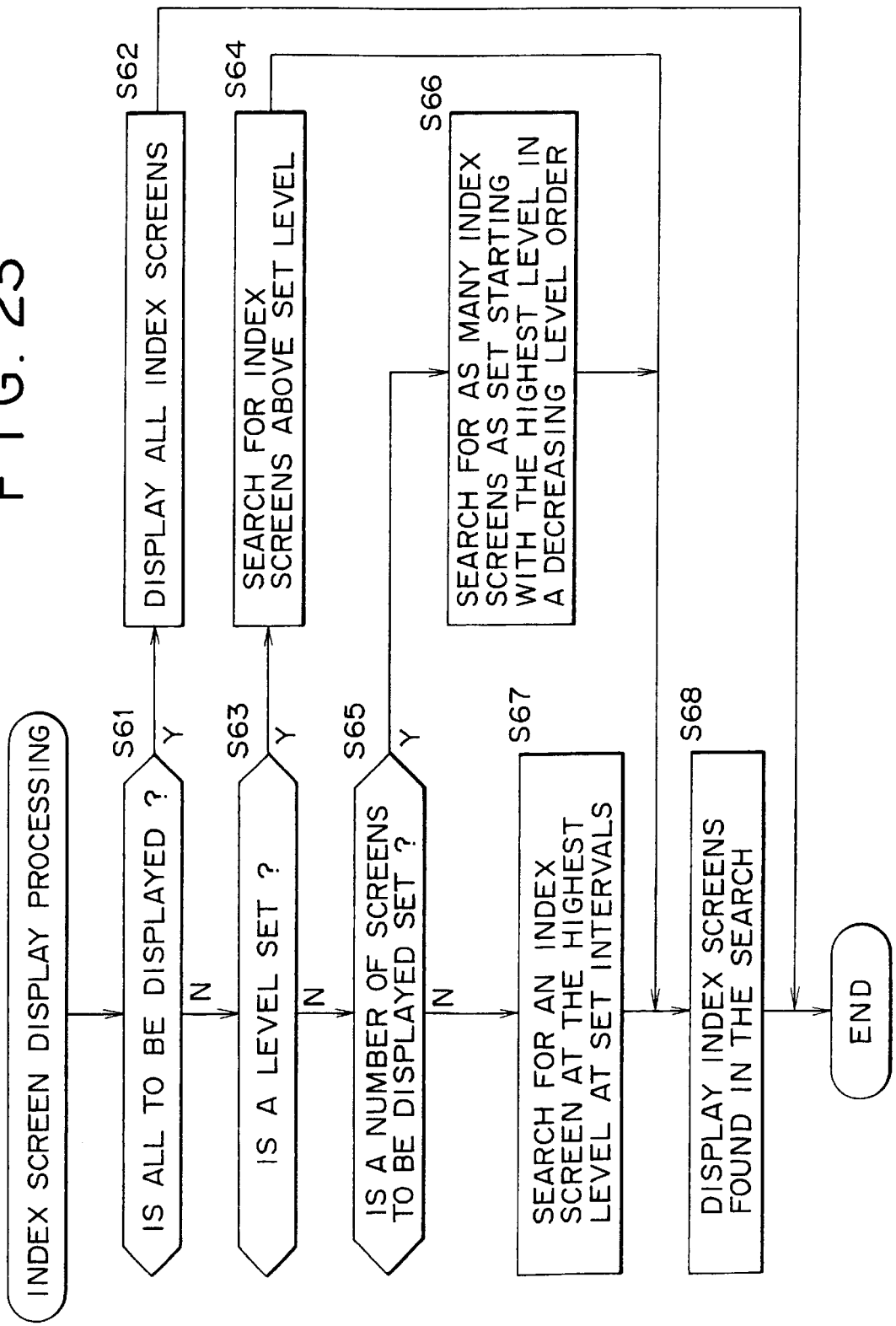
FIG. 23 shows a flowchart representing an index screen displaying process for displaying index screens on a source window 362.

FIG. 23 shows a flowchart representing an index screen displaying process to display index screens on the source window 362 conditionally. As shown in the figure, the flowchart begins with a step S61 to form a judgment as to whether or not the "display all" field 382 is selected. If the "display all" field 382 is found selected, the flow of the process goes on to a step S62 at which index screens associated with all automatic indexes recorded in an index file are displayed on the source window 362 and the process is finished.

If the outcome of the judgment formed at the step S61 indicates that the "display all" field 382 is not selected, on the other hand, the flow of the process goes on to a step S63 to form a judgment as to whether or not the level field 383 is selected. If the level field 383 is found selected, the flow of the process goes on to a step S64 at which the index file is searched for automatic indexes with the scene change parameters thereof exceeding a predetermined threshold value entered to the threshold value input field 383A. The flow then proceeds to a step S68 at which only index screens associated with the automatic indexes found in the search are displayed on the source window 362. The process is then finished.

If the outcome of the judgment formed at the step S63 indicates that the "level" field 383 is not selected, on the other hand, the flow of the process goes on to a step S65 to form a judgment as to whether or not the screen count field 384 is selected. If the screen count field 384 is found selected, the flow of the process goes on to a step S66 at which the index file is searched for n automatic indexes having largest scene change parameters where n is a number specified in the "maximum number of screens to be displayed" field 385. The flow then proceeds to the step S68 at which only index screens associated with the n automatic indexes found in the search are displayed on the source window 362. The process is then finished.

If the outcome of the judgment formed at the step S65 indicates that the screen count field 384 is not selected, that is, neither the "display all" field 382, the level field 383 nor the screen count field 384 is selected or, in other words, the maximum level display field 386 is specified, on the other hand, the flow of the process goes on to a step S67 at which the index file is searched for an automatic index having a largest scene change parameter in each of intervals where the length of each interval has been entered by the user to time interval input fields 387. The flow then proceeds to the step S68 at which only index screens associated with the automatic indexes found in the search are displayed on the source window 362. The process is then finished.

As described above, since the number of index screens displayed on the source window 362 can be limited by, among other things, the magnitudes of scene change parameters, the user is capable of finding a desired scene with ease.

In this embodiment, with the level field 383 selected, the threshold value of the scene change parameter which is normally specified by the user in a threshold value input field 383A can be changed without re-opening the index display level dialog box 381. That is to say, the threshold value can be changed by operating a down button 365A or an up button 365B of the tool bar of the clip editor main window 361 shown in FIG. 21. To be more specific, each time the down button 365A is operated, the scene change parameter is decremented by 1. As a result, the number of displayed index screens increases due to a smaller threshold value. Each time the up button 365B is operated, on the other hand, the scene change parameter is incremented by 1. As a result, the number of displayed index screens decreases due to a larger threshold value.

As described above, the number of index screens each associated with an automatic index is limited by a display condition. It should be noted that such limitation also can be applied to manual indexes as well.

Assume that a clip (or a tape) is created by using the slip recorder and the clip is edited by using the clip editor to give a new clip. The number of clips thus increases. If there are a number of clips, it will be difficult to identify the contents of each of the clips from the file names of the clips only. In order to solve this problem Slipclip includes an application program called the clip viewer.

When the clip viewer is activated, a clip viewer main window 401 like one shown in FIG. 24 is displayed.

As shown in the figure, the clip viewer main window 401 includes a clip view 402 a showing representative screen of each clip cataloged in a clip collection.

A clip collection is a folder used for classifying clippers. A representative scene of a clip is one of screens composing the clip. By default, the first screen of a clip is the representative screen of the clip. The representative screen of a clip can be changed from the default screen, that is, the first screen, to another screen of the same clip.

On a tab 402A, names assigned to clip collections are displayed. Thus, in this embodiment, 3 folders exists each as a clip collection. The names assigned to the 3 clip collections are "Summer Travels", "Ski Tournament" and "Christmas". It should be noted that a clip collection is selected by clicking the name on the tab 402A assigned to the clip collection. When a clip collection is selected, representative screens of clips cataloged in the selected clip collection are displayed on the clip view 402. In the embodiment shown in FIG. 24, a clip collection named "Summer Travel" has been selected and representative screens of 3 clips cataloged in the clip collection named "Summer Travel" are displayed on the clip view 402.

When one of the representative screens displayed on the clip view 402 is clicked, index screens of a clip represented by the clicked representative screen are displayed on an index view 403.

On a picture display area 404, on the other hand, played back pictures of the clip represented by the clicked representative screen on the clip view 402 are displayed. At the same time, the title of the clip represented by the clicked representative screen on the clip view 402 is displayed on a title field 405. That is to say, with the clip viewer, each clip can be given a title which is displayed on the title field 405.

A stop button 406, a playback button 407, a pause button 408, skip buttons 409 and 410, index buttons 411 and 412, a slider 414, a frame feed button 415 and a slow playback button 416 have the same functions as the stop button 346, the playback button 347, the pause button 348, the skip buttons 349 and 350, the index buttons 351 and 352, the slider 354, the frame feed button 355 and the slow playback button 356 of the playback window 341 shown in FIG. 15 respectively.

A full screen button 413 is operated to display the screen display area 404 on the full screen. An explanatory description of a clip selected from those displayed on the clip view 402 is displayed on a description field 417. That is to say, with the clip viewer, each clip can be explained by a description which is displayed on the description field 417.

As described above, in this embodiment, pictures are encoded and compressed and code resulting from the encoding and compression is then recorded. It should be noted, however, that the above description is not intended to be construed in a limiting sense. That is to say, the scope of the present invention is not limited to such an embodiment. For example, the present invention can be applied to an application wherein pictures are recorded as they are without being encoded. However, whether or not a slip playback function can be executed much depends on the transfer speed and the head seek time of the hard disc 212 and the amount of data to be recorded or the data rate.

To put it in detail, for example, consider a hard disc 212 with a transfer rate of 4 Mbps and a head seek time of 20 ms as is the case of the embodiment described above.

Assume that, in recording and playback operations, the amount of data per frame is the same as the "Normal" video recording mode and consider a transfer of 15 frames or 1,856 KB as computed before. The length of time it takes to write or read out 1,856 KB picture data into or from the hard disc 212 is about 453 ms (=1,856 KB/4×1,024 [KB/sec]). Taking the 20 ms head seek time into consideration, the write and read times are both about 473 ms. In order to carry out operations to read out and write picture data of 15 frames concurrently, it takes about 946 ms (=473 ms+473 ms) which exceeds a period of time of about 0.5 seconds, a period corresponding to 15 frames at a frame rate of 30 frames per second as described previously. Thus, the operations can not be carried out concurrently during the 0.5 sec period of time.

Consider now a "Long" video recording mode in place of "Normal" with the other conditions in the read and write operations remaining unchanged. In this case, the amount of picture data of 15 frames is 394 KB. The length of time it takes to write or read out 394KB picture data into or from the hard disc 212 is about 96.2 ms (=394 KB/4×1,024 [KB/sec]). Taking the 20 ms head seek time into consideration, the write and read times are both about 116.2 ms. In order to carry out operations to read out and write picture data of 15 frames concurrently, it takes about 1232.4 ms (=116.2 ms+116.2 ms) which is shorter than a period of time of about 0.5 seconds, a period corresponding to 15 frames at a frame rate of 30 frames per second as described previously. Thus, the operations can be carried out concurrently during the 0.5 sec period of time.

As described above, in the embodiment, picture data is subjected to encoding conforming to MPEG1 specifications, one of fixed rate encoding techniques. It should be noted, however, that the technique of encoding picture data is not limited to the encoding conforming to the MPEG1 specifications. As a matter of fact, picture data can be encoded at a variable rate. With picture data encoded at a variable rate, however, it is difficult to detect the location at which encoded data is recorded from the number of bytes representing an offset relative to a recording start position in processing such as a slip playback operation.

Also as described above, in the embodiment, a slip playback operation is carried out to reproduce pictures and their accompanying sound. It is worth noting, however, that a slip playback operation can also be carried out to reproduce other data. By the same token, a tape can be allocated for recording data other than pictures and sound.

According to a recording apparatus claimed as claim 1 and a recording method for recording information according claimed as claim 7, a required capacity, that is, a recording capacity required for recording said information, is computed from a recording time required for recording said information and bit rate information on a bit rate of said information; a required area, that is, a recording area with a size equal to at least said required capacity, is allocated in an information recording medium for recording said information; and the information is recorded in said required area.

In addition, a recording medium according to claim 8 is used for recording a program to let a computer record information according to claim 8 wherein said program prescribes a recording method comprising the steps of; computing a required capacity, that is, a recording capacity required for recording said information from a recording time required for recording said information and bit rate information on a bit rate of said information; allocating a required area, that is, a recording area with a size equal to at least said required capacity, in an information recording medium for recording said information; and recording said information in said required area. As a result, it is possible to prevent an operation to record information into the information recording medium from being aborted due to the fact that a required area allocated in said information recording medium has an insufficient recording capacity.

What is claimed is:

1. A recording apparatus for recording information comprising:

a setting means for setting a recording time required for recording said information and for setting bit rate information on a bit rate of said information;

a computing means for computing a required capacity, that is, a recording capacity required for recording said information, from said recording time and said bit rate information set by said setting means;

an allocating means for allocating a required area, that is, a recording area with a size equal to at least said required capacity, in an information recording medium for recording said information; and a recording means for recording said information in said required area.

2. A recording apparatus according to claim 1 wherein said recording means records said information from the beginning of said recording area to the end thereof and then starts recording of said information from said beginning repeatedly till an instruction to terminate said recording is received.

3. A recording apparatus according to claim 2 further including a playback means for playing back said information already recorded in said required area from a range retroactive with respect to a last point of time at which said information is recorded wherein said retroactive range has a size corresponding to said recording time.

4. A recording apparatus according to claim 3 further including an encoding means for encoding said information to be recorded by said recording means into said information recording medium and a decoding means for decoding said information encoded by said encoding means.

5. A recording apparatus according to claim 1 wherein said allocating means allocates said required area comprising fixed recording areas, that is, recording areas each having a fixed recording capacity, wherein as many fixed recording areas as required to make a sum of said fixed recording capacities at least equal to said required capacity are allocated.

6. A recording apparatus according to claim 1 further including an encoding means for encoding said information to be recorded by said recording means into said information recording medium.

7. A recording method for recording information comprising the steps of:

computing a required capacity, that is, a recording capacity required for recording said information, from a recording time required for recording said information and bit rate information on a bit rate of said information;

allocating a required area, that is, a recording area with a size equal to at least said required capacity, in an information recording medium for recording said information; and recording said information in said required area.

8. A recording medium for recording a program to let a computer record information wherein said program prescribes a recording method comprising the steps of:

computing a required capacity, that is, a recording capacity required for recording said information from a recording time required for recording said information and bit rate information on a bit rate of said information;

allocating a required area, that is, a recording area with a size equal to at least said required capacity, in an information recording medium for recording said information; and recording said information in said required area.

* * * * *

UNITED STATES PATENT AND TRADEMARK OFFICE
CERTIFICATE OF CORRECTION

PATENT NO. : 6,389,223 B1
DATED : May 14, 2002
INVENTOR(S) : Hidenori Aotake

It is certified that error appears in the above-identified patent and that said Letters Patent is hereby corrected as shown below:

Title page,
Item [57], ABSTRACT,
Line 1, insert the following at the beginning of the ABSTRACT:

-- A personal computer is used as a recording apparatus that is capable of carrying out recording and other processing concurrently without suspending the recording. The personal computer includes an encoder board, a microprocessor and a hard disc. --

Column 3,
Line 4, delete "FIG. 6 and";
Line 6, change "the,personal" to -- the personal --;
Line 40, change "a:controller" to -- a controller --;
Line 43, change "22.is" to -- 22 is --.

Column 5,
Lines 32 and 36, change "compact" to -- Compact --.

Column 7,
Line 61, delete "it".

Column 11,
Line 49, after "Length" insert -- Code) --;
Line 50, after "circuit" insert -- 117 --.

Column 12,
Line 63, change "cture" to -- picture --;
Line 64, change "coded" to -- encoded --;
Line 65, change "sted" to -- listed --;
Lines 66-67, delete "coding order Picture to be encoded Partner picture".

Column 15,
Line 24, delete "41".

UNITED STATES PATENT AND TRADEMARK OFFICE
CERTIFICATE OF CORRECTION

PATENT NO.    : 6,389,223 B1
DATED         : May 14, 2002
INVENTOR(S)   : Hidenori Aotake It is certified that error appears in the above-identified patent and that said Letters Patent is hereby corrected as shown below:

Column 16,
Line 35, change "B" to -- B1 --.

Column 17,
Line 12, after "will" insert -- be --.

Column 18,
Line 8, change "inframe" to -- intraframe --.
Line 48, change "us ed" to -- used --.

Column 19,
Line 26, change "inframe" to -- intraframe --.

Column 24,
Line 56, change "change" to -- changed --.

Column 29,
Line 11, change "node" to -- mode --.

Column 30,
Line 57, change "SI" to -- S1 --.
Line 64, change "Si" to -- S1 --.

Column 31,
Line 38, change "Si" to -- S1 --.

Column 38,
Line 40, change "E" to -- $\varepsilon$ --.

Column 39,
Line 43, insert a period after "KB".

Column 41,
Line 61, change "Is" to -- It is --.

UNITED STATES PATENT AND TRADEMARK OFFICE
CERTIFICATE OF CORRECTION

PATENT NO.   : 6,389,223 B1
DATED        : May 14, 2002
INVENTOR(S)  : Hidenori Aotake It is certified that error appears in the above-identified patent and that said Letters Patent is hereby corrected as shown below:

<u>Column 42,</u>
Line 36, delete "=".

<u>Column 45,</u>
Line 18, change "Display"" to -- ""Display"" --.

<u>Column 47,</u>
Line 15, change "a showing" to -- showing a --.

<u>Column 48,</u>
Line 57, change "according" to -- accordingly --.

Signed and Sealed this

Eighteenth Day of March, 2003

JAMES E. ROGAN
*Director of the United States Patent and Trademark Office*